US008500002B2

(12) United States Patent
Cohen et al.

(10) Patent No.: US 8,500,002 B2
(45) Date of Patent: *Aug. 6, 2013

(54) DISPLAY CONTROL BASED ON BENDABLE DISPLAY CONTAINING ELECTRONIC DEVICE CONFORMATION SEQUENCE STATUS

(75) Inventors: Alexander J. Cohen, Mill Valley, CA (US); Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/460,169

(22) Filed: Jul. 13, 2009

(65) Prior Publication Data

US 2010/0053074 A1 Mar. 4, 2010

Related U.S. Application Data

(63) Continuation-in-part of application No. 12/231,303, filed on Aug. 29, 2008, now Pat. No. 8,235,280, and a (Continued)

(51) Int. Cl.
*G06F 17/00* (2006.01)

(52) U.S. Cl.
USPC ........................ 235/375; 235/454; 235/472.01

(58) Field of Classification Search
USPC ...................... 235/375, 454, 472.01
See application file for complete search history.

(56) References Cited

U.S. PATENT DOCUMENTS

| 4,229,617 A | 10/1980 | Bellino et al. |
| 4,714,364 A | 12/1987 | Takada |

(Continued)

FOREIGN PATENT DOCUMENTS

| JP | 2005-165129 | 6/2005 |
| WO | WO 2006/040725 A1 | 4/2006 |
| WO | WO 2007/111382 A1 | 10/2007 |

OTHER PUBLICATIONS

U.S. Appl. No. 12/583,759, Cohen et al.

(Continued)

*Primary Examiner* — Kristy A Haupt

(57) ABSTRACT

A system includes, but is not limited to: one or more conformation sensor modules configured to direct obtaining information associated with one or more sequences of two or more conformations of one or more portions of one or more regions of a bendable display containing electronic device and one or more display control modules configured to direct controlling display of one or more portions of the bendable display containing electronic device regarding display of second information in response to the information associated with the one or more sequences of two or more conformations of the one or more portions of the one or more regions of the bendable display containing electronic device. In addition to the foregoing, other related method/system aspects are described in the claims, drawings, and text forming a part of the present disclosure.

29 Claims, 40 Drawing Sheets

Related U.S. Application Data

(63) continuation-in-part of application No. 12/284,340, filed on Sep. 19, 2008, now Pat. No. 8,272,571, and a continuation-in-part of application No. 12/283,607, filed on Sep. 11, 2008, and a continuation-in-part of application No. 12/283,608, filed on Sep. 12, 2008, and a continuation-in-part of application No. 12/284,621, filed on Sep. 22, 2008, and a continuation-in-part of application No. 12/284,709, filed on Sep. 23, 2008, and a continuation-in-part of application No. 12/286,116, filed on Sep. 25, 2008, and a continuation-in-part of application No. 12/286,115, filed on Sep. 26, 2008, now Pat. No. 8,466,870, and a continuation-in-part of application No. 12/287,383, filed on Oct. 7, 2008, and a continuation-in-part of application No. 12/287,684, filed on Oct. 9, 2008, now Pat. No. 8,446,357, and a continuation-in-part of application No. 12/287,685, filed on Oct. 10, 2008, and a continuation-in-part of application No. 12/288,010, filed on Oct. 14, 2008, now Pat. No. 8,462,104, and a continuation-in-part of application No. 12/291,400, filed on Nov. 7, 2008, and a continuation-in-part of application No. 12/291,540, filed on Nov. 10, 2008, and a continuation-in-part of application No. 12/313,028, filed on Nov. 14, 2008, now Pat. No. 8,279,199, and a continuation-in-part of application No. 12/313,673, filed on Nov. 20, 2008, and a continuation-in-part of application No. 12/455,147, filed on May 27, 2009, and a continuation-in-part of application No. 12/455,307, filed on May 28, 2009, now Pat. No. 8,240,548, and a continuation-in-part of application No. 12/455,316, filed on May 29, 2009, now Pat. No. 8,322,599, and a continuation-in-part of application No. 12/455,495, filed on Jun. 1, 2009, and a continuation-in-part of application No. 12/456,238, filed on Jun. 11, 2009, now Pat. No. 8,393,531, and a continuation-in-part of application No. 12/456,248, filed on Jun. 12, 2009, and a continuation-in-part of application No. 12/456,432, filed on Jun. 15, 2009, now Pat. No. 8,297,495, and a continuation-in-part of application No. 12/456,501, filed on Jun. 16, 2009, and a continuation-in-part of application No. 12/460,030, filed on Jul. 10, 2009, now Pat. No. 8,251,278.

U.S. PATENT DOCUMENTS

| Patent No. | Date | Inventor |
|---|---|---|
| 5,818,165 A | 10/1998 | Malhi |
| 5,838,889 A | 11/1998 | Booker |
| 5,921,582 A | 7/1999 | Gusack |
| 6,243,075 B1 | 6/2001 | Fishkin et al. |
| 6,297,838 B1 * | 10/2001 | Chang et al. ............ 715/863 |
| 6,334,063 B1 | 12/2001 | Charlier et al. |
| 6,577,496 B1 | 6/2003 | Gioscia et al. |
| 6,710,754 B2 | 3/2004 | Hanson et al. |
| 6,943,773 B2 | 9/2005 | Wong et al. |
| 7,023,418 B2 | 4/2006 | Nakamura et al. |
| 7,109,967 B2 | 9/2006 | Hioki et al. |
| 7,195,170 B2 | 3/2007 | Matsumoto et al. |
| 7,196,689 B2 | 3/2007 | Moiyama |
| 7,221,865 B2 | 5/2007 | Nonaka |
| 7,236,291 B2 | 6/2007 | Kaga et al. |
| 7,292,231 B2 | 11/2007 | Kodama et al. |
| 7,633,491 B2 | 12/2009 | Okamoto |
| 7,639,417 B2 | 12/2009 | Kobayashi et al. |
| 7,876,312 B2 | 1/2011 | Kodama et al. |
| 7,880,718 B2 | 2/2011 | Cradick et al. |
| 2003/0098857 A1 | 5/2003 | Gettemy et al. |
| 2003/0163527 A1 | 8/2003 | Hsu |
| 2004/0008191 A1 | 1/2004 | Poupyrev et al. |
| 2004/0113865 A1 | 6/2004 | Oku et al. |
| 2005/0110702 A1 | 5/2005 | Aoki et al. |
| 2005/0234785 A1 | 10/2005 | Burman et al. |
| 2005/0283472 A1 | 12/2005 | Hayashi et al. |
| 2006/0203327 A1 | 9/2006 | Yasuda |
| 2006/0208328 A1 | 9/2006 | Sano et al. |
| 2006/0238494 A1 | 10/2006 | Narayanaswami et al. |
| 2006/0274036 A1 * | 12/2006 | Hioki et al. ............ 345/156 |
| 2007/0057935 A1 * | 3/2007 | Takagi ............ 345/211 |
| 2007/0188450 A1 | 8/2007 | Hernandez et al. |
| 2007/0194166 A1 | 8/2007 | Reinsel et al. |
| 2007/0242033 A1 | 10/2007 | Cradick et al. |
| 2007/0247412 A1 | 10/2007 | Yu |
| 2007/0247422 A1 * | 10/2007 | Vertegaal et al. ............ 345/156 |
| 2007/0252804 A1 | 11/2007 | Engel et al. |
| 2007/0273609 A1 | 11/2007 | Yamaguchi et al. |
| 2008/0080010 A1 | 4/2008 | Korst |
| 2008/0088727 A1 | 4/2008 | Nagata et al. |
| 2008/0129647 A1 | 6/2008 | Canova |
| 2008/0179173 A1 | 7/2008 | Jung et al. |
| 2008/0180399 A1 | 7/2008 | Cheng |
| 2008/0192013 A1 | 8/2008 | Barrus et al. |
| 2008/0266273 A1 | 10/2008 | Slobodin et al. |
| 2008/0303782 A1 | 12/2008 | Grant et al. |
| 2009/0113775 A1 | 5/2009 | Netter |
| 2009/0122504 A1 | 5/2009 | Lee |
| 2009/0231252 A1 | 9/2009 | Maegawa |
| 2010/0053067 A1 | 3/2010 | Cohen et al. |
| 2010/0053075 A1 | 3/2010 | Cohen et al. |
| 2010/0053076 A1 | 3/2010 | Cohen et al. |
| 2010/0053217 A1 | 3/2010 | Cohen et al. |
| 2010/0060564 A1 | 3/2010 | Cohen et al. |
| 2010/0060565 A1 | 3/2010 | Cohen et al. |
| 2010/0064244 A1 | 3/2010 | Kilpatrick, II et al. |
| 2010/0073263 A1 | 3/2010 | Cohen et al. |
| 2010/0073333 A1 | 3/2010 | Cohen et al. |
| 2010/0073334 A1 | 3/2010 | Cohen et al. |
| 2010/0085277 A1 | 4/2010 | Cohen et al. |
| 2010/0113161 A1 | 5/2010 | Walker et al. |
| 2010/0117954 A1 | 5/2010 | Cohen et al. |
| 2010/0117955 A1 | 5/2010 | Cohen et al. |
| 2010/0123689 A1 | 5/2010 | Cohen et al. |
| 2010/0124879 A1 | 5/2010 | Cohen et al. |
| 2010/0208328 A1 | 8/2010 | Heikenfeld et al. |

OTHER PUBLICATIONS

U.S. Appl. No. 12/583,595, Cohen et al.
U.S. Appl. No. 12/462,345, Cohen et al.
U.S. Appl. No. 12/462,343, Cohen et al.
U.S. Appl. No. 12/462,199, Cohen et al.
U.S. Appl. No. 12/462,133, Cohen et al.
U.S. Appl. No. 12/455,307, filed May 28, 2009.
U.S. Appl. No. 12/455,147, filed May 27, 2009.
U.S. Appl. No. 12/460,030, filed Jul. 10, 2009.
U.S. Appl. No. 12/462,199, filed Jul. 29, 2009.
"Samsung i7: Digital Photography Review"; dpreview.com; Jan. 29, 2007; pp. 1-3; located at http://www.dpreview.com/news/2007/01/29/samsungi7.

* cited by examiner

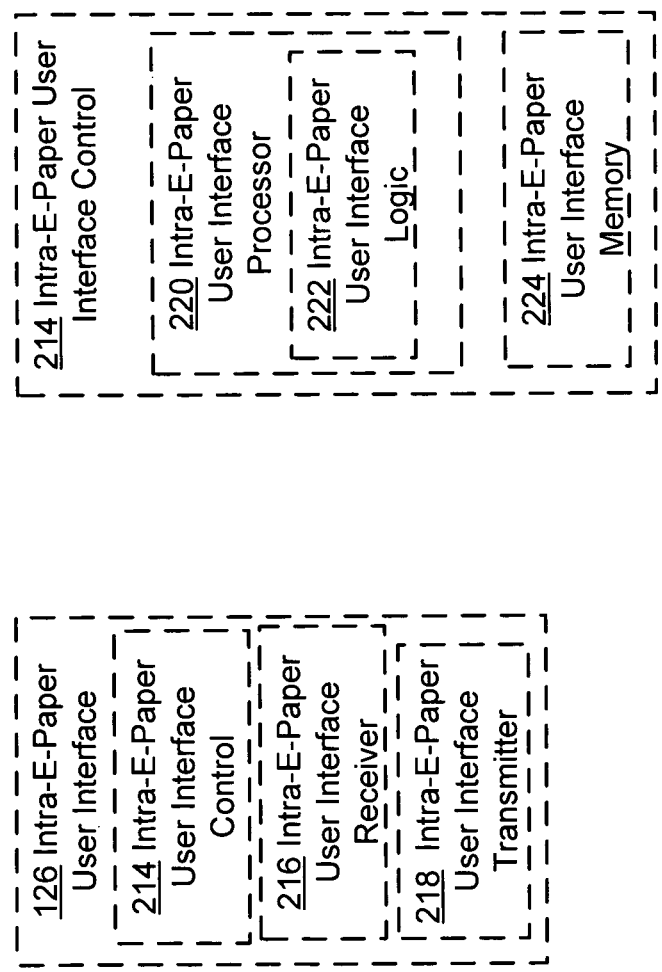

FIG. 11

127 Intra-E-Paper Modules

| | | | | | |
|---|---|---|---|---|---|
| | | 306 Conformation Detection Module | 308 Conformation Strain Module | | |
| 302 Conformation Sensor Module | 304 Display Control Module | 305 Coordination Module | | | |
| 310 Conformation Stress Module | 312 Conformation Calibration Module | 314 Conformation Pattern Module | 316 Surface Contact Module | 318 Conformation Sequence Module | |
| 320 Conformation Geometry Module | 324 Conformation Indicia Module | 326 Optical Fiber Module | 328 Conformation Association Module | 330 Conformation Signal Module | |
| 332 Conformation Selection Module | 334 Origami-like Folding Module | 336 Folding Sequence Module | 338 Origami-like Shape Module | | |
| 344 Bend Number Module | 346 Conformation Force Module | 348 Conformation Transient Module | 350 Conformation Persistent Module | 342 Bend Angle Module | |
| 357 Conformation Connection Module | 358 Conformation Draping Module | 359 Conformation Wrapping Module | 360 Conformation Curvilinear Module | 356 Conformation Gesture Module | |
| 362 Conformation Hinge Module | 363 Bend Radius Module | 364 Fold Ratio Module | 365 Other Modules | 361 Conformation Rolling Module | |

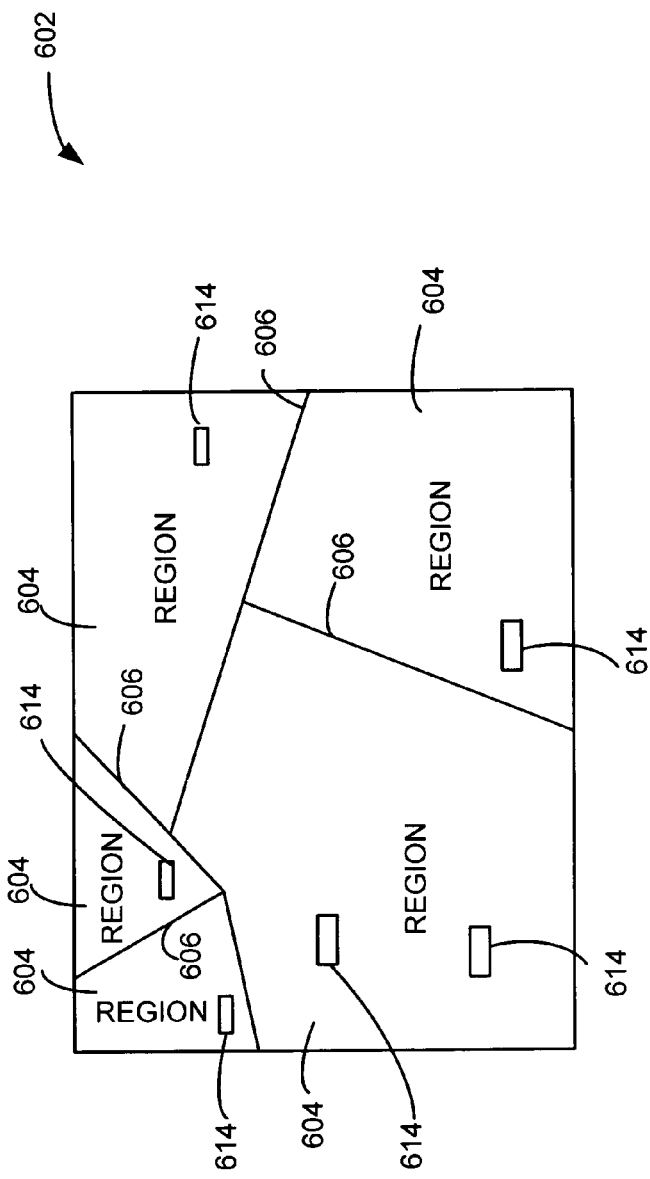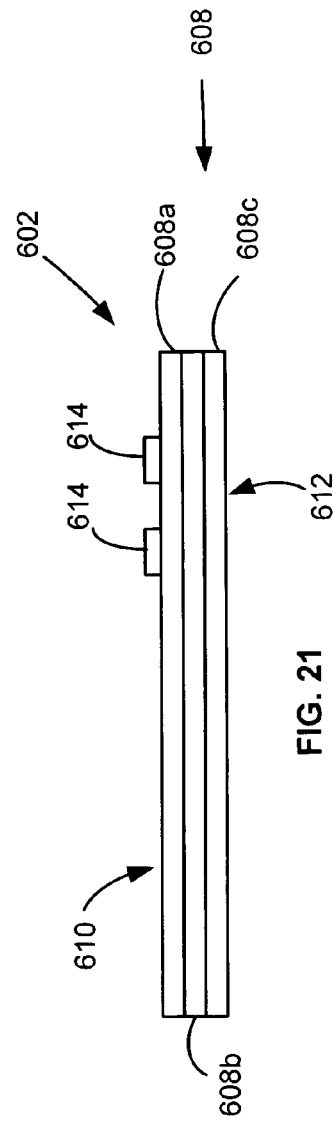

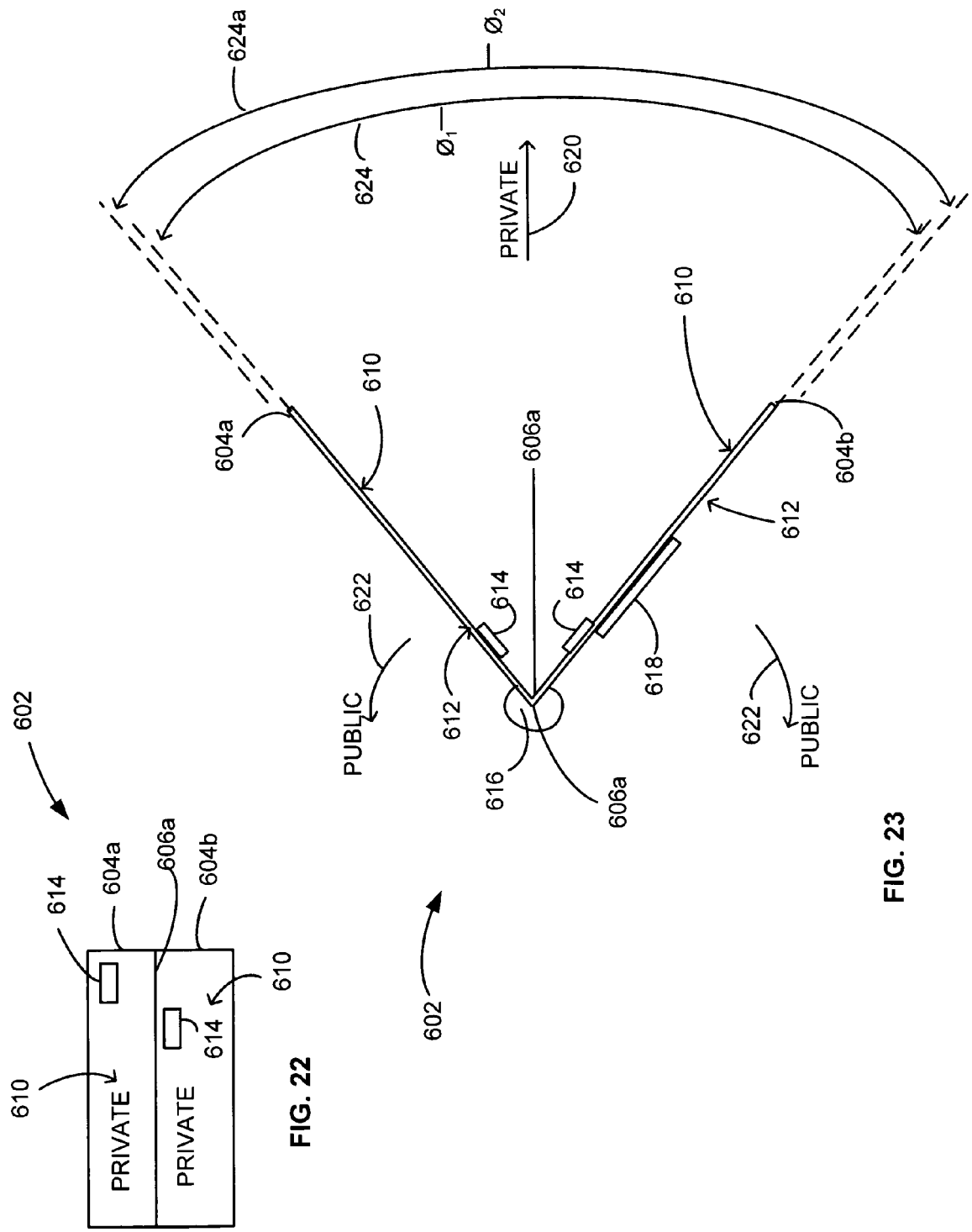

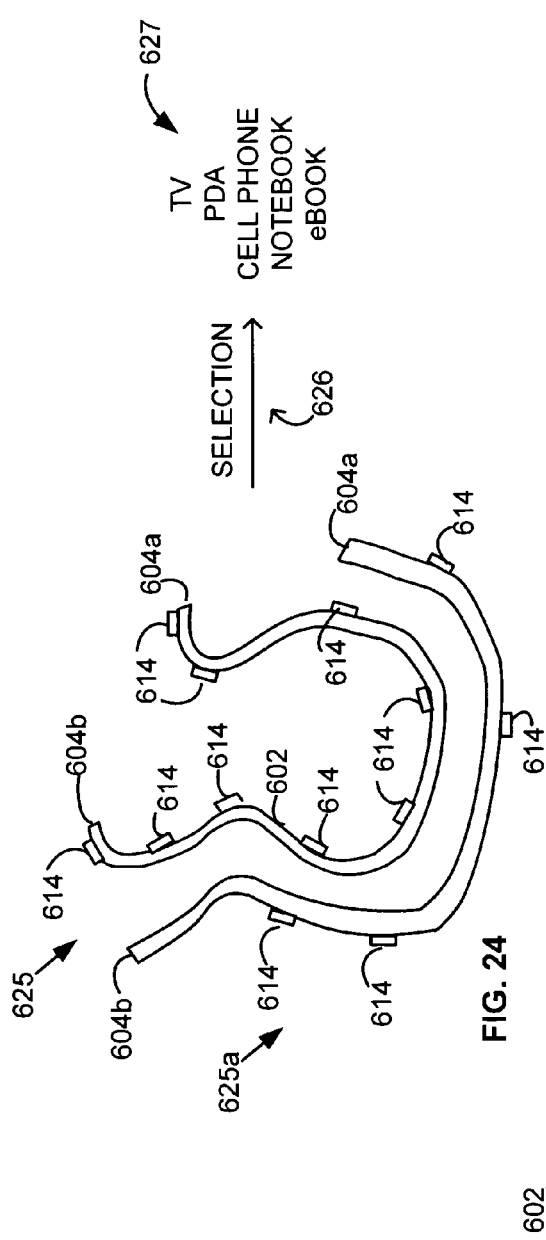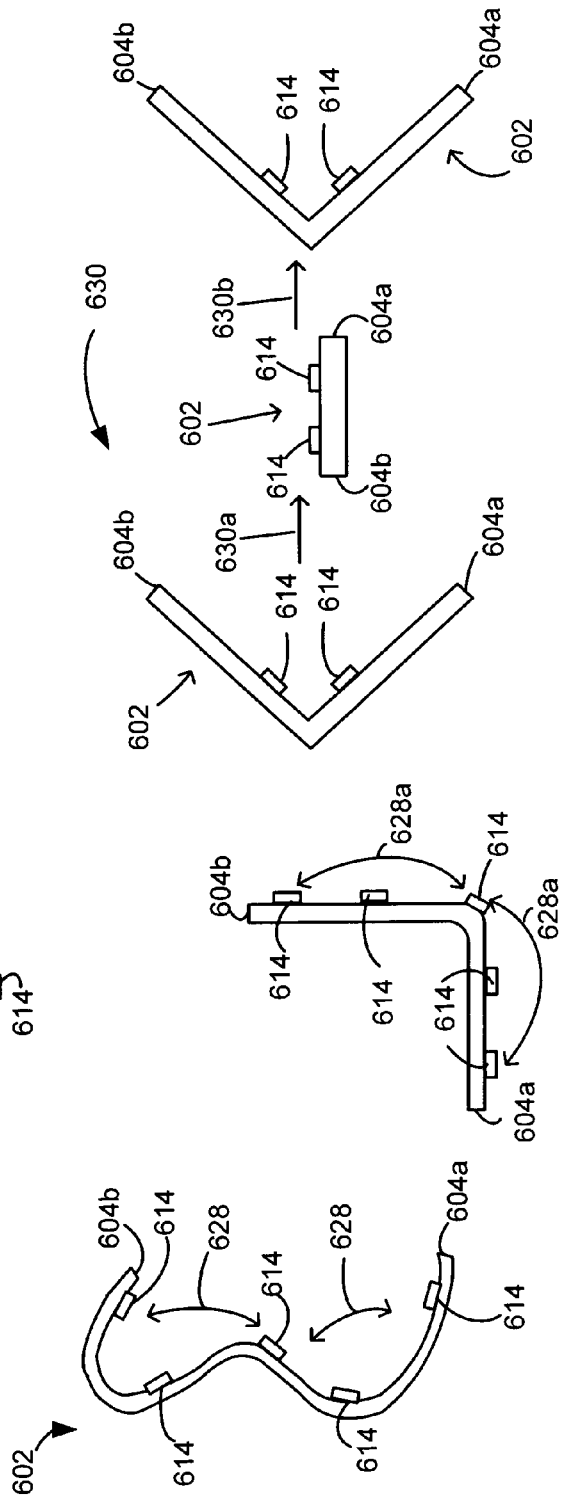

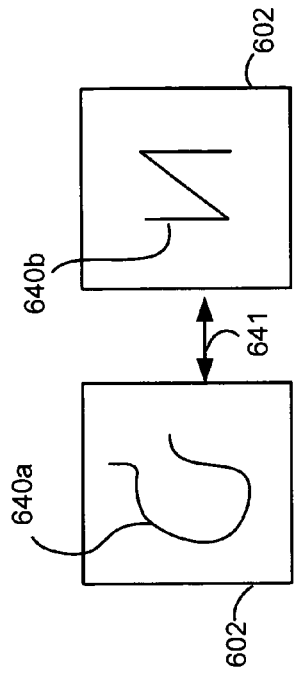
FIG. 30a
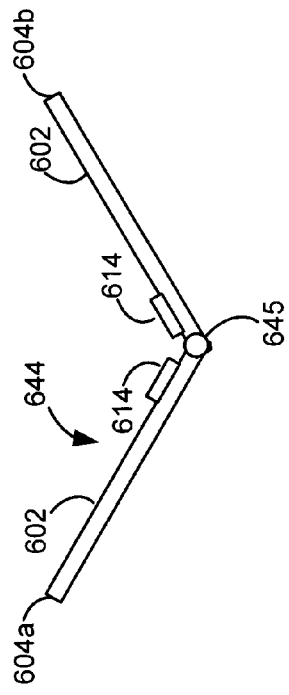
FIG. 32
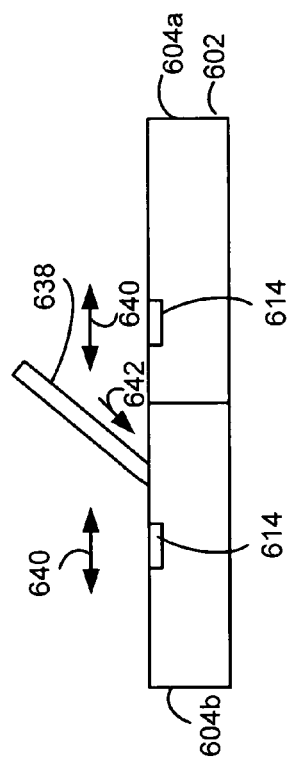
FIG. 30
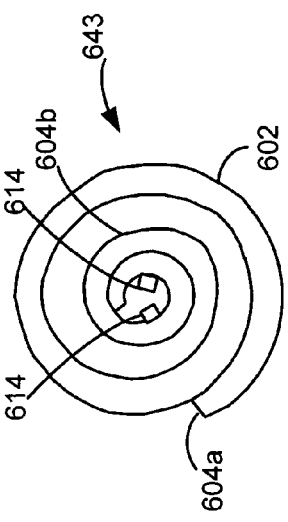
FIG. 31

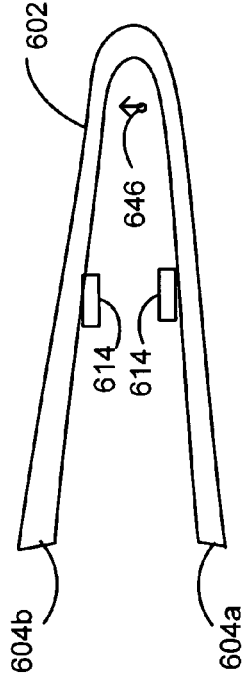
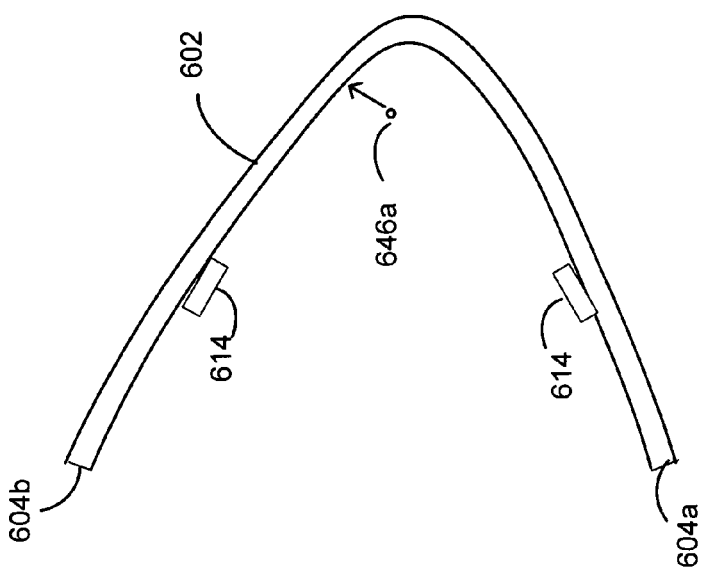
FIG. 33

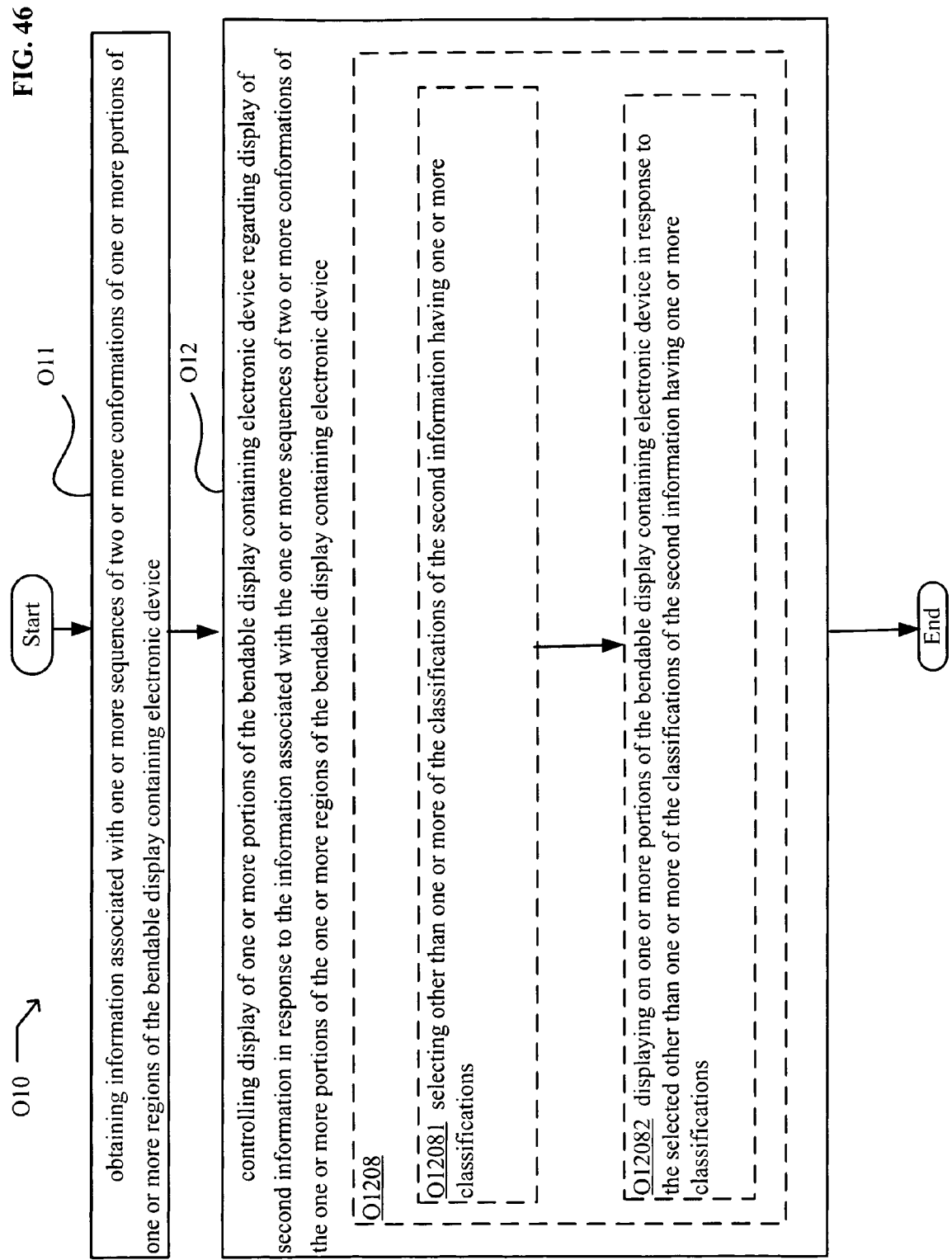

FIG. 47

S100 A system comprising:

S102 a signal-bearing medium bearing

S104 obtaining information associated with one or more portions of the bendable display containing electronic device regarding portions of one or more regions of the bendable display containing electronic device; and controlling display of one or more portions of the bendable display containing electronic device regarding display of second information in response to the information associated with the one or more sequences of two or more conformations of the one or more portions of the one or more regions of the bendable display containing electronic device S106 a computer-readable medium S108 a recordable medium S110 a communications medium

DISPLAY CONTROL BASED ON BENDABLE DISPLAY CONTAINING ELECTRONIC DEVICE CONFORMATION SEQUENCE STATUS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/231,303, entitled E-PAPER DISPLAY CONTROL OF CLASSIFIED CONTENT BASED ON E-PAPER CONFORMATION, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 29, Aug. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/284,340, entitled E-PAPER DISPLAY CONTROL OF CLASSIFIED CONTENT BASED ON E-PAPER CONFORMATION, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 19, Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/283,607, entitled E-PAPER DISPLAY CONTROL OF CLASSIFIED CONTENT BASED ON E-PAPER CONFORMATION, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 11, Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/283,608, entitled E-PAPER DISPLAY CONTROL OF CLASSIFIED CONTENT BASED ON E-PAPER CONFORMATION, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 12, Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/284,621, entitled E-PAPER APPLICATION CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 22, Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/284,709, entitled E-PAPER APPLICATION CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 23, Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,116, entitled E-PAPER APPLICATION CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 25, Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/286,115, entitled E-PAPER APPLICATION CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 26, Sep. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/287,383, entitled E-PAPER DISPLAY CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 7, Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/287,684, entitled E-PAPER DISPLAY CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 9, Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/287,685, entitled E-PAPER DISPLAY CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 10, Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/288,010, entitled E-PAPER DISPLAY CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 14, Oct. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,400, entitled E-PAPER DISPLAY CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 7, Nov. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/291,540, entitled E-PAPER DISPLAY CONTROL BASED ON CONFORMATION SEQUENCE STATUS, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 10, Nov. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/313,028, entitled E-PAPER EXTERNAL CONTROL SYSTEM AND METHOD, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 14, Nov. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/313,673, entitled E-PAPER EXTERNAL CONTROL SYSTEM AND METHOD, naming ALEXANDER J. COHEN, EDWARD K. Y. JUNG, ROYCE A. LEVIEN, ROBERT W. LORD, MARK A. MALAMUD AND JOHN D. RINALDO, JR. as inventors, filed 20, Nov. 2008, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,147, entitled DISPLAY CONTROL OF CLASSIFIED CONTENT BASED ON FLEXIBLE DISPLAY CONTAINING ELECTRONIC DEVICE CONFORMATION, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 27, May, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,307, entitled DISPLAY CONTROL OF CLASSIFIED CONTENT BASED ON FLEXIBLE DISPLAY CONTAINING ELECTRONIC DEVICE CONFORMATION, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 28, May, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,316, entitled DISPLAY CONTROL OF CLASSIFIED CONTENT BASED ON FLEXIBLE INTERFACE E-PAPER CONFORMATION, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 29, May, 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/455,495, entitled DISPLAY CONTROL OF CLASSIFIED CONTENT BASED ON FLEXIBLE INTERFACE E-PAPER CONFORMATION, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 1, Jun. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/456,238, entitled APPLICATION CONTROL BASED ON FLEXIBLE ELECTRONIC DEVICE CONFORMATION SEQUENCE STATUS, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 11, Jun. 2009, which is currently co-pending, or is an application of which a currently co-pending application is entitled to the benefit of the filing date.

For purposes of the USPTO extra-statutory requirements, the present application constitutes a continuation-inpart of U.S. patent application Ser. No. 12/456,248, entitled APPLICATION CONTROL BASED ON FLEXIBLE ELECTRONIC DEVICE CONFORMATION SEQUENCE STATUS, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 12, Jun. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/456,432, entitled APPLICATION CONTROL BASED ON FLEXIBLE INTERFACE CONFORMATION SEQUENCE STATUS, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 15, Jun. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/456,501, entitled APPLICATION CONTROL BASED ON FLEXIBLE INTERFACE CONFORMATION SEQUENCE STATUS, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 16, Jun. 2009, which is currently co-pending, or is an application of which a currently co-pending application is entitled to the benefit of the filing date.

For purposes of the USPTO extra-statutory requirements, the present application constitutes a continuation-in-part of United States patent application Ser. No. 12/460,030, entitled DISPLAY CONTROL BASED ON BENDABLE DISPLAY CONTAINING ELECTRONIC DEVICE CONFORMATION SEQUENCE STATUS, naming ALEXANDER J. COHEN, EDWARD K. Y. JUNG, ROYCE A. LEVIEN, RICHARD T. LORD, ROBERT W. LORD, MARK A. MALAMUD AND JOHN D. RINALDO, JR. as inventors, filed 10, Jul. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

SUMMARY

A method includes, but is not limited to: one or more conformation sensor modules configured to direct obtaining information associated with one or more sequences of two or more conformations of one or more portions of one or more regions of a bendable display containing electronic device and one or more display control modules configured to direct controlling display of one or more portions of the bendable display containing electronic device regarding display of second information in response to the information associated with the one or more sequences of two or more conformations of the one or more portions of the one or more regions of the bendable display containing electronic device. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming may be virtually any combination of hardware, software, and/or firmware configured to effect the herein-referenced method aspects depending upon the design choices of the system designer.

A system includes, but is not limited to: circuitry for one or more conformation sensor modules configured to direct obtaining information associated with one or more sequences of two or more conformations of one or more portions of one or more regions of a bendable display containing electronic device and circuitry for one or more display control modules configured to direct controlling display of one or more portions of the bendable display containing electronic device regarding display of second information in response to the information associated with the one or more sequences of two or more conformations of the one or more portions of the one or more regions of the bendable display containing electronic device. In addition to the foregoing, other method aspects are described in the claims, drawings, and text forming a part of the present disclosure.

A system includes, but is not limited to: means for one or more conformation sensor modules configured to direct obtaining information associated with one or more sequences of two or more conformations of one or more portions of one or more regions of a bendable display containing electronic device and means for one or more display control modules configured to direct controlling display of one or more portions of the bendable display containing electronic device regarding display of second information in response to the information associated with the one or more sequences of two or more conformations of the one or more portions of the one or more regions of the bendable display containing electronic device. In addition to the foregoing, other method aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 10 is a block diagram showing detail of an exemplary implementation of a user interface unit of the exemplary implementation of the intra-e-paper assembly of FIG. 2.

FIG. 11 is a block diagram showing detail of exemplary implementations of intra-e-paper modules of the exemplary implementation of the intra-e-paper assembly of FIG. 2.

FIG. 20 is a schematic diagram depicting regions of an exemplary implementation of an intra-e-paper assembly.

FIG. 21 is a side elevational sectional view of an exemplary implementation of the intra-e-paper assembly.

FIG. 22 is a top plan view of an exemplary implementation of the intra-e-paper assembly of FIG. 1 is a partially folded state.

FIG. 23 is a side elevational view of the exemplary implementation of the intra-e-paper assembly of FIG. 22.

FIG. 24 is a side elevational view of an exemplary implementation of the intra-e-paper assembly of FIG. 1 showing selection capability.

FIG. 25 is a side elevational view of an exemplary implementation of the intra-e-paper assembly of FIG. 1 showing association between regions due to a depicted conformation.

FIG. 25a is a side elevational view of an exemplary implementation of the intra-e-paper assembly of FIG. 1 showing association between regions due to a depicted conformation.

FIG. 26 is a series of side elevational views of an exemplary implementation of the intra-e-paper assembly of FIG. 1 showing a sequence of depicted conformations.

FIG. 30 is a side elevational view of an exemplary implementation of the intra-e-paper assembly of FIG. 1 showing an exemplary type of transient conformation through an exemplary scraping action resultant in curvilinear input.

FIG. 30a is a side elevational view of an exemplary implementation of the intra-e-paper assembly of FIG. 1 showing an exemplary type of transient conformation through an exemplary scraping action resultant in curvilinear input.

FIG. 31 is a side elevational view of an exemplary implementation of the intra-e-paper assembly of FIG. 1 showing an exemplary rolled type of conformation.

FIG. 32 is a side elevational view of an exemplary implementation of the intra-e-paper assembly of FIG. 1 showing an exemplary hinge status of the exemplary implementation in an exemplary folded state.

FIG. 33 is a side elevational view of an exemplary implementation of the intra-e-paper assembly of FIG. 1 showing an exemplary bend radius status of the exemplary implementation in an exemplary folded state.

FIG. 46 is a high-level flowchart including an exemplary implementation of operation O12 of FIG. 34.

FIG. 47 illustrates a partial view of a system S100 that includes a computer program for executing a computer process on a computing device.

DETAILED DESCRIPTION

Figure 1:
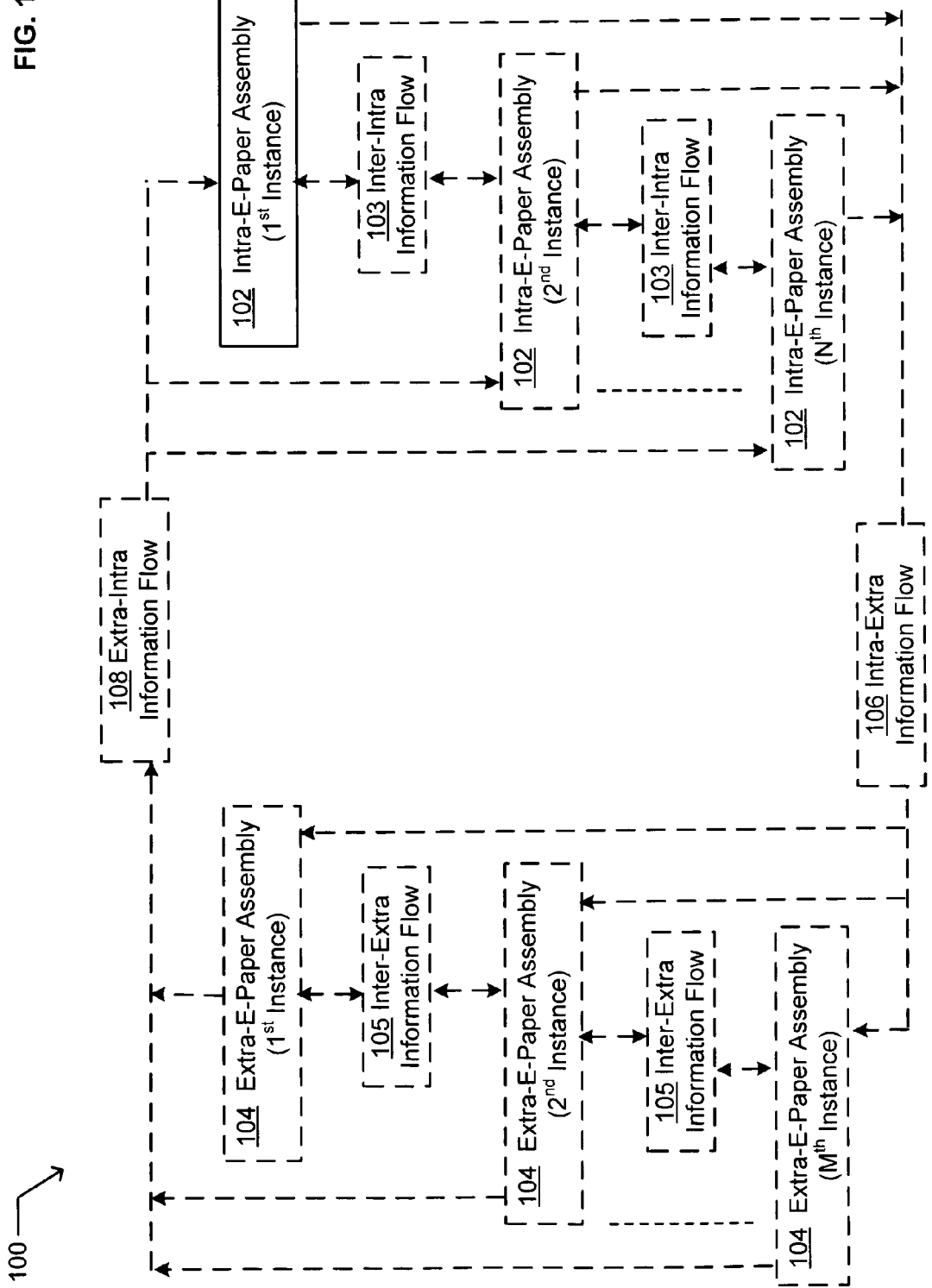
FIG. 1 is a block diagram of an intra-e-paper assembly shown in an environment as optionally associated through information flows with other intra-e-paper assemblies and extra-e-paper assemblies.

In the following detailed description, reference is made to the accompanying drawings, which form a part hereof. In the drawings, similar symbols typically identify similar components, unless context dictates otherwise.

The illustrative embodiments described in the detailed description, drawings, and claims are not meant to be limiting. Other embodiments may be utilized, and other changes may be made, without departing from the spirit or scope of the subject matter presented here.

An exemplary environment is depicted in FIG. 1 in which one or more aspects of various embodiments may be implemented. In the illustrated environment, an exemplary system 100 may include at least an intra-e-paper assembly or other bendable display containing electronic device (herein "e-paper") 102 for display communication, storage, manipulation, broadcast, or other use of information, including visual, auditory, or otherwise oriented, based upon conformation of the e-paper and/or classification based upon conformation of the e-paper and/or classification of the information being considered for display or other use.

Some exemplary implementations of the e-paper 102 may utilize various display aspects related to technology commonly referred to as "electronic paper," "e-paper," "electronic ink," and "e-ink" such as plate type electronics using liquid crystal electronics or organic electroluminescence electronics. Some exemplary implementations may use one or more thin and/or foldable electronic circuit boards to provide a more paper-like flexibility for the e-paper 102 without need for hinged connections between portions or regions of the e-paper. Other implementations of the e-paper may also have alone or in combination with the flexible portions more rigid type portions such as with the plate type electronics in which various portions or regions of the e-paper 102 are coupled together with mechanical connectors such as hinges or micro-hinges or other coupling mechanisms. Some exemplary implementations may have one or more batteries mounted thereon to furnish power for changing displayed content. Some exemplary implementations may require power for maintaining the displayed content. Other exemplary implementations may have display aspects with a memory function in lieu of such power requirements.

Some exemplary implementations of the e-paper 102 may utilize display aspects of microcapsule electrophoretic or twist ball type electronics. An exemplary microcapsule-electrophoretic display unit implementation may not require power for maintaining the displayed content.

In some exemplary implementations, black (or other colored particles) charged to negative polarity and white (or other colored particles) charged to positive polarity may be contained in transparent microcapsules that are positioned between films having a transparent electrode such as indium tin oxide (ITO). When a voltage is used to apply negative electric charge to a specific portions of microcapsules, the white (or other colored particles) move to a lower microcapsule portion and the black (or other colored) particles electrophoretically migrate toward an upper microcapsule portion. Consequently, an image of white (or one or more other colors) and black (or one or more other colors) may be displayed on the exemplary implementation of the e-paper 102.

When positive electric charge is applied to an entire surface display layer and/or an internal display layer beneath the surface display layer of the e-paper 102, the white particles may move to an upper portion of a part of the microcapsule. Consequently, the surface becomes white, which may be used to delete an image. Microcapsule-electrophoretic exemplary versions of the e-paper 102 may require power to move the white and black particles at the time of rewrite. However, because the white and black particles normally stay on the electrode due to electrostatic adsorption or intermolecular force, power may not be required to maintain displayed content akin to a memory function.

An exemplary twist-ball (Gyricon bead) implementation of the e-paper 102 may use balls having a spherical diameter of 10 micrometers to 100 micrometers, which may be painted, respectively, in two colors (for example, white and black) for each hemisphere, have charged states (plus and minus) corresponding to the respective colors, and may be buried in a transparent insulating sheet put between a pair of electrodes. Balls painted in two colors may be supported in an insulating liquid such as silicon oil in a cavity slightly larger than the ball diameter so that applied voltage rotates the charged ball to display one of the painted colors. Since the rotated ball may be positionally fixed by electrostatic adsorption, if the applied voltage is removed, displayed content may remain without continuing to apply power. Other aspects of approaches to e-paper displays may be used by other implementations of the e-paper 102. For instance, a bendable A4 sized display panel by LG Philips of South Korea reportedly measures 35.9-centimeters diagonally, is 0.3-millimeter thick, and may display up to 4,096 colors while maintaining the energy efficient qualities that inevitably come with using energy only when the image changes. Supporting e-paper display aspects may be further found in various technical documents such as International PCT Application Publication Nos. WO2007/111382; WO2006/040725; U.S. Published Patent Application Nos. 2007/0242033; 2007/0247422; 2008/0129647; and U.S. Pat. Nos. 6,577,496; 7,195,170.

Exemplary implementations of the system 100 may also include other instances of the e-paper 102, which may exchange information between each other through inter-intra information flows 103. The inter-intra information flows 103 may be supported through radio frequency communication, electrical surface contact, radio frequency identification (RFID), fiber optical, infrared, wireless network protocols, or other.

The system 100 may also include one or more instances of extra-e-paper assemblies (herein "external devices") 104, which may exchange information between each other through inter-extra information flows 105. One or more of the external devices 104 may receive information to one or more of the e-papers 102 through intra-extra information flow 106 and may send information to one or more of the e-papers through extra-intra information flow 108.

Figure 2:
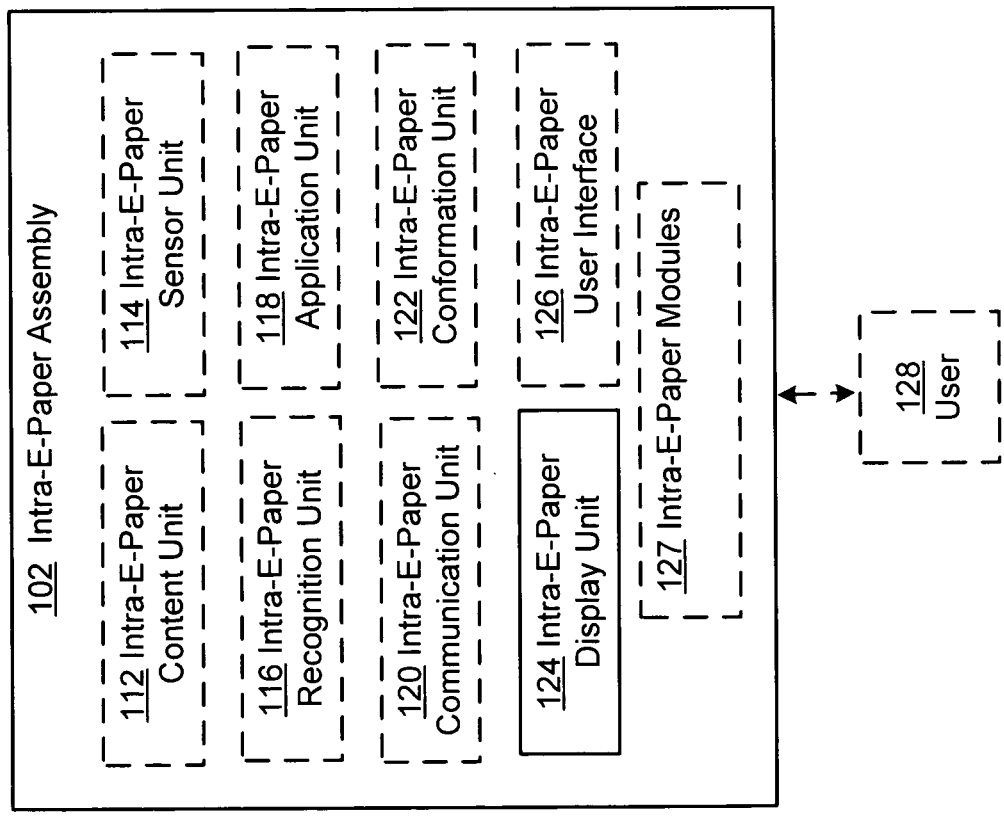
FIG. 2 is a block diagram of an exemplary implementation of the intra-e-paper assembly of FIG. 1 showing further detail.

An exemplary implementation of the e-paper 102 is shown in FIG. 2 as optionally having a content unit 112, a sensor unit 114, a recognition unit 116, an application unit 118, a communication unit 120, a conformation unit 122, a display unit 124, and a user interface 126. A user 128 is shown interacting with the e-paper 102 such as through visual information retrieval, physical manipulation of the e-paper, or other interaction.

Figure 3:
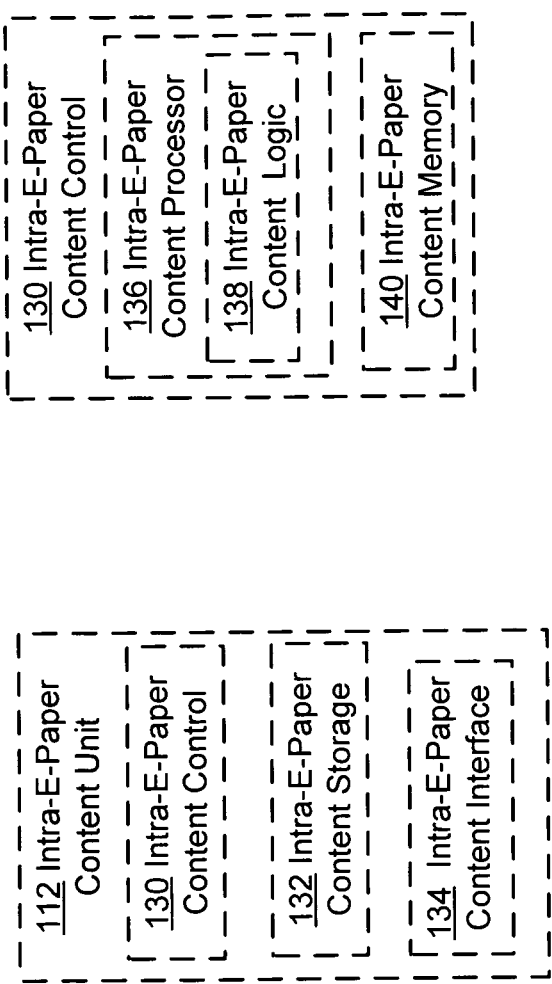
FIG. 3 is a block diagram showing detail of an exemplary implementation of a content unit of the exemplary implementation of the intra-e-paper assembly of FIG. 2.

An exemplary implementation of the content unit 112 is shown in FIG. 3 as optionally having a content control 130, a content storage 132, and a content interface 134. Further shown in FIG. 3, an exemplary implementation of the content control 130 optionally has a content processor 136 with a content logic 138, and a content memory 140.

Figure 4:
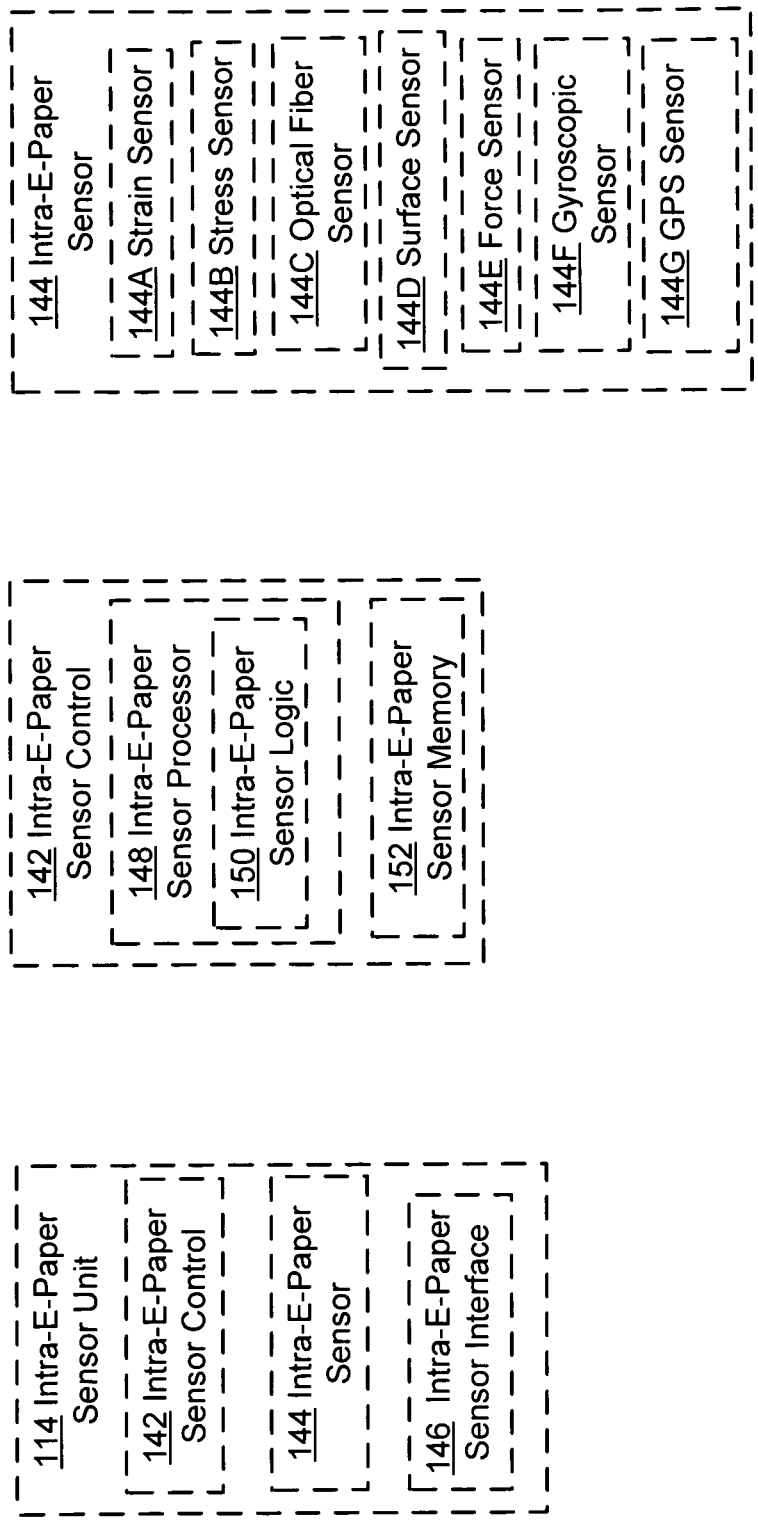
FIG. 4 is a block diagram showing detail of an exemplary implementation of a sensor unit of the exemplary implementation of the intra-e-paper assembly of FIG. 2.

An exemplary implementation of the sensor unit 114 is shown in FIG. 4 as optionally having a sensor control 142, a sensor 144, and a sensor interface 146. Further shown in FIG. 4, an exemplary implementation of the sensor control 142 optionally has a sensor processor 148 with a sensor logic 150, and a sensor memory 152. Further shown in FIG. 4 are exemplary implementations of the sensor 144 optionally including a strain sensor 144a, a stress sensor 144b, an optical fiber sensor 144c, a surface sensor 144d, a force sensor 144e, a gyroscopic sensor 144f, and a global positioning system (GPS) sensor 144g.

Figure 5:
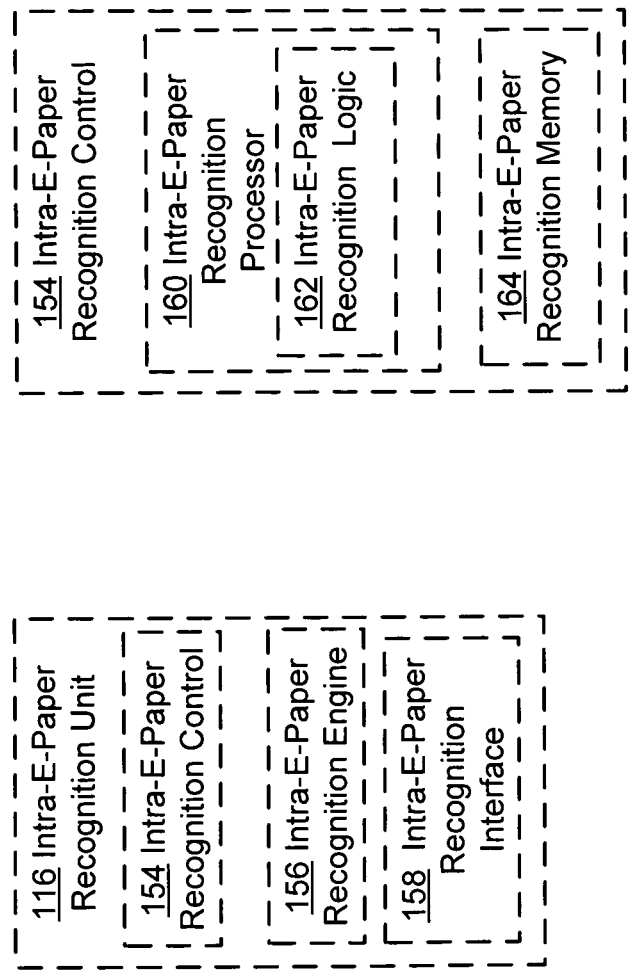
FIG. 5 is a block diagram showing detail of an exemplary implementation of a recognition unit of the exemplary implementation of the intra-e-paper assembly of FIG. 2.

An exemplary implementation of the recognition unit 116 is shown in FIG. 5 as optionally having a recognition control 154, a recognition engine 156, and a recognition interface 158. Further shown in FIG. 5, an exemplary implementation of the recognition control 154 optionally has a recognition processor 160 with a recognition logic 162, and a recognition memory 164.

Figure 6:
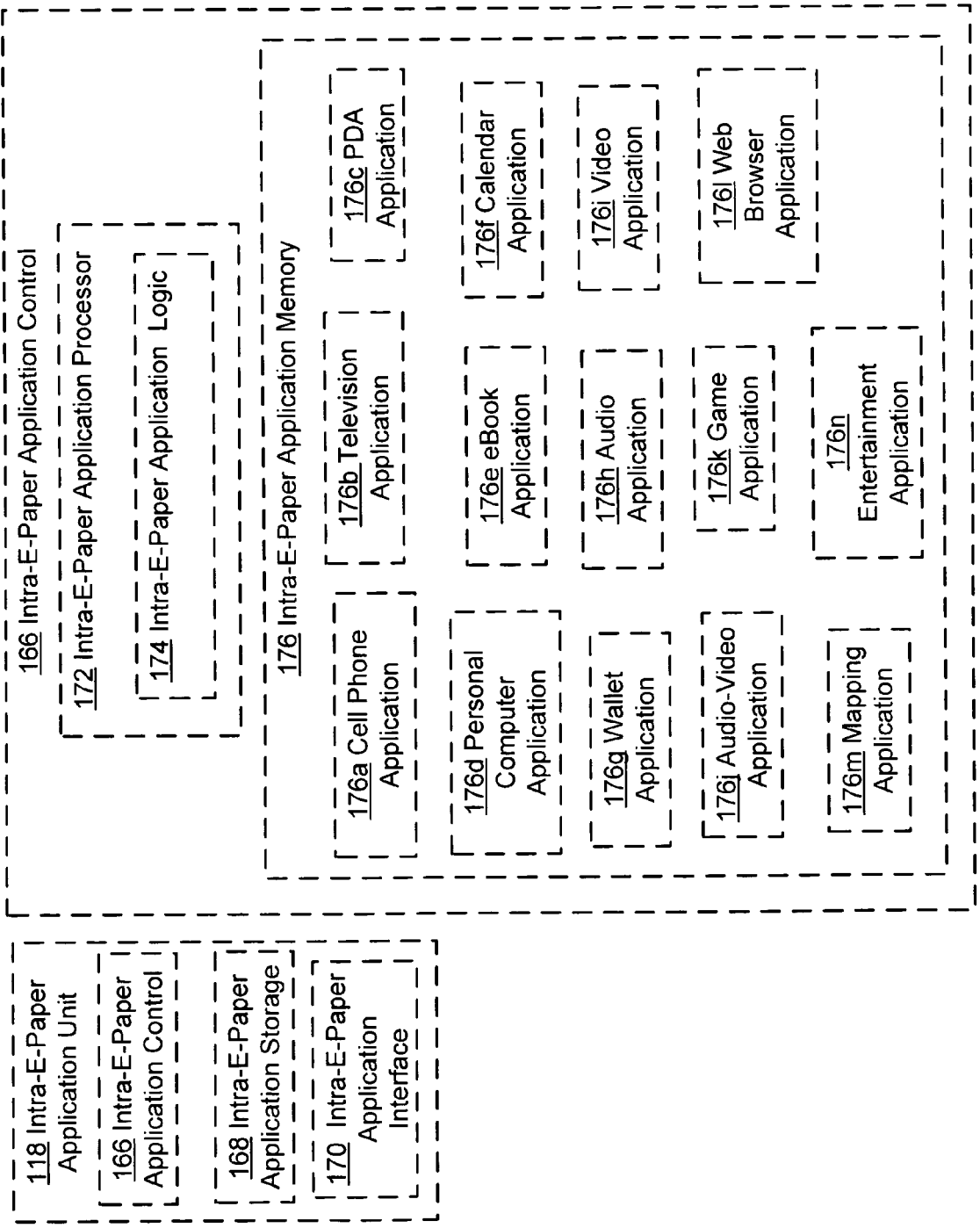
FIG. 6 is a block diagram showing detail of an exemplary implementation of an application unit of the exemplary implementation of the intra-e-paper assembly of FIG. 2.

An exemplary implementation of the application unit 118 is shown in FIG. 6 as optionally having an application control 166, an application storage 168, and an application interface 170. Further shown in FIG. 6, an exemplary implementation of the application control 166 optionally has an application processor 172 with an application logic 174, and an application memory 176. The application memory 176 is shown to optionally include a cell phone application 176a, a television application 176b, a PDA application 176c, a personal computer application 176d, an eBook application 176e, a calendar application 176f, a wallet application 176g, an audio application 176h, a video application 176i, an audio-video application 176j, a game application 176k, a web browser application 176l, a mapping application 176m, and an entertainment application 176n.

The cell phone application 176a may be configured to communicate through the application interface 170 with the communication unit 116 to allow for reception and transmission involved with establishing and conducting wireless cellular based phone calls through wireless portions of the communication receiver 180 and wireless portions of the communication transmitter 182. The cell phone application 176a may be configured to communicate with the display unit 124 to display graphic portions of the cellular call and control features of the cell phone application via the display hardware 204 through the display interface 206. Audio portions of cellular phone calls may be output from a speaker portion of the user interface transmitter 218 and may be input to a microphone portion of the user interface receiver 216 of the user interface unit 126 by the cell phone application 176a communicating with the user interface unit through the user interface control 214. The cell phone application 176a may communicate with touch input portions of the user interface receiver 216 through the user interface control 214 when combined with the display hardware 204 to furnish touch screen capability, softkeys, a directional pad, numeric keypad, and/or a thumb keyboard, etc.

The television application 176b may be configured to communicate through the application interface 170 with the communication unit 116 to allow for selection and reception of television programming through the communication receiver 180 either by wireless or by wired approaches. The television application 176b may be configured to communicate with the display unit 124 to display video portions of the television programming and control features of the television application via the display hardware 204 through the display interface 206. Audio portions of the television programming may be output from a speaker portion of the user interface transmitter 218 of the user interface unit 126 by the television application 176b communicating with the user interface unit through the user interface control 214. The television application 176b may communicate with touch input portions of the user interface receiver 216 through the user interface control 214 when combined with the display hardware 204 to furnish touch screen capability, softkeys, a directional pad, numeric keypad, and/or a thumb keyboard, etc.

The personal data assistant (PDA) application 176c may be configured to communicate with the display unit 124 to display graphic output portions and control features of the PDA application via the display hardware 204 through the display interface 206. Audio portions of the PDA application 176c may be output from a speaker portion of the user interface transmitter 218 and may be input to a microphone portion of the user interface receiver 216 of the user interface unit 126 by the PDA application communicating with the user interface unit through the user interface control 214. The PDA application 176c may communicate with touch input portions of the user interface receiver 216 through the user interface control 214 when combined with the display hardware 204 to furnish touch screen capability, softkeys, a directional pad, numeric keypad, and/or a thumb keyboard, etc. The PDA application 176c may include such functions as appointment calendar, to-do list, address book, text entry program, e-mail, and/or web browser support, etc.

The personal computer application 176d may be configured to communicate with the display unit 124 to display graphic output portions and control features of the personal computer application via the display hardware 204 through the display interface 206. Audio portions of the personal computer application 176d may be output from a speaker portion of the user interface transmitter 218 and may be input to a microphone portion of the user interface receiver 216 of the user interface unit 126 by the personal computer application 176d communicating with the user interface unit through the user interface control 214. The personal computer application 176d may communicate with touch input portions of the user interface receiver 216 through the user interface control 214 when combined with the display hardware 204 to furnish touch screen capability, softkeys, a directional pad, numeric keypad, and/or a thumb keyboard, etc. The personal computer application 176d may serve as a general purpose computer with computer programs being stored in the content storage 132 and being executed by through the application logic 174 of the application processor 172 while being contained in the application memory 176. The personal computer application 176*d* may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The eBook application 176*e* may be configured to communicate with the display unit 124 to display graphic output portions and control features of the eBook application via the display hardware 204 through the display interface 206. Audio portions of the eBook application 176*e* may be output from a speaker portion of the user interface transmitter 218 and may be input to a microphone portion of the user interface receiver 216 of the user interface unit 126 by the eBook application communicating with the user interface unit through the user interface control 214. The eBook application 176*e* may communicate with touch input portions of the user interface receiver 216 through the user interface control 214 when combined with the display hardware 204 to furnish touch screen capability, softkeys, a directional pad, numeric keypad, and/or a thumb keyboard, etc. The eBook application 176*e* may allow reader access through visual display by the display hardware 210 of textual and graphic content, such as books, periodicals, brochures, catalogs, etc., being stored in the content storage 132 of the content unit 112.

The calendar application 176*f* may be configured to communicate with the display unit 124 to display graphic output portions and control features of the calendar application via the display hardware 204 through the display interface 206. Audio portions of the calendar application 176*f* may be output from a speaker portion of the user interface transmitter 218 and may be input to a microphone portion of the user interface receiver 216 of the user interface unit 126 by the calendar application communicating with the user interface unit through the user interface control 214. The calendar application 176*f* may communicate with touch input portions of the user interface receiver 216 through the user interface control 214 when combined with the display hardware 204 to furnish touch screen capability, softkeys, a directional pad, numeric keypad, and/or a thumb keyboard, etc. The calendar application 176*f* may include such functions as appointment tracking, docketing functions, journal entries, etc.

The wallet application 176*g* may be configured to communicate with the display unit 124 to display graphic output portions and control features of the calendar application via the display hardware 204 through the display interface 206. Audio portions of the wallet application 176*g* may be output from a speaker portion of the user interface transmitter 218 and may be input to a microphone portion of the user interface receiver 216 of the user interface unit 126 by the wallet application communicating with the user interface unit through the user interface control 214. The wallet application 176*g* may communicate with touch input portions of the user interface receiver 216 through the user interface control 214 when combined with the display hardware 204 to furnish touch screen capability, softkeys, a directional pad, numeric keypad, and/or a thumb keyboard, etc. The wallet application 176*f* may include such functions as debit and credit card authorization control to replace or supplement physical debit and credit cards, financial transaction management of bank, savings, loan, and other financial accounts, payment management of various accounts, identification storage and management of personal and other identification including financial, medical, passport, and other identification, and photo storage and management of personal and other photos, etc.

The audio application 176*h* may be configured to communicate with the display unit 124 to display graphic output portions and control features of the audio application via the display hardware 204 through the display interface 206. Audio portions of the audio application 176*h* may be output from a speaker portion of the user interface transmitter 218 and may be input to a microphone portion of the user interface receiver 216 of the user interface unit 126 by the audio application communicating with the user interface unit through the user interface control 214. The audio application 176*h* may communicate with touch input portions of the user interface receiver 216 through the user interface control 214 when combined with the display hardware 204 to furnish touch screen capability, softkeys, a directional pad, numeric keypad, and/or a thumb keyboard, etc. The audio application 176*e* may allow listener access through the speaker portion of the user interface transmitter 218 of audio content being stored in the content storage 132 of the content unit 112.

The video application 176*i* may be configured to communicate with the display unit 124 to display graphic output portions and control features of the video application via the display hardware 204 through the display interface 206. The video application 176*i* may communicate with touch input portions of the user interface receiver 216 through the user interface control 214 when combined with the display hardware 204 to furnish touch screen capability, softkeys, a directional pad, numeric keypad, and/or a thumb keyboard, etc. The video application 176*i* may allow viewer access through the display hardware 204 via a video portion of the user interface transmitter 218 to video content being stored in the content storage 132 of the content unit 112.

The audio-video application 176*j* may be configured to communicate with the display unit 124 to display graphic and video output portions and control features of the audio-video application via the display hardware 204 through the display interface 206. Audio portions of the audio-video application 176*j* may be output from a speaker portion of the user interface transmitter 218 and may be input to a microphone portion of the user interface receiver 216 of the user interface unit 126 by the audio-video application communicating with the user interface unit through the user interface control 214. The audio-video application 176*j* may communicate with touch input portions of the user interface receiver 216 through the user interface control 214 when combined with the display hardware 204 to furnish touch screen capability, softkeys, a directional pad, numeric keypad, and/or a thumb keyboard, etc. The audio-video application 176*j* may allow user access through visual display by the display hardware 210 of textual and graphic content being stored in the content storage 132 of the content unit 112 and through audio output of the speaker portion of the user interface transmitter 218 of audio content being stored in the content storage.

The game application 176*k* may be configured to communicate with the display unit 124 to display graphic output portions and control features of the game application via the display hardware 204 through the display interface 206. Audio portions of the game application 176*k* may be output from a speaker portion of the user interface transmitter 218 and may be input to a microphone portion of the user interface receiver 216 of the user interface unit 126 by the game application communicating with the user interface unit through the user interface control 214. The game application 176*k* may communicate with touch input portions of the user interface receiver 216 through the user interface control 214 when combined with the display hardware 204 to furnish touch screen capability, softkeys, a directional pad, numeric keypad, and/or a thumb keyboard, etc. The game application 176k may allow gamer access through visual display by the display hardware 210 of textual and graphic content being stored in the content storage 132 of the content unit 112 and through audio output of the speaker portion of the user interface transmitter 218 of audio content being stored in the content storage. The game application 176k may include arcade, racing, strategy, educational, board, sports, and/or other sorts of game types.

The web browser application 176l may be configured to communicate with the display unit 124 to display graphic output portions and control features of the web browser via the display hardware 204 through the display interface 206. Audio portions of the web browser application 176l may be output from a speaker portion of the user interface transmitter 218 and may be input to a microphone portion of the user interface receiver 216 of the user interface unit 126 by the web browser application communicating with the user interface unit through the user interface control 214. The web browser application 176l may communicate with touch input portions of the user interface receiver 216 through the user interface control 214 when combined with the display hardware 204 to furnish touch screen capability, softkeys, a directional pad, numeric keypad, and/or a thumb keyboard, etc. The web browser application 176l may serve as a web browser to the Internet with one or more web browser programs being stored in the content storage 132 and being executed by through the application logic 174 of the application processor 172 while being contained in the application memory 176. The web browser application 176l may be configured to communicate through the application interface 170 with the communication unit 116 to allow for reception and transmission involved with establishing and conducting wireless or wired access to computer networks (such as the Internet) through portions of the communication receiver 180 and wireless portions of the communication transmitter 182.

The mapping application 176m may be configured to communicate with the display unit 124 to display graphic output portions and control features of the mapping application via the display hardware 204 through the display interface 206. Audio portions of the mapping application 176d may be output from a speaker portion of the user interface transmitter 218 and may be input to a microphone portion of the user interface receiver 216 of the user interface unit 126 by the personal computer application 176d communicating with the user interface unit through the user interface control 214. The mapping application 176m may communicate with touch input portions of the user interface receiver 216 through the user interface control 214 when combined with the display hardware 204 to furnish touch screen capability, softkeys, a directional pad, numeric keypad, and/or a thumb keyboard, etc. The mapping application 176m may be in communication with the GPS sensor 144g of the sensor unit 114 to receive position data to be shown on a map displayed on the display hardware 210.

The entertainment application 176n may be configured to communicate with the display unit 124 to display graphic and video output portions and control features of the entertainment application 176n application via the display hardware 204 through the display interface 206. Audio portions of the entertainment application 176n may be output from a speaker portion of the user interface transmitter 218 and may be input to a microphone portion of the user interface receiver 216 of the user interface unit 126 by the entertainment application communicating with the user interface unit through the user interface control 214. The entertainment application 176n may communicate with touch input portions of the user interface receiver 216 through the user interface control 214 when combined with the display hardware 204 to furnish touch screen capability, softkeys, a directional pad, numeric keypad, and/or a thumb keyboard, etc. The entertainment application 176n may allow user access through visual display by the display hardware 210 of entertainment type textual, graphic, video, and/or other content being stored in the content storage 132 of the content unit 112 and through audio output of the speaker portion of the user interface transmitter 218 of audio content being stored in the content storage. Entertainment type content may utilize audio, video, and/or audio-video capabilities, for example, such as playing of shows, movies, documentaries, etc; serving as a user interface to an interactive computer program, an interactive communication interface, an interactive music device, an interactive training device, an interactive exercise device, an interactive pet device, an interactive tourism device, an interactive social networking device, an interactive safety device, an interactive monitoring device, an interactive reference device and/or other interactive device.

Figure 7:
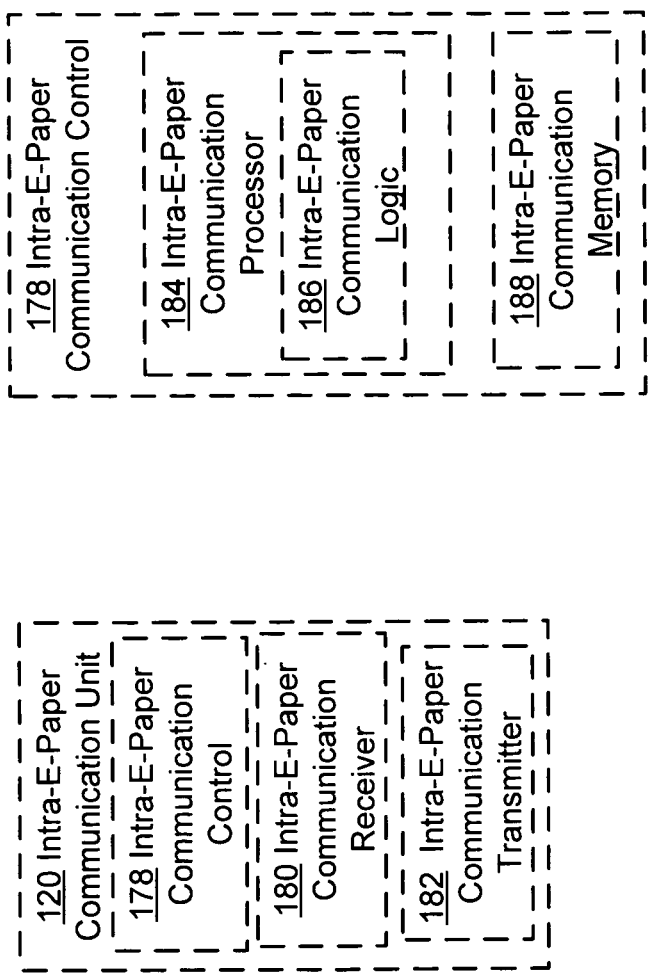
FIG. 7 is a block diagram showing detail of an exemplary implementation of a communication unit of the exemplary implementation of the intra-e-paper assembly of FIG. 2.

An exemplary implementation of the communication unit 120 is shown in FIG. 7 as optionally having a communication control 178, a communication receiver 180, and a communication transmitter 182. Further shown in FIG. 7, an exemplary implementation of the communication control 178 optionally has a communication processor 184 with a communication logic 186, and a communication memory 188.

Figure 8:
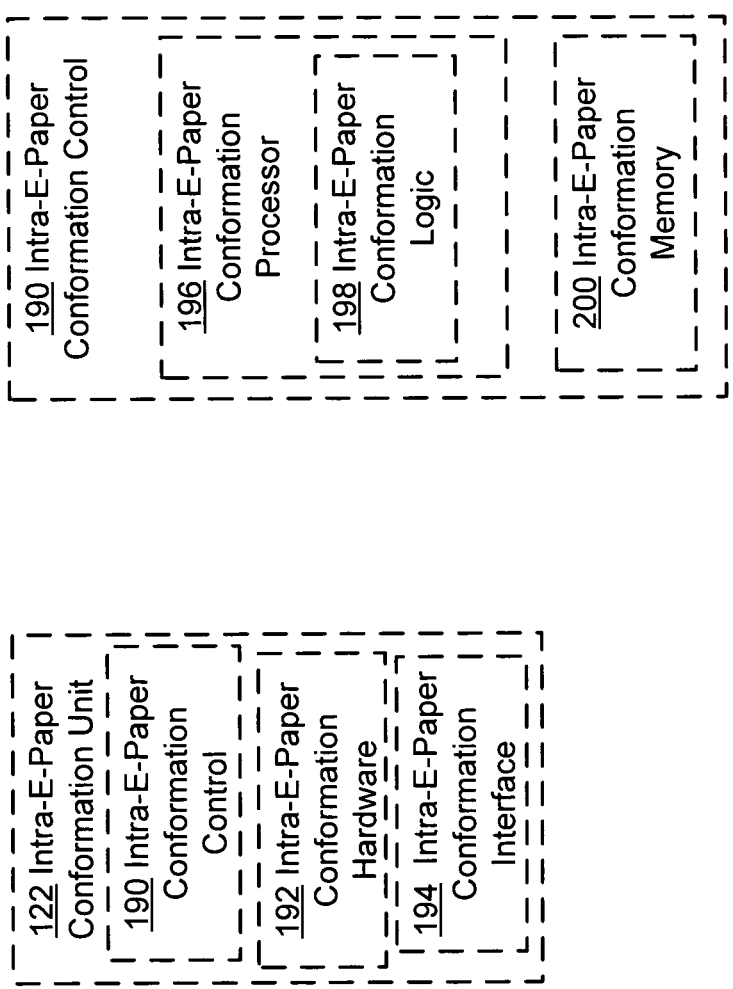
FIG. 8 is a block diagram showing detail of an exemplary implementation of a conformation unit of the exemplary implementation of the intra-e-paper assembly of FIG. 2.

An exemplary implementation of the conformation unit 122 is shown in FIG. 8 as optionally having a conformation control 190, conformation hardware 192, and a conformation interface 194. Further shown in FIG. 8, an exemplary implementation of the conformation control 190 optionally has a conformation processor 196 with a conformation logic 198, and a conformation memory 200.

Figure 9:
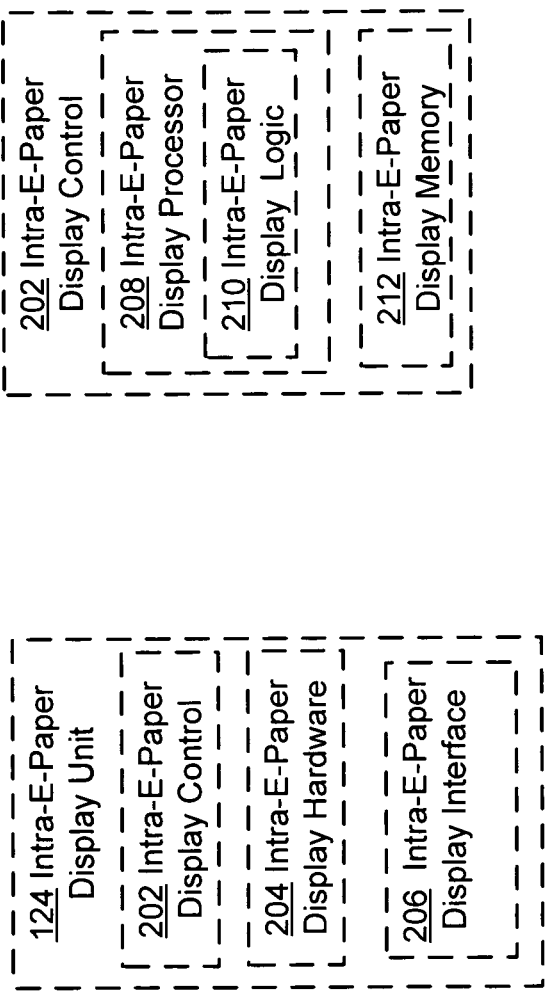
FIG. 9 is a block diagram showing detail of an exemplary implementation of a display unit of the exemplary implementation of the intra-e-paper assembly of FIG. 2.

An exemplary implementation of the display unit 124 is shown in FIG. 9 as optionally having a display control 202, display hardware 204, and a display interface 206. Further shown in FIG. 9, an exemplary implementation of the display control 202 optionally has a display processor 208 with a display logic 210, and a display memory 212.

An exemplary implementation of the user interface unit 126 is shown in FIG. 10 as optionally having a user interface control 214, user interface receiver 216, and a user interface transmitter 218. Further shown in FIG. 10, an exemplary implementation of the user interface control 202 optionally has a user interface processor 220 with a user interface logic 222, and a user interface memory 224.

Exemplary implementations of modules of the intra-e-paper modules 127 of the user interface unit 126 is shown in FIG. 11 as optionally having a conformation sensor module 302, a display control module 304, a conformation detection module 306, a conformation strain module 308, a conformation stress module 310, a conformation calibration module 312, a conformation pattern module 314, a surface contact module 316, a conformation sequence module 318, a conformation geometry module 320, a conformation indicia module 324, an optical fiber module 326, a conformation association module 328, a conformation signal module 330, a conformation selection module 332, an origami-like folding module 334, a folding sequence module 336, an origami-like shape module 338, a bend angle module 342, a bend number module 344, a conformation force module 346, a conformation transient module 348, a conformation persistent module 350, a conformation gesture module 356, a conformation connection module 357, a conformation draping module 358, a conformation wrapping module 359, a conformation curvilinear module 360, a conformation rolling module 361, a conformation hinge module 362, a bend radius module 363, a fold ratio module 364, and an other modules 365.

The conformation sensor module 302 is configured to direct acquisition of first information such as one or more conformation sensor modules configured to direct obtaining information associated with one or more sequences of two or more conformations of one or more portions of one or more regions of a bendable display containing electronic device such as the e-paper 102 of FIG. 2.

Figure 19:
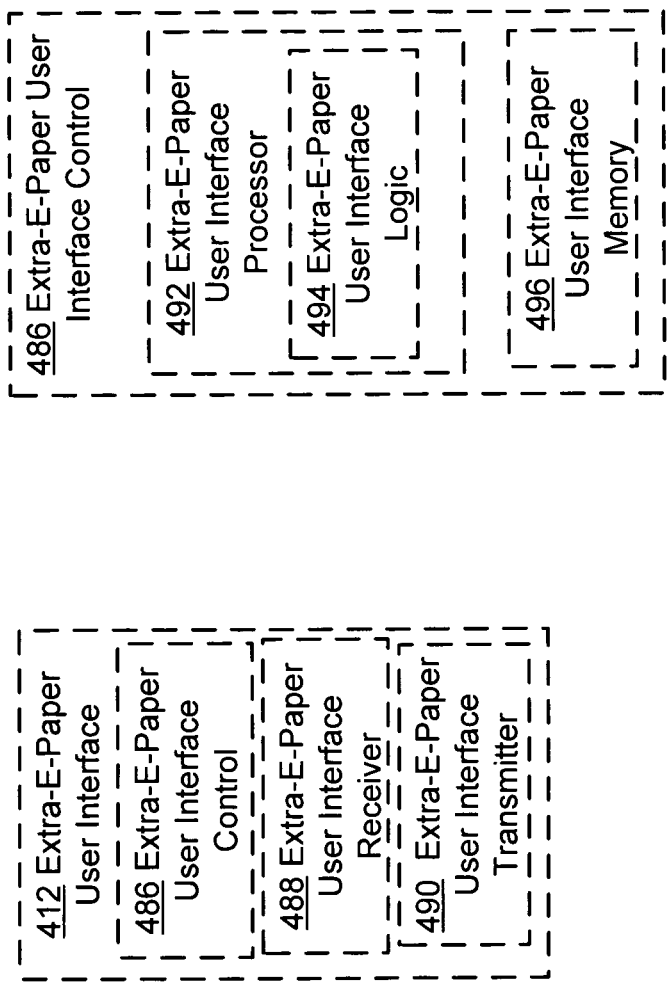
FIG. 19 is a block diagram showing detail of an exemplary implementation of a user interface unit of the exemplary implementation of the extra-e-paper assembly of FIG. 13.

The display control module 304 of FIG. 11 is configured to direct control of display of one or more portions such as display portions 608 of FIG. 19, of an electronic paper assembly or other bendable display containing electronic device, such as the e-paper 102 of FIG. 2, regarding display of second information in response to the first information associated with the one or more conformations of the one or more portions of the one or more regions of the electronic paper assembly or other bendable display containing electronic device.

The coordination module 305 of FIG. 11 is configured to coordinate such as one or more coordination modules configured to direct coordinating the one or more sequences of two or more conformations of one or more portions of one or more regions of the electronic paper assembly or other bendable display containing electronic device with one or more commands such as the e-paper 102 of FIG. 2.

The conformation detection module 306 is configured to direct acquisition of detection information such as one or more conformation detection modules configured to direct detecting one or more sequences of two or more conformations of one or more portions of one or more regions of the bendable display containing electronic device such as the regions 604 of the exemplary implementation 602 of the e-paper 102 of FIG. 20.

The conformation strain module 308 is configured to direct acquisition of strain information such as one or more conformation strain modules configured to direct obtaining strain information associated with one or more sequences of two or more conformations of one or more portions of one or more regions of the bendable display containing electronic device such as the regions 604 of the exemplary implementation 602 of the e-paper 102 of FIG. 20.

The conformation stress module 310 is configured to direct acquisition of stress information such as one or more conformation stress modules configured to direct obtaining stress information associated with one or more sequences of two or more conformations of one or more portions of one or more regions of the bendable display containing electronic device such as the regions 604 of the exemplary implementation 602 of the e-paper 102 of FIG. 20.

The conformation calibration module 312 is configured to direct acquisition of calibration related information such as one or more conformation calibration modules configured to direct obtaining calibration related information associated with one or more sequences of two or more conformations of one or more portions of one or more regions of the bendable display containing electronic device such as the regions 604 of the exemplary implementation 602 of the e-paper 102 of FIG. 20.

The conformation pattern module 314 configured to direct acquisition of pattern information such as one or more conformation pattern modules configured to direct obtaining pattern information associated with one or more sequences of two or more conformations of one or more portions of one or more regions of the bendable display containing electronic device such as the regions 604 of the exemplary implementation 602 of the e-paper 102 of FIG. 20.

The surface contact module 316 is configured to direct acquisition of surface contact information such as one or more surface contact modules configured to direct obtaining surface contact information associated with one or more sequences of two or more conformations of one or more portions of one or more regions of the bendable display containing electronic device such as the regions 604 of the exemplary implementation 602 of the e-paper 102 of FIG. 20.

The conformation sequence module 318 is configured to direct acquisition of sequence information such as one or more conformation sequence modules configured to direct obtaining sequence information associated with two or more sequences of two or more conformations of one or more portions of one or more regions of the bendable display containing electronic device such as the regions 604 of the exemplary implementation 602 of the e-paper 102 of FIG. 20.

The conformation geometry module 320 is configured to direct acquisition of geometrical information such as one or more conformation geometry modules configured to direct obtaining geometrical information associated with one or more sequences of two or more conformations of one or more portions of one or more regions of the bendable display containing electronic device such as the regions 604 of the exemplary implementation 602 of the e-paper 102 of FIG. 20.

The conformation indicia module 324 is configured to direct acquisition of indicia information such as one or more conformation indicia modules configured to direct obtaining information related to predetermined indicia associated with one or more sequences of two or more conformations of one or more portions of one or more regions of the bendable display containing electronic device such as the regions 604 of the exemplary implementation 602 of the e-paper 102 of FIG. 20. Predetermined indicia could be stored in the sensor memory 152 of the sensor control 142 of the sensor 114 and may be related to one or more measurement results of one or more readings by one or more of the sensors 144. One or more measurement results by one or more of the sensors 144 could thus be characterized by the predetermined indicia. Predetermined indicia could be stored in the recognition memory 164 of the recognition control 154 of the recognition unit 116 and may be related to one or more recognition results of the recognition engine 156. One or more recognition results by the recognition engine 156 could thus be characterized by the predetermined indicia.

The optical fiber module 326 is configured to direct acquisition of optical fiber derived information such as one or more optical fiber modules configured to direct obtaining optical fiber derived information associated with one or more sequences of two or more conformations of one or more portions of one or more regions of the bendable display containing electronic device such as the regions 604 of the exemplary implementation 602 of the e-paper 102 of FIG. 20.

The conformation association module 328 is configured to direct acquisition of association information such as one or more conformation association modules configured to direct obtaining information based on one or more sequences of one or more associations between two or more of the portions of the one or more regions of the bendable display containing electronic device associated with the two or more conformations of the one or more portions of the one or more regions of the bendable display containing electronic device such as the regions 604 of the exemplary implementation 602 of the e-paper 102 of FIG. 20.

The conformation signal module 330 is configured to direct acquisition of signals such as one or more conformation signal modules configured to direct receiving signals from embedded sensors such as one or more of the sensors 144 of FIG. 4.

The conformation selection module 332 is configured to direct acquisition of selection information such as one or more conformation selection modules configured to direct obtaining selection information associated with one or more sequences of two or more conformations of one or more portions of one or more regions of the bendable display containing electronic device associated with one or more conformations of one or more portions of one or more regions of the electronic paper assembly or other bendable display containing electronic device.

The origami-like folding module 334 is configured to direct acquisition of origami-like folding information (the term "origami-like" may include any sort of information related to one or more shaped object representations involving through geometric fold and/or crease patterns without gluing or cutting, such as origami, zhezhi, etc.) such as one or more origami-like folding modules configured to direct obtaining origami-like folding information associated with one or more sequences of two or more conformations of one or more portions of one or more regions of the bendable display containing electronic device such as the regions 604 of the exemplary implementation 602 of the e-paper 102 of FIG. 20.

The folding sequence module 336 is configured to direct acquisition of a folding sequence order such as one or more folding sequence modules configured to direct obtaining one or more orders of folding sequences of one or more portions of one or more regions of the bendable display containing electronic device such as the regions 604 of the exemplary implementation 602 of the e-paper 102 of FIG. 20.

The origami-like shape module 338 is configured to direct acquisition of an origami-like resultant shape information such as one or more origami-like shape modules configured to direct obtaining origami-like resultant shape information associated with one or more sequences of two or more origami-like shapes resultant from one or more folding sequences of one or more portions of one or more regions of the bendable display containing electronic device such as the regions 604 of the exemplary implementation 602 of the e-paper 102 of FIG. 20.

The bend angle module 342 is configured to direct acquisition of angle of bend information such as one or more bend angle modules configured to direct obtaining angle of bend information associated with one or more sequences of two or more conformations of one or more portions of one or more regions of the bendable display containing electronic device such as the regions 604 of the exemplary implementation 602 of the e-paper 102 of FIG. 20.

The bend number module 344 is configured to direct acquisition of bend number information such as one or more bend number modules configured to direct obtaining bend number information associated with one or more sequences of two or more conformations of one or more portions of one or more regions of the bendable display containing electronic device such as the regions 604 of the exemplary implementation 602 of the e-paper 102 of FIG. 20. Bend number information may be related to the number of folds or bends that a particular conformation my have in general and/or may also relate to the number of various type of folds or bonds such as based upon the orientation and/or extent of each of the folds or bends.

The conformation force module 346 is configured to direct acquisition of force information such as one or more conformation force modules configured to direct obtaining force information associated with one or more sequences of two or more conformations of one or more portions of one or more regions of the bendable display containing electronic device such as the regions 604 of the exemplary implementation 602 of the e-paper 102 of FIG. 20.

The conformation transient module 348 is configured to direct acquisition of substantially transient information such as one or more conformation transient modules configured to direct obtaining substantially transient information associated with one or more sequences of two or more conformations of one or more portions of one or more regions of the bendable display containing electronic device such as the regions 604 of the exemplary implementation 602 of the e-paper 102 of FIG. 20.

The conformation persistent module 350 is configured to direct acquisition of substantially persistent information such as one or more conformation persistent modules configured to direct obtaining substantially persistent information associated with one or more sequences of two or more conformations of one or more portions of one or more regions of the bendable display containing electronic device such as the regions 604 of the exemplary implementation 602 of the e-paper 102 of FIG. 20. Transient conformations and persistent conformations may be relative to one another depending upon the context or environment that the e-paper 102 is found in. In general, transient may mean lasting a short time whereas persistent may be defined as existing or remaining in the same shape for an indefinitely long time. For instance, in the context of reading the e-paper 102, a flick of the e-paper may cause a brief conformation during the flicking action as compared to a conformation in which the e-paper is being read. Relatively speaking, in the context of the reading, the flicking action may be viewed as transient whereas the conformation during reading of the e-paper 102 may be viewed as persistent. In another context, a transition from one conformation to another of the e-paper 102 may be viewed as a series of transient conformations whereas the before and after conformations subject to the change may be viewed as persistent. In some contexts transient could be in terms of seconds and persistent would be in terms of minutes. In other contexts transient could be in terms of minutes and persistent would be in terms of hours. In other contexts transient could be in terms of hours and persistent could be in terms of days. In other contexts transient could be in terms of fractions of seconds and persistent in terms of seconds. Other contexts may also be envisioned as being applicable. In some implementations duration parameters characterizing transient and persistent could be predetermined by the user 128 of the e-paper 102 and stored in the conformation memory 200.

The conformation gesture module 356 is configured to direct acquisition of gestured information such as one or more conformation gesture modules configured to direct obtaining gestured information associated with one or more sequences of two or more conformations of one or more portions of one or more regions of the bendable display containing electronic device such as the regions 604 of the exemplary implementation 602 of the e-paper 102 of FIG. 20.

The conformation connection module 357 is configured to direct acquisition of connection information such as one or more conformation connection modules configured to direct obtaining connection sequence information of one or more sequences of two or more connections between two or more of the portions of the one or more regions of the bendable display containing electronic device associated with one or more sequences of two or more conformations of one or more portions of one or more regions of the bendable display containing electronic device such as the regions 604 of the exemplary implementation 602 of the e-paper 102 of FIG. 20.

The conformation draping module 358 is configured to direct acquisition of draping information such as one or more conformation draping modules configured to direct obtaining draping information associated with one or more sequences of two or more conformations of one or more portions of one or more regions of the bendable display containing electronic device such as the regions 604 of the exemplary implementation 602 of the e-paper 102 of FIG. 20.

The conformation wrapping module 359 is configured to direct acquisition of wrapping information such as one or more conformation wrapping modules configured to direct obtaining wrapping information associated with one or more sequences of two or more conformations of one or more portions of one or more regions of the bendable display containing electronic device such as the regions 604 of the exemplary implementation 602 of the e-paper 102 of FIG. 20.

The conformation curvilinear module 360 is configured to direct acquisition of curvilinear information such as one or more conformation curvilinear modules configured to direct obtaining information derived through sensing one or more sequences of two or more curvilinear patterns of force imparted upon one or more portions of one or more regions of the bendable display containing electronic device such as the regions 604 of the exemplary implementation 602 of the e-paper 102 of FIG. 20.

The conformation rolling module 361 is configured to direct acquisition of rolling information such as one or more conformation rolling modules configured to direct obtaining rolling information associated with one or more sequences of two or more conformations of one or more portions of one or more regions of the bendable display containing electronic device such as the regions 604 of the exemplary implementation 602 of the e-paper 102 of FIG. 20.

The conformation hinge module 362 is configured to direct acquisition of hinge status information such as one or more conformation hinge modules configured to direct obtaining hinge status information associated with one or more sequences of two or more conformations of one or more portions of one or more regions of the bendable display containing electronic device such as the regions 604 of the exemplary implementation 602 of the e-paper 102 of FIG. 20.

The bend radius module 363 is configured to direct filtering of information based upon radius of bend such as one or more bend radius modules configured to direct filtering information based upon radius of bend associated with one or more sequences of two or more conformations of one or more portions of one or more regions of the bendable display containing electronic device such as the regions 604 of the exemplary implementation 602 of the e-paper 102 of FIG. 20.

The fold ratio module 364 is configured to direct acquisition of folded to unfolded ratio information such as one or more conformation fold ratio modules configured to direct obtaining folded to unfolded ratio information associated with one or more sequences of two or more conformations of one or more portions of one or more regions of the bendable display containing electronic device such as the regions 604 of the exemplary implementation 602 of the e-paper 102 of FIG. 20.

Figure 12:
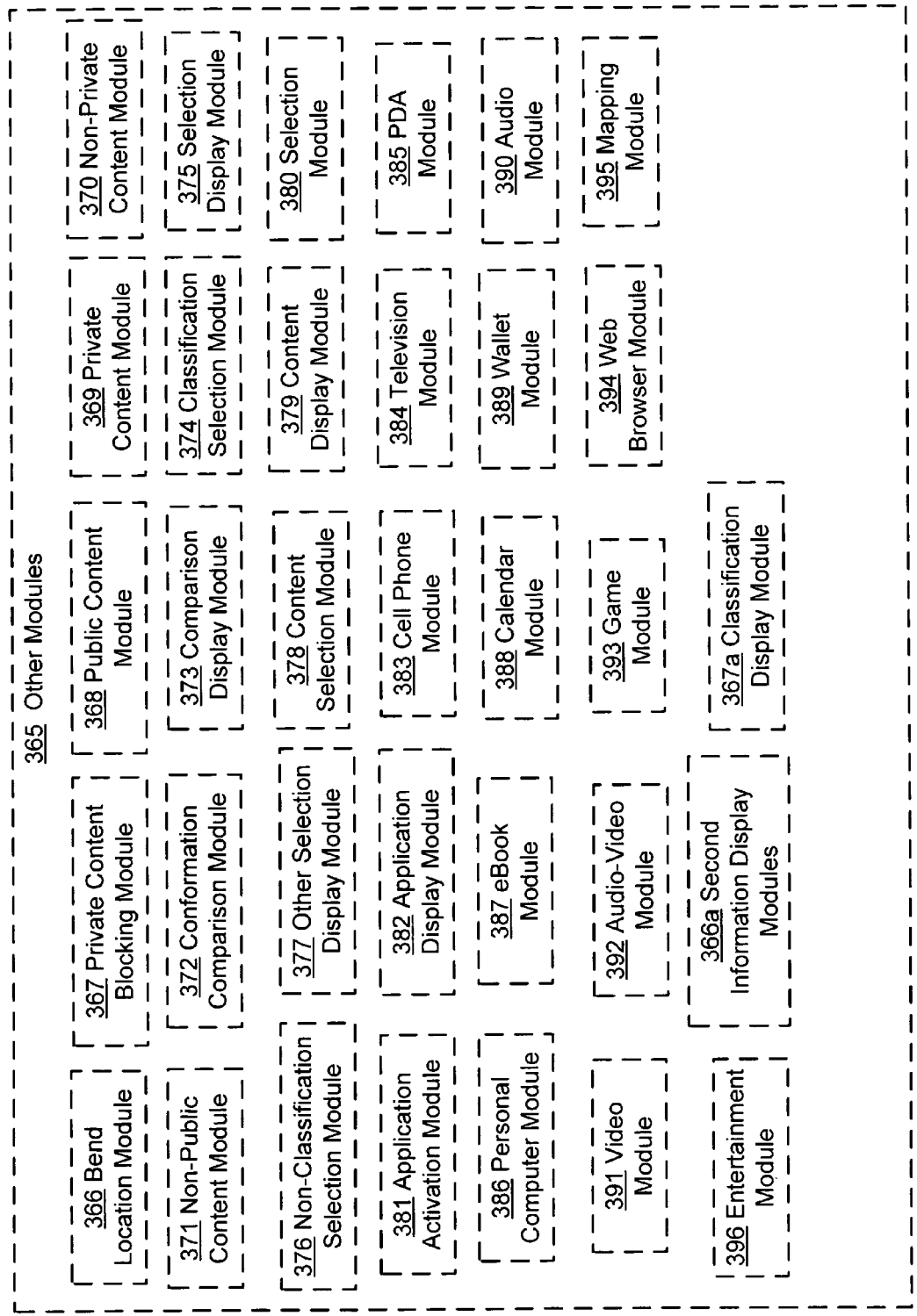
FIG. 12 is a block diagram showing detail of exemplary implementations of intra-e-paper modules of the exemplary implementation of the intra-e-paper assembly of FIG. 2.

An exemplary implementation of the other modules 365 is shown in FIG. 12 as optionally having a bend location module 366, a second information display module 366a, a content selection module 367, a classification display module 367a, a content display module 368, a selection module 369, an application activation module 370, an application display module 371, a cell phone module 372, a television module 373, a personal data assistant (PDA) module 374, a personal computer module 375, an eBook module 376, a calendar module 377, a wallet module 378, an audio module 379, a video module 380, an audio-video module 381, a game module 382, a web browser module 383, a mapping module 384, and an entertainment module 385.

The bend location module 366 is configured to direct acquisition of bend location information such as one or more bend location modules configured to direct obtaining bend location information associated with one or more sequences of two or more conformations of one or more portions of one or more regions of the bendable display containing electronic device such as the regions 604 of the exemplary implementation 602 of the e-paper 102 of FIG. 20.

The second information display module 366a is configured to direct display such as one or more second information display modules configured to direct displaying the second information as having one or more classifications.

The private content module blocking module 367 is configured to direct display of public content, such as public content 622 of FIG. 23, on one or more portions of a surface display portion, such as surface display 608c of FIG. 21, viewable from a display surface, such as display surface 612 of FIG. 23, and to block an internal display portion, such as internal display portion 608c of FIG. 21, from displaying private content, such as private content 520 of FIG. 23, that would otherwise be viewed from the display surface, such as the display surface 612, from being viewed from the display surface.

The public content module 368 is configured to direct display of public content, such as public content 622 of FIG. 23, on one or more portions, such as surface display portion 608c of FIG. 21.

The private content module 369 is configured to direct display of private content, such as private content 620 of FIG. 23, on one or more portions, such as the surface display portion 608a of FIG. 21.

The non-private content module 370 is configured to direct display of other than private content, such as public content 622 of FIG. 23, on one or more portions, such as surface display portion 608c of FIG. 21.

The non-public content module 371 is configured to direct display of other than public content, such as private content 620 of FIG. 23, on one or more portions, such as surface display portion 608a of FIG. 21.

The conformation comparison module 372 is configured to direct comparing of stored data, such as data stored in the conformation logic 198 of FIG. 8, with the first information associated with one or more conformations of one or more portions of one or more regions of the electronic paper assembly or other bendable display containing electronic device such as the regions 604 of the exemplary implementation 602 of the e-paper 102 of FIG. 20.

The comparison display module 373 is configured to direct displaying on one or more portions, such as display portions 608, in response to the comparing of stored data with the one or more conformations of one or more portions of one or more regions of the electronic paper assembly or other bendable display containing electronic device, such as the regions 604 of the exemplary implementation 602 of the e-paper 102 of FIG. 20.

The classification selection module 374 is configured to direct selecting one or more of the classifications, such as private content 620 and/or public content 622 of FIG. 23 of the second information having one or more classifications.

The selection display module 375 is configured to direct displaying on one or more portions, such as display portions 608 of FIG. 23, in response to the one or more classification selection modules directing selecting one or more of the classifications, such as private content 620 and/or public content 622 of FIG. 23 of the second information having one or more classifications.

The non-classification selection module 376 is configured to direct selecting other than one or more of the classifications, such as other than private content 620 and/or public content 622 of FIG. 23 of the second information having one or more classifications.

The other selection display module 377 is configured to direct displaying on one or more portions, such as display portions 608 of FIG. 21, in response to the selecting other than one or more of the classifications of the second information having one or more classifications.

The content selection module 378 is configured to direct selection such as selecting content to be displayed based upon the obtaining information associated with one or more sequences of two or more conformations of one or more portions of one or more regions of the electronic paper assembly or other bendable display containing electronic device such as public content 622 of FIG. 23, on one or more portions, such as surface display 608c of FIG. 21.

The content display module 379 is configured to direct display of content such as displaying the content to be displayed on one or more portions of one or more display portions such as public content 622 of FIG. 23, on one or more portions, such as surface display portion 608c of FIG. 21.

The selection module 380 is configured to select one or more display portions for display of the selected content such as selecting one or more portions to display one or more content based upon the obtaining information associated with one or more sequences of two or more conformations of one or more portions of one or more regions of the electronic paper assembly or other bendable display containing electronic device such as private content 620 of FIG. 23, on one or more portions, such as the surface display portion 608a of FIG. 21.

The application activation module 381 is configured to activate one or more applications such as activating one or more portions of one or more applications based upon the obtaining information associated with one or more sequences of two or more conformations of one or more portions of one or more regions of the electronic paper assembly or other bendable display containing electronic device contained in the application storage 168 through the application control 166 of the application unit 118 of FIG. 6.

The application display module 382 is configured to direct display of one or more activated applications such as for each of the one or more activated applications, displaying one or more output from the activated application on one or more display portions such as surface display portion 608a of FIG. 21.

The cell phone module 383 is configured to provide cell phone functionality in response to the application activation module 370 activating one or more portions of one or more cell phone applications.

The television module 384 is configured to provide television functionality in response to the application activation module 370 activating one or more portions of one or more television applications.

The personal digital assistant (PDA) module 385 is configured to provide PDA functionality in response to the application activation module 370 activating one or more portions of one or more personal digital assistant (PDA) applications.

The personal computer module 386 is configured to provide personal computer functionality in response to the application activation module 370 activating one or more portions of one or more personal computer applications.

The eBook module 387 is configured to provide eBook functionality in response to the application activation module 370 activating one or more portions of one or more eBook applications.

The calendar module 388 is configured to calendaring functionality in response to the application activation module 370 activating one or more portions of one or more calendar applications.

The wallet module 389 is configured to provide wallet-like functionality in response to the application activation module 370 activating one or more portions of one or more wallet applications.

The audio module 390 is configured to provide audio functionality in response to the application activation module 370 activating one or more portions of one or more audio applications.

The video module 391 is configured to provide video functionality in response to the application activation module 370 activating one or more portions of one or more video applications.

The audio-video module 392 is configured to provide audio-video functionality in response to the application activation module 370 activating one or more portions of one or more audio-video applications.

The game module 393 is configured to provide game functionality in response to the application activation module 370 activating one or more portions of one or more game applications.

The web browser module 394 is configured to provide web browser functionality in response to the application activation module 370 activating one or more portions of one or more web browser applications.

The mapping module 395 is configured to provide mapping functionality in response to the application activation module 370 activating one or more portions of one or more mapping applications.

The entertainment module 396 is configured to provide entertainment functionality in response to the application activation module 370 activating one or more portions of one or more entertainment applications.

Figure 13:
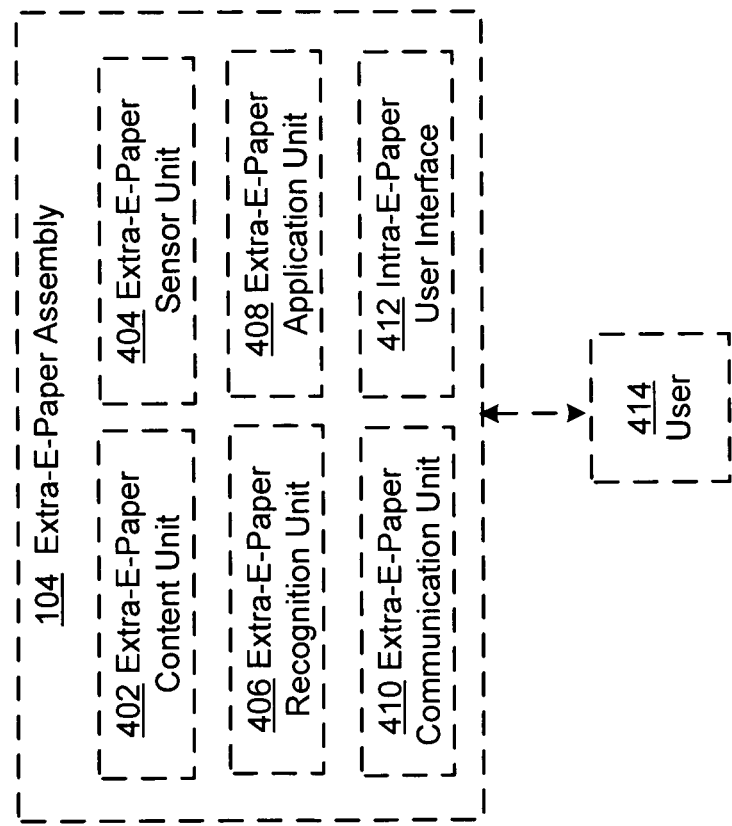
FIG. 13 is a block diagram of an exemplary implementation of one of the optional extra-e-paper assemblies of FIG. 1 showing further detail.

An exemplary implementation of the external device 104 is shown in FIG. 13 as optionally having a content unit 402, a sensor unit 404, a recognition unit 406, an application unit 408, a communication unit 410, and a user interface 412. A user 414 is shown interacting with the external device 104 such as through visual information retrieval, physical manipulation of the external device, or other interaction.

Figure 14:
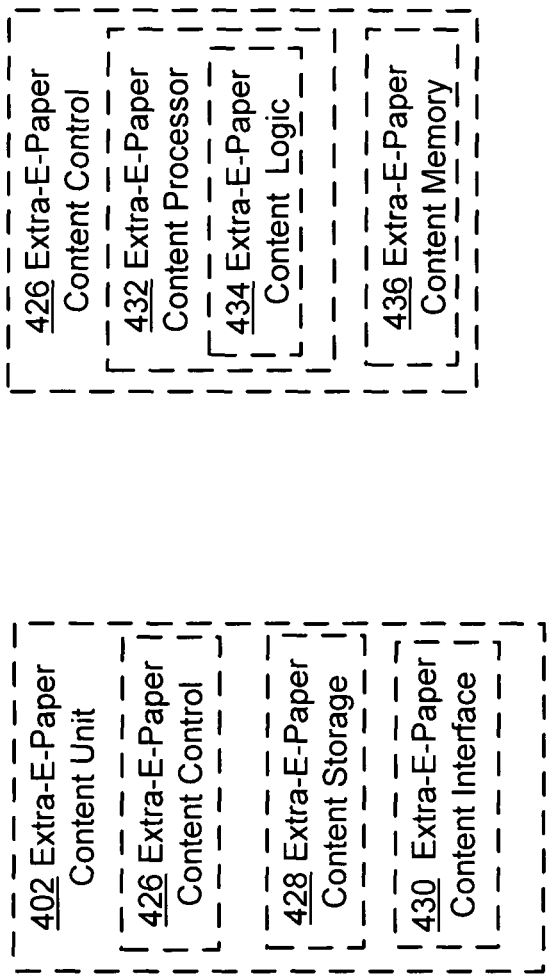
FIG. 14 is a block diagram showing detail of an exemplary implementation of a content unit of the exemplary implementation of the extra-e-paper assembly of FIG. 13.

An exemplary implementation of the content unit 402 is shown in FIG. 14 as optionally having a content control 426, a content storage 428, and a content interface 430. Further shown in FIG. 14, an exemplary implementation of the content control 426 optionally has a content processor 432 with a content logic 434, and a content memory 438.

Figure 15:
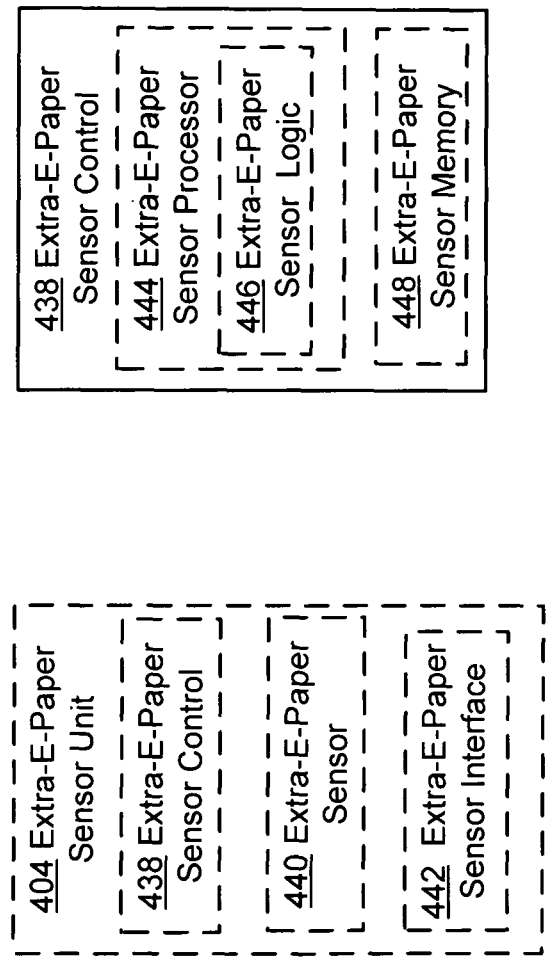
FIG. 15 is a block diagram showing detail of an exemplary implementation of a sensor unit of the exemplary implementation of the extra-e-paper assembly of FIG. 13.

An exemplary implementation of the sensor unit 404 is shown in FIG. 15 as optionally having a sensor control 438, a sensor 440, and a sensor interface 442. Further shown in FIG. 15, an exemplary implementation of the sensor control 438 optionally has a sensor processor 444 with a sensor logic 446, and a sensor memory 448.

Figure 16:
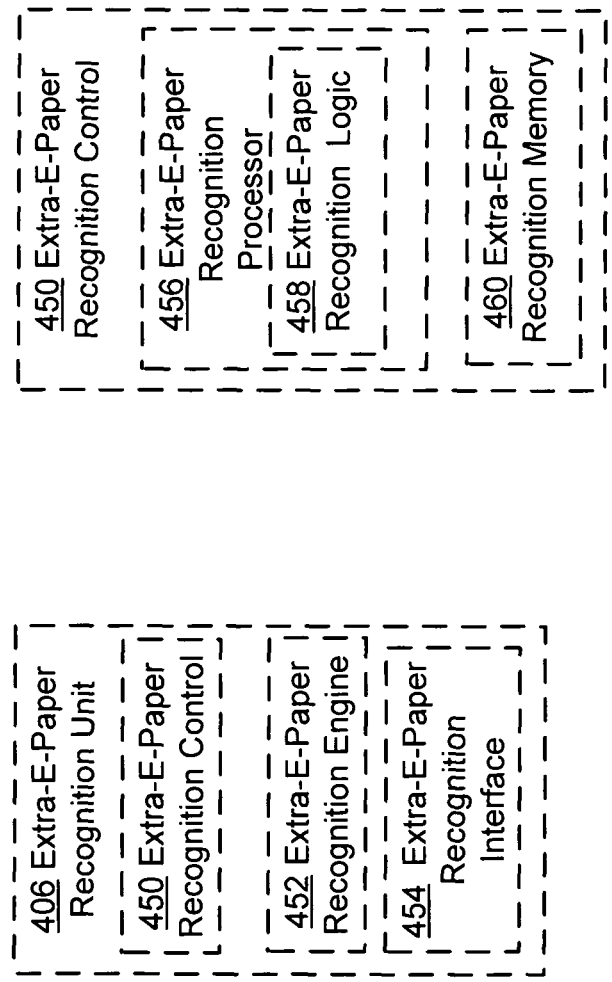
FIG. 16 is a block diagram showing detail of an exemplary implementation of a recognition unit of the exemplary implementation of the extra-e-paper assembly of FIG. 13.

An exemplary implementation of the recognition unit 406 is shown in FIG. 16 as optionally having a recognition control 450, a recognition engine 452, and a recognition interface 454. Further shown in FIG. 16, an exemplary implementation of the recognition control 450 optionally has a recognition processor 456 with a recognition logic 458, and a recognition memory 460.

Figure 17:
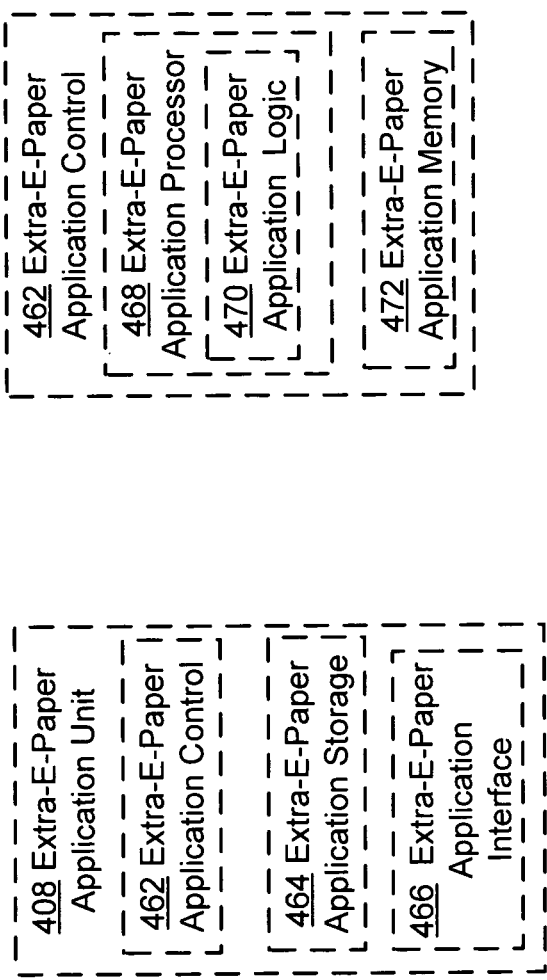
FIG. 17 is a block diagram showing detail of an exemplary implementation of an application unit of the exemplary implementation of the extra-e-paper assembly of FIG. 13.

An exemplary implementation of the application unit 408 is shown in FIG. 17 as optionally having an application control 462, an application storage 464, and an application interface 466. Further shown in FIG. 17, an exemplary implementation of the application control 462 optionally has an application processor 468 with an application logic 470, and an application memory 472.

Figure 18:
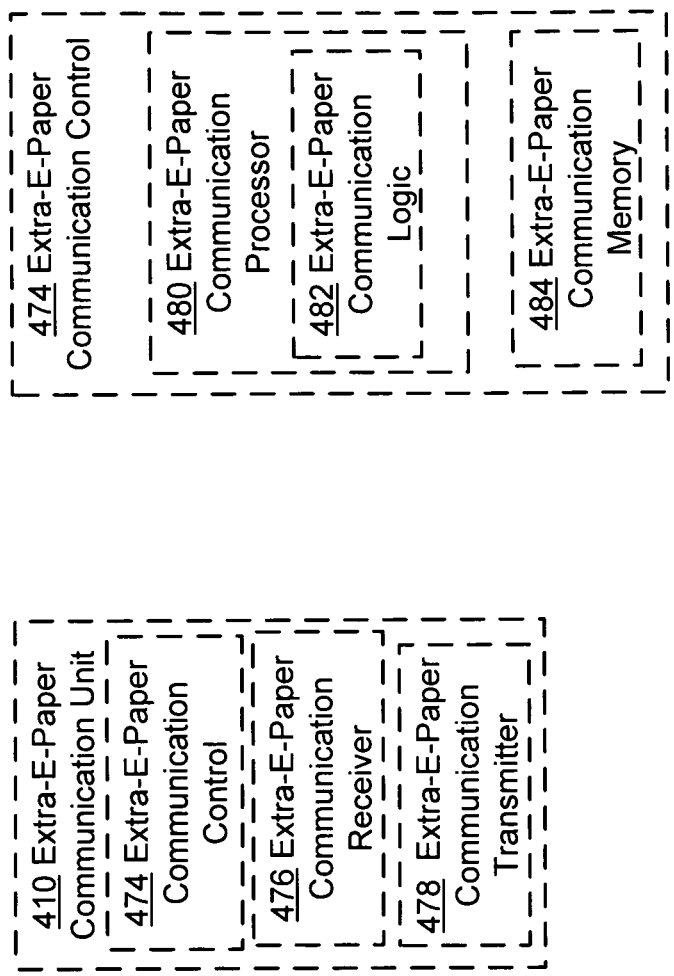
FIG. 18 is a block diagram showing detail of an exemplary implementation of a communication unit of the exemplary implementation of the extra-e-paper assembly of FIG. 13.

An exemplary implementation of the communication unit 410 is shown in FIG. 18 as optionally having a communication control 474, a communication receiver 476, and a communication transmitter 478. Further shown in FIG. 18, an exemplary implementation of the communication control 474 optionally has a communication processor 480 with a communication logic 482, and a communication memory 484.

An exemplary implementation of the user interface unit 412 is shown in FIG. 19 as optionally having a user interface control 486, user interface receiver 488, and a user interface transmitter 490. Further shown in FIG. 19, an exemplary implementation of the user interface control 486 optionally has a user interface processor 492 with a user interface logic 494, and a user interface memory 496.

A top plan view of an exemplary implementation 602 of the e-paper 102 is shown in FIG. 20 as having a plurality of regions 604 separated by borders 606. The number of the regions and the shape of each of the regions may vary depending upon particular implementations of the e-paper. Consequently, the number and shapes of the borders 606 may also vary based on specifics of a particular implementation of the e-paper 102.

The regions 604 and the borders 606 may be either virtual or physical. Virtual implementations may be based upon a user display selection to display on a plurality of different areas of the e-paper 602 various files or other items having different content. There may be a one to one correlation between these areas and the regions 604 but in other cases other sorts of correlations are possible. Another example of virtual implementations of the regions 604 and the borders 606 may include displaying different user interfaces to different computer programs on different areas of a display. At least some times the virtual implementations of the regions 604 and the borders 606 may be readily modified or replaced outright. Numerous other examples exist for virtual implementations of the regions 604 and the borders 606.

Physical implementations may include a portion of the borders 606 being physically demarcating either structural or otherwise. For instance, at least a portion of the regions 604 of the e-paper 602 may be separate e-paper portions separated by the borders 606 with the borders being hinges or micro-hinges or other physical connections.

With both the virtual and the physical implementations of the regions 604 and the borders 606 of the e-paper 602, conformations such as bends, folds, or other may exist along the borders but may also exist within one or more of the regions themselves. Conformations may refer to particular localized physical aspects such as bends, folds, twists, etc occurring in one or more of the regions 604 or along one or more of the borders 606. In other implementations, one or more conformations may refer to general shapes of the e-paper 602 as resultant from one or more other localized conformations of the e-paper.

The exemplary implementation 602 of the e-paper 102 is shown in FIG. 21 to include a collection of display portions 608: a surface portion 608a, an internal portion 608b, and a surface portion 608c. In some implementations each of the display portions 608 are able to display information under independent control. For instance, the surface portion 608a may be used to either block or allow viewing from a display surface 610 of information being displayed by the internal portion 608b or the surface portion 608a and the internal portion 608b may be used in conjunction to display information together from the display surface 610. Meanwhile, the surface portion 608c could be displaying information from a display surface 612. Sensors 614, implementations of the sensor 144, are shown coupled with the display portions 608 of the e-paper 602. In other implementations, one or more of the sensors 144 may be located in other configurations relative to the display portions 608 such as alternating with the display portions in juxtaposition or otherwise internally located along with one or more of the display portions.

As shown in FIG. 22, the exemplary implementation 602 of the e-paper 102 may include a border 604b between a region 604a coupled with one of the sensors 614 and a region 604b coupled to another one of the sensors 614. As shown in FIG. 23, the exemplary implementation 602 may be partially folded along the border 604b. The exemplary implementation 602 may also include another implementation of the sensor 144 in the form of a sensor 616 (such as for stress, strain, force, acceleration, etc) and a sensor 618 (such as optical fiber based). These alternative sensor implementations including the sensor 616 and the sensor 618 may be generally represented by the sensors 614 as well as the sensor 144. The exemplary implementation 602 may include capabilities to display information based upon a classification of the information and an e-paper conformation such as shown in FIG. 23 in which a display of information 620 having a classification of "private" occurs from the display surface 610 (being the inside surface of the illustrated folded conformation) and in which a display of information 620 having a classification of "public" classification occurs from the display surface 612 (being the outside surface of the illustrated folded conformation). An exemplary angle of bend 624 and an angle of bend 624a are is also noted in FIG. 23 since they may be included with other indicators such as a change of conformation between the bend 624 and the bend 624a to be used to describe a particular e-paper conformation.

Conformation of the exemplary implementation 602 may be used to assist with indicating a selection by the user 128 along with controlling display of information having various classifications. For instance, as shown in FIG. 24, a geometry 625 of an exemplary e-paper conformation of the exemplary implementation 602 and a geometry 625a and/or a change there between as sensed by the sensors 614 may be used to indicate a selection 626 of e-paper function between a plurality of applications 627 such as a television function, a personal digital assistant function, a cell phone function, a notebook function, and an eBook function.

Relative association between two or more portions of the exemplary implementation 602 may be used to assist with selection of e-paper function, and/or controlling display such as including controlling display of information having various classifications. For instance, as shown in FIG. 25, an exemplary relative association 628 may be sensed between two or more of the sensors 614 based upon factors such as separation distance or other geometrical factors. As shown in FIG. 23a, an exemplary relative association 628a may be sensed between the sensors 614 and/or a change in the relative association 628 and the relative association 628a may be sensed as well.

A time ordered sequence of conformations of the exemplary implementation 602 may be used to assist with selection of e-paper function, such as various applications to perform, and/or controlling display such as including controlling display of information having various classifications. For instance, as shown in FIG. 26, an exemplary sequence 630 sensed by the sensors 614 of partial folding of the exemplary implementation 602 to being unfolded to being again partially folded may be used to indicate a selection or otherwise control display such as of display of information having a desired classification. The exemplary sequence 630 may be indicated in an absolute sense by a series of the conformations associated with the sequence or may be indicated in a relative sense by a series of a first change 630*a* and a second change 630*b* that exist between the conformations associated with the sequence.

Figure 27:
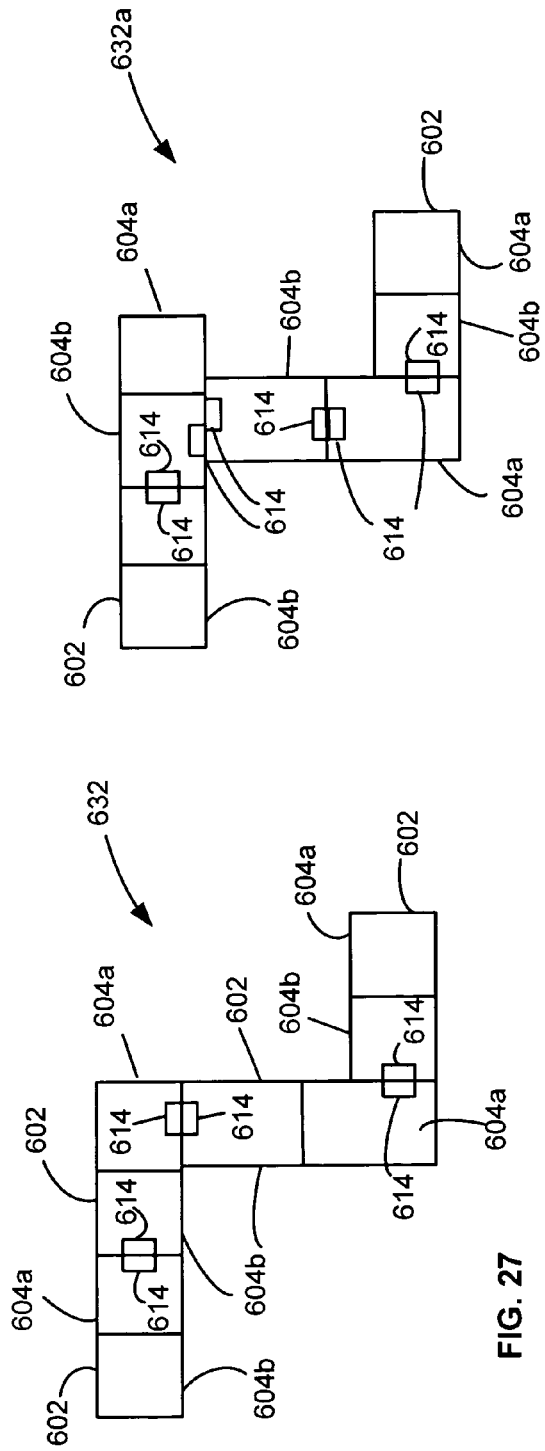
FIG. 27 is a top plan view of exemplary implementations of the intra-e-paper assembly of FIG. 1 showing conformation based upon interconnection between the exemplary implementations.

A coupling type of conformation between two or more instances of the exemplary implementation 602 may be used to assist with selection of e-paper function, and/or controlling display such as including controlling display of information having various classifications. For instance, as shown in FIG. 27, an exemplary coupling conformation 632 between exemplary implementations 602*a*, 602*b*, 602*c*, and 602*d* of the e-paper 102 as sensed by the sensors 614 may be used to indicate a selection or otherwise control display such as of display of information having a desired classification. Change of a coupling conformation, such as between the exemplary coupling conformation 632 and an exemplary coupling conformation 632*a* of FIG. 25 may also be used.

Figure 28:
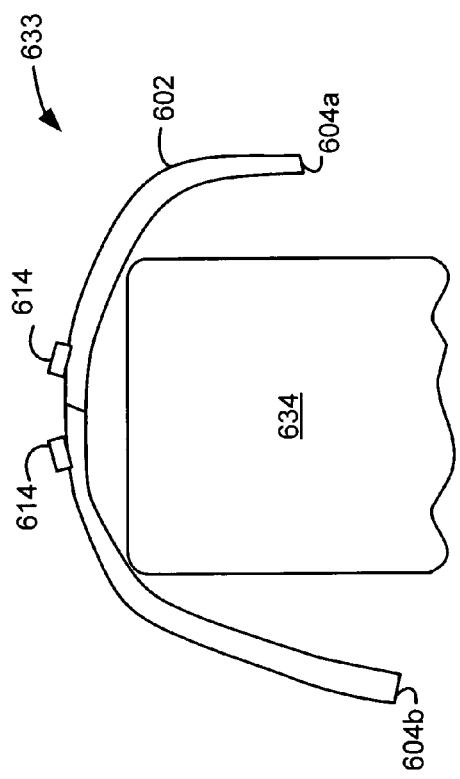
FIG. 28 is a side elevational view of an exemplary implementation of the intra-e-paper assembly of FIG. 1 showing an exemplary draping type of conformation.
Figure 28A:
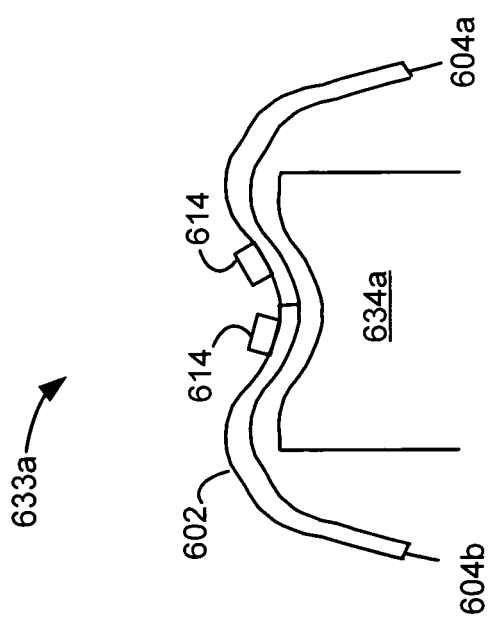
FIG. 28a is a side elevational view of an exemplary implementation of the intra-e-paper assembly of FIG. 1 showing an exemplary draping type of conformation.

A draping type of conformation of the exemplary implementation 602 may be used to assist with selection of e-paper function, and/or controlling display such as including controlling display of information having various classifications. For instance, as shown in FIG. 28, an exemplary draping conformation 633 as sensed by the sensors 614 of the exemplary implementation 602 over an exemplary object 634 may be used to indicate a selection or otherwise control display such as of display of information having a desired classification. Change of a draping type conformation, such as between the exemplary draping conformation 633 of FIG. 28 and an exemplary draping conformation 633*a* over an exemplary object 634*a* of FIG. 28*a* may also be used.

Figure 29:
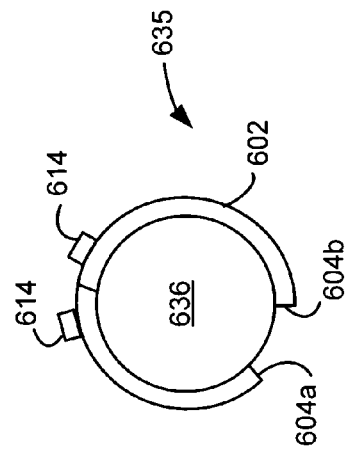
FIG. 29 is a side elevational view of an exemplary implementation of the intra-e-paper assembly of FIG. 1 showing an exemplary wrapped type of conformation.
Figure 29A:
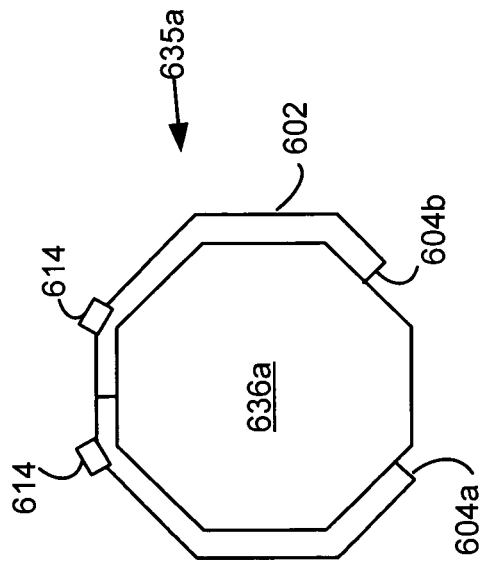
FIG. 29a is a side elevational view of an exemplary implementation of the intra-e-paper assembly of FIG. 1 showing an exemplary wrapped type of conformation.

A wrapped type of conformation of the exemplary implementation 602 may be used to assist with selection of e-paper function, and/or controlling display such as including controlling display of information having various classifications. For instance, as shown in FIG. 29, an exemplary wrapped conformation 635 around an exemplary object 636 as sensed by the sensors 614 may be used to indicate a selection or otherwise control display such as of display of information having a desired classification. Change of a wrapped type conformation, such as between the exemplary wrapped conformation 635 of FIG. 29 and an exemplary wrapped conformation 635*a* around an exemplary object 636*a* of FIG. 29*a* may also be used.

A transient type of conformation of the exemplary implementation 602 such as a scraping action resultant in curvilinear input may be used to assist with selection of e-paper function, and/or controlling display such as including controlling display of information having various classifications. For instance, as shown in FIG. 30, an exemplary instrument 638 moved in along exemplary path 640 imparting an exemplary transient conformation 642 having an exemplary scraping conformation action resultant in a curvilinear conformation input as sensed by the sensors 614 may be used to indicate a selection or otherwise control display such as of display of information having a desired classification. Change of a transient conformation 642, such as between an exemplary path 640*a* and an exemplary path 640*b* of FIG. 30*a* may also be used.

A rolled type of conformation of the exemplary implementation 602 may be used to assist with selection of e-paper function, and/or controlling display such as including controlling display of information having various classifications. For instance, as shown in FIG. 31, an exemplary rolled conformation 643 as sensed by the sensors 614 of the exemplary implementation 602 may be used to indicate a selection or otherwise control display such as of display of information having a desired classification. Change of a rolled type conformation, such as between the exemplary rolled conformation 643 and an exemplary rolled conformation 643*a* of FIG. 29 may also be used.

A hinge status type of conformation of coupling between two or more instances of the exemplary implementation 602 may be used to assist with selection of e-paper function, and/or controlling display such as including controlling display of information having various classifications. For instance, as shown in FIG. 32, a hinge status conformation 644 sensed by the sensors 614 of a hinge 645 of the exemplary implementation 602 may be used to indicate a selection or otherwise control display such as of display of information having a desired classification. Change of a hinge status type conformation, such as between the exemplary hinge status conformation 644 and an exemplary hinge status conformation 644*a* of FIG. 30 may also be used.

Bend radius status type of conformation of the exemplary implementation 602 may be used to assist with selection of e-paper function, and/or controlling display such as including controlling display of information having various classifications. For instance, as shown in FIG. 33, an exemplary bend radius status conformation 646 as sensed by the sensors 614 may be used to indicate a selection or otherwise control display such as of display of information having a desired classification. Change of a bend radius status type of conformation, such as between the exemplary bend radius status conformation 646 and an exemplary bend radius status conformation 646*a* of FIG. 31 may also be used.

The various components of the e-paper 102 (e.g., the content unit 112, the sensor unit 114, the recognition unit 116, the application unit 118, the communication unit 120, the conformation unit 122, the display unit 124, and the user interface 126) and their sub-components and of the external device 104 (e.g., the content unit 402, the sensor unit 404, the recognition unit 406, the application unit 408, the communication unit 410, and the user interface 412) and their sub-components and the other exemplary entities depicted may be embodied by hardware, software and/or firmware. For example, in some implementations the content unit 112, the recognition unit 116, and the application unit 118, and their sub-components, may be implemented with a processor (e.g., microprocessor, controller, and so forth) executing computer readable instructions (e.g., computer program product) stored in a storage medium (e.g., volatile or non-volatile memory) such as a signal-bearing medium. Alternatively, hardware such as application specific integrated circuit (ASIC) may be employed in order to implement such modules in some alternative implementations.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 34:
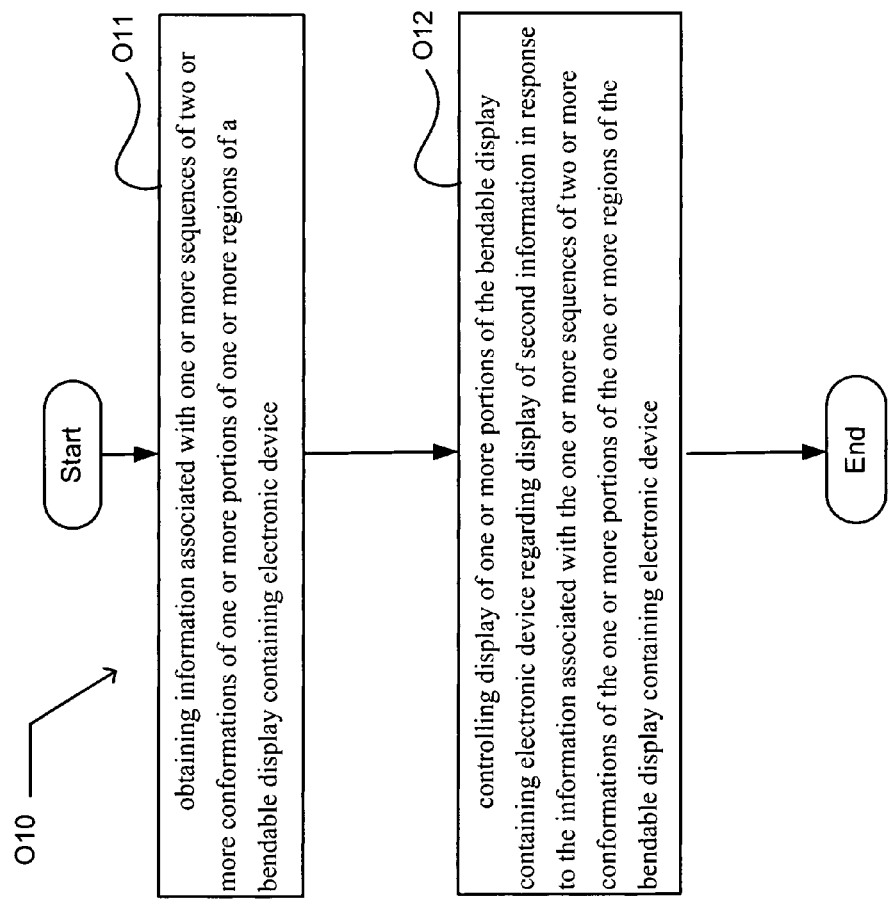
FIG. 34 is a high-level flowchart illustrating an operational flow O10 representing exemplary operations related to one or more conformation sensor modules configured to direct obtaining information associated with one or more sequences of two or more conformations of one or more portions of one or more regions of a bendable display containing electronic device and one or more display control modules configured to direct controlling display of one or more portions of the bendable display containing electronic device regarding display of second information in response to the information associated with the one or more sequences of two or more conformations of the one or more portions of the one or more regions of the bendable display containing electronic device at least associated with exemplary implementations of the intra-e-paper assembly of FIG. 1.

An operational flow O10 as shown in FIG. 34 represents example operations related to one or more conformation sensor modules configured to direct obtaining information associated with one or more sequences of two or more conformations of one or more portions of one or more regions of a bendable display containing electronic device and one or more display control modules configured to direct controlling display of one or more portions of the bendable display containing electronic device regarding display of second information in response to the information associated with the one or more sequences of two or more conformations of the one or more portions of the one or more regions of the bendable display containing electronic device. FIG. 34 and those figures that follow may have various examples of operational flows, and explanation may be provided with respect to the above-described examples of FIGS. 1-33 and/or with respect to other examples and contexts. Nonetheless, it should be understood that the operational flows may be executed in a number of other environments and contexts, and/or in modified versions of FIGS. 1-33. Furthermore, although the various operational flows are presented in the sequence(s) illustrated, it should be understood that the various operations may be performed in other orders than those which are illustrated, or may be performed concurrently.

FIG. 34

An operational flow O10 as shown in FIG. 34 represents example operations related to controlling display in response to information obtained regarding one or more sequences of two or more conformations of one or more portions of one or more regions of the electronic paper assembly or other bendable display containing electronic device. FIG. 34 and those figures that follow may have various examples of operational flows, and explanation may be provided with respect to the above-described examples of FIGS. 1-33 and/or with respect to other examples and contexts. Nonetheless, it should be understood that the operational flows may be executed in a number of other environments and contexts, and/or in modified versions of FIGS. 1-33. Furthermore, although the various operational flows are presented in the sequence(s) illustrated, it should be understood that the various operations may be performed in other orders than those which are illustrated, or may be performed concurrently.

In FIG. 34 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

After a start operation, the operational flow O10 may move to an operation O11, where one or more conformation sensor modules configured to direct obtaining information associated with one or more sequences of two or more conformations of one or more portions of one or more regions of a bendable display containing electronic device may be, executed by, for example, the sensor unit 114 of the e-paper 102 of FIG. 2 and/or acquisition of the sequence information may be directed by one or more conformation sensor modules 302 of FIG. 11. An exemplary implementation may include obtaining (e.g. obtaining may be performed through one or more of the sensors 614 (see FIG. 23) as exemplary implementations of the sensor 144 (see FIG. 4)) information associated with one or more sequences of two or more conformations of one or more portions of one or more regions of the electronic paper assembly or other bendable display containing electronic device (e.g. a sequence of two conformations having the angle of bend 624 and the angle of bend 624a (see FIG. 23) of the exemplary implementation 602 of the e-paper 102. The one or more of the sensors 614 as exemplary implementations of the sensor 144 may relay the information about the sequence of the angle of bend 624 and the angle of bend 624a through the sensor interface 146 (see FIG. 4) to the recognition unit 166 (see FIG. 5) through the recognition interface 158 where the recognition engine 156 may determine that the sequence of the angle of bend 624 and the angle of bend 624a is associated with a sequence of two conformations as retrieved from the conformation memory 200 (see FIG. 8) through the conformation interface 194) of one or more portions of one or more regions (e.g. the region 604a and the region 604b (see FIGS. 22 and 23) are angularly oriented with one another along the border 606a) of the electronic paper assembly or other bendable display containing electronic device (e.g. of the implementation 602 (see FIGS. 20 and 23) of the e-paper 102).

The operational flow O10 may then move to operation O12, where one or more display control modules configured to direct controlling display of one or more portions of the bendable display containing electronic device regarding display of second information in response to the information associated with the one or more sequences of two or more conformations of the one or more portions of the one or more regions of the bendable display containing electronic device may be executed by, for example, the display unit 124 of FIG. 9 and/or control of display being directed by one or more of the display control modules 304 of FIG. 11. An exemplary implementation may include controlling display (e.g. the display control 202 can control the display hardware 204 (see FIG. 9) to display information on the region 604a and the region 604b (see FIG. 23)) of one or more portions of the electronic paper assembly or other bendable display containing electronic device regarding display of second information (e.g. information contained in the content storage 132 of the content unit 112 (see FIG. 3)) in response to the first information associated with the one or more sequences of two or more conformations of the one or more portions of the one or more regions of the electronic paper (e.g. the display control 202 (see FIG. 9) may control display in response to communication through the display interface 206 with the recognition unit 116 (see FIG. 5) through the recognition interface 158 for recognized present conformation (such as the partially folded conformation of FIG. 23) and communication through the display interface with the content unit 112 (see FIG. 3) through the content interface 134.

FIG. 35

Figure 35:
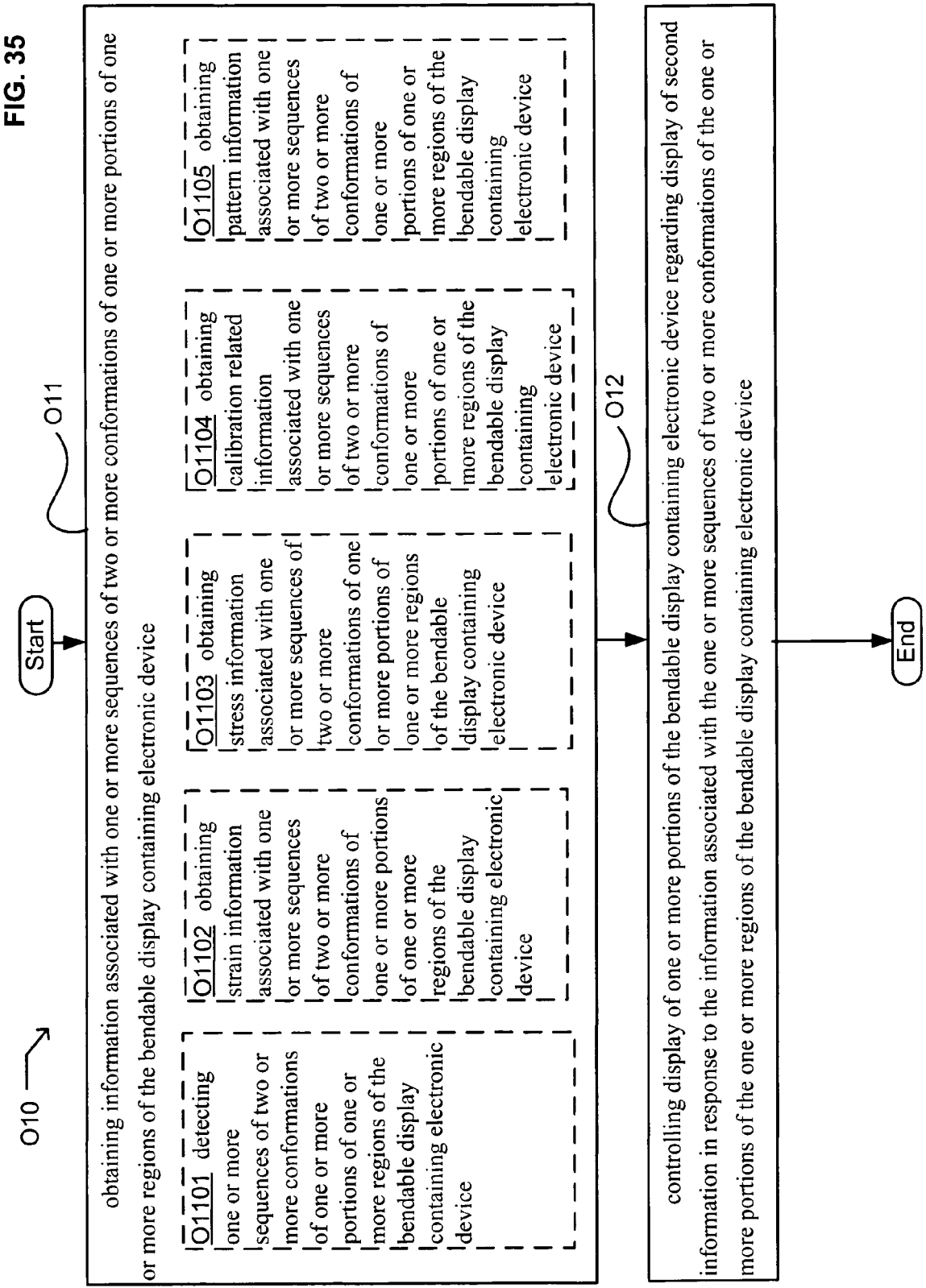
FIG. 35 is a high-level flowchart including exemplary implementations of operation O11 of FIG. 34.

FIG. 35 illustrates various implementations of the exemplary operation O11 of FIG. 34. In particular, FIG. 35 illustrates example implementations where the operation O11 includes one or more additional operations including, for example, operations O1101, O1102, O1103, O1104, and/or O1105, which may be executed generally by, in some instances, the sensor unit 114 of FIG. 4.

For instance, in some implementations, the exemplary operation O11 may include the operation of O1101 for one or more conformation detection modules configured to direct detecting one or more sequences of two or more conformations of one or more portions of one or more regions of the bendable display containing electronic device. An exemplary implementation may include one or more of the conformation detection modules 306 of FIG. 11 directing acquisition of detection such as detecting one or more sequences of two or more conformations (e.g. detecting may be performed by one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching conformation detail contained in the recognition memory 164 with the sensing data such as found with a sequence of two conformations involving the partially folded conformation of the exemplary implementation 602 of the e-paper 102 having the angle of bend 624 and the partially folded conformation having the angle of bend 624*a* shown in FIG. 23) of one or more portions of one or more regions (e.g. the region 604*a* and the region 604*b*) of the electronic paper assembly or other bendable display containing electronic device (e.g. the exemplary implementation 602 of the e-paper 102 of FIG. 23).

For instance, in some implementations, the exemplary operation O11 may include the operation of O1102 for one or more conformation strain modules configured to direct obtaining strain information associated with one or more sequences of two or more conformations of one or more portions of one or more regions of the bendable display containing electronic device. An exemplary implementation may include one or more of the conformation strain modules 308 of FIG. 11 directing the acquisition of strain information such as obtaining strain information (e.g. one or more of the sensors 614 (see FIG. 23) as exemplary implementations of the strain sensor 144*a* (see FIG. 4) of the sensor 144 may obtain strain information) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between strain information to be obtained by the sensors 614 and one or more sequences of two or more conformations such as a sequence involving the partially folded conformation of the region 604*a* and the region 604*b* of the exemplary implementation 602 of the e-paper 102 having the angle of bend 624 and the partially folded conformation having the angle of bend 624*a*).

For instance, in some implementations, the exemplary operation O11 may include the operation of O1103 for one or more conformation stress modules configured to direct obtaining stress information associated with one or more sequences of two or more conformations of one or more portions of one or more regions of the bendable display containing electronic device. An exemplary implementation may include one or more of the stress modules 310 of FIG. 11 directing the acquisition of stress information such as obtaining stress information (e.g. one or more of the sensors 614 (see FIG. 23) as exemplary implementations of the stress sensor 144*b* (see FIG. 4) of the sensor 144 may obtain stress information) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between stress information to be obtained by the sensors 614 and one or more sequences of two or more conformations such as a sequence involving the partially folded conformation of the region 604*a* and the region 604*b* of the exemplary implementation 602 of the e-paper 102 having the angle of bend 624 and the partially folded conformation having the angle of bend 624*a*).

For instance, in some implementations, the exemplary operation O11 may include the operation of O1104 for one or more conformation calibration modules configured to direct obtaining calibration related information associated with one or more sequences of two or more conformations of one or more portions of one or more regions of the bendable display containing electronic device. An exemplary implementation may include one or more of the conformation calibration modules 312 of FIG. 11 directing the acquisition of calibration related information such as obtaining calibration related information (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously as calibrated with respect to predetermined conformations that the e-paper 102 may assume) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the previously obtained sensor information calibrated with respect to one or more sequences involving predetermined conformations that the e-paper 102 may assume such as for example a sequence involving the partially folded conformation of the region 604*a* and the region 604*b* of the exemplary implementation 602 of the e-paper 102 having the angle of bend 624 and the partially folded conformation having the angle of bend 624*a*).

For instance, in some implementations, the exemplary operation O11 may include the operation of O1105 for one or more conformation pattern modules configured to direct obtaining pattern information associated with one or more sequences of two or more conformations of one or more portions of one or more regions of the bendable display containing electronic device. An exemplary implementation may include one or more of the conformation pattern modules 314 of FIG. 11 directing the acquisition of pattern information such as obtaining pattern information (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously with respect to one or more predetermined patterns formed by conformations that the e-paper 102 may assume) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to one or more sequences involving two or more predetermined patterns formed by conformations that the e-paper 102 may assume such as for example a sequence involving the partially folded conformation of the region 604*a* and the region 604*b* of the exemplary implementation 602 of the e-paper 102 having the angle of bend 624 and the partially folded conformation having the angle of bend 624*a*).

FIG. 36

Figure 36:
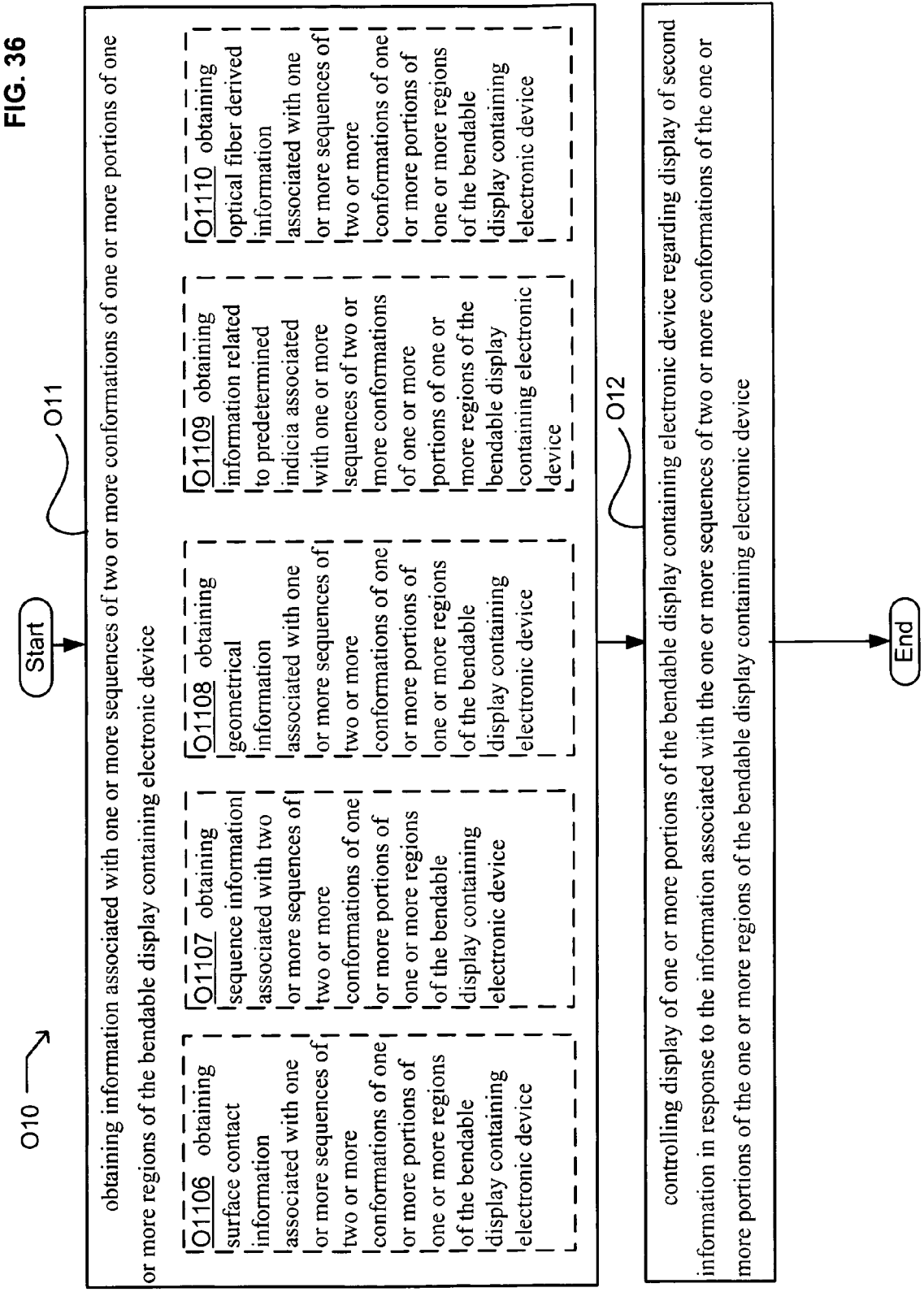
FIG. 36 is a high-level flowchart including exemplary implementations of operation O11 of FIG. 34.

FIG. 36 illustrates various implementations of the exemplary operation O11 of FIG. 34. In particular, FIG. 36 illustrates example implementations where the operation O11 includes one or more additional operations including, for example, operations O1106, O1107, O1108, O1109, and/or O1110, which may be executed generally by, in some instances, the sensor unit 114 of FIG. 4.

For instance, in some implementations, the exemplary operation O11 may include the operation of O1106 for one or more surface contact modules configured to direct obtaining surface contact information associated with one or more sequences of two or more conformations of one or more portions of one or more regions of the bendable display containing electronic device. An exemplary implementation may include one or more surface contact modules 316 of FIG. 11 directing the acquisition of surface contact information such as obtaining surface contact information (e.g. one or more of the sensors 614 (see FIG. 23) as exemplary implementations of the surface sensor 144d (see FIG. 4) of the sensor 144 may obtain surface contact information) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between surface contact information to be obtained by the sensors 614 and involving two or more conformations such as a sequence involving the partially folded conformation of the region 604a and the region 604b of the exemplary implementation 602 of the e-paper 102 having the angle of bend 624 and the partially folded conformation having the angle of bend 624a).

For instance, in some implementations, the exemplary operation O11 may include the operation of O1107 for one or more conformation sequence modules configured to direct obtaining sequence information associated with two or more sequences of two or more conformations of one or more portions of one or more regions of the bendable display containing electronic device. An exemplary implementation may include one or more conformation sequence modules 318 of FIG. 11 directing the acquisition of sequence information such as obtaining sequence information (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined sequences of two or more conformations that the e-paper 102 may assume) associated with two or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to two or more sequences such as involving two or predetermined sequences formed by conformations that the e-paper 102 may assume such as a first sequence involving the first change 630a and a second sequence involving the second change 630b associated with the exemplary sequence 630 (comprised of the first sequence and the second sequence) of conformations of the region 604a and the region 604b of the exemplary implementation 602 of the e-paper 102 occurring in a time ordered sequence as illustrated in FIG. 26).

For instance, in some implementations, the exemplary operation O11 may include the operation of O1108 for one or more conformation geometry modules configured to direct obtaining geometrical information associated with one or more sequences of two or more conformations of one or more portions of one or more regions of the bendable display containing electronic device. An exemplary implementation may include one or more conformation geometry modules 320 of FIG. 11 directing the acquisition of geometrical information such as obtaining geometrical information (e.g. one or more of the sensors 614 (see FIG. 24) as exemplary implementations of the sensor 144 (see FIG. 4) may obtain sensor information regarding the geometry 625 (see FIG. 24) to be compared by the recognition engine 156 (see FIG. 5) with sensor information obtained previously with respect to one or more predetermined geometries formed by conformations that the e-paper 102 may assume) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to the one or more sequences involving one or more geometries formed by conformations that the e-paper 102 may assume such as for example a sequence involving the geometry 625 and the geometry 625a (see FIG. 24) including the region 604a and the region 604b of the exemplary implementation 602 of the e-paper 102).

For instance, in some implementations, the exemplary operation O11 may include the operation of O1109 for one or more conformation indicia modules configured to direct obtaining information related to predetermined indicia associated with one or more sequences of two or more conformations of one or more portions of one or more regions of the bendable display containing electronic device. An exemplary implementation may include one or more of the conformation indicia modules 324 of FIG. 11 directing the acquisition of information related to predetermined indicia such as obtaining information related to predetermined indicia (e.g. one or more of the sensors 614 (see FIG. 23) as exemplary implementations of the sensor 144 (see FIG. 4) may obtain sensor information to be compared by the recognition engine 156 (see FIG. 5) with predetermined indicia of conformations that the e-paper 102 may assume) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the previously obtained sensor information calibrated with respect to one or more sequences involving two or more conformations that the e-paper 102 may assume such as for example a sequence involving the partially folded conformation of the region 604a and the region 604b of the exemplary implementation 602 of the e-paper 102 having the angle of bend 624 and the partially folded conformation having the angle of bend 624a).

For instance, in some implementations, the exemplary operation O11 may include the operation of O1110 for one or more optical fiber modules configured to direct obtaining optical fiber derived information associated with one or more sequences of two or more conformations of one or more portions of one or more regions of the bendable display containing electronic device. An exemplary implementation may include one or more optical fiber modules 326 of FIG. 11 directing the acquisition of optical fiber derived information such as obtaining optical fiber derived information (e.g. one or more of the sensors 614 (see FIG. 23) as exemplary implementations of the optical fiber sensor 144c (see FIG. 4) of the sensor 144 may obtain optical fiber derived information) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the optical fiber derived information to be obtained by the sensors 614 and one or more sequences of two or more conformations such as a sequence involving the partially folded conformation of the region 604a and the region 604b of the exemplary implementation 602 of the e-paper 102 having the angle of bend 624 and the partially folded conformation having the angle of bend 624a).

FIG. 37

Figure 37:
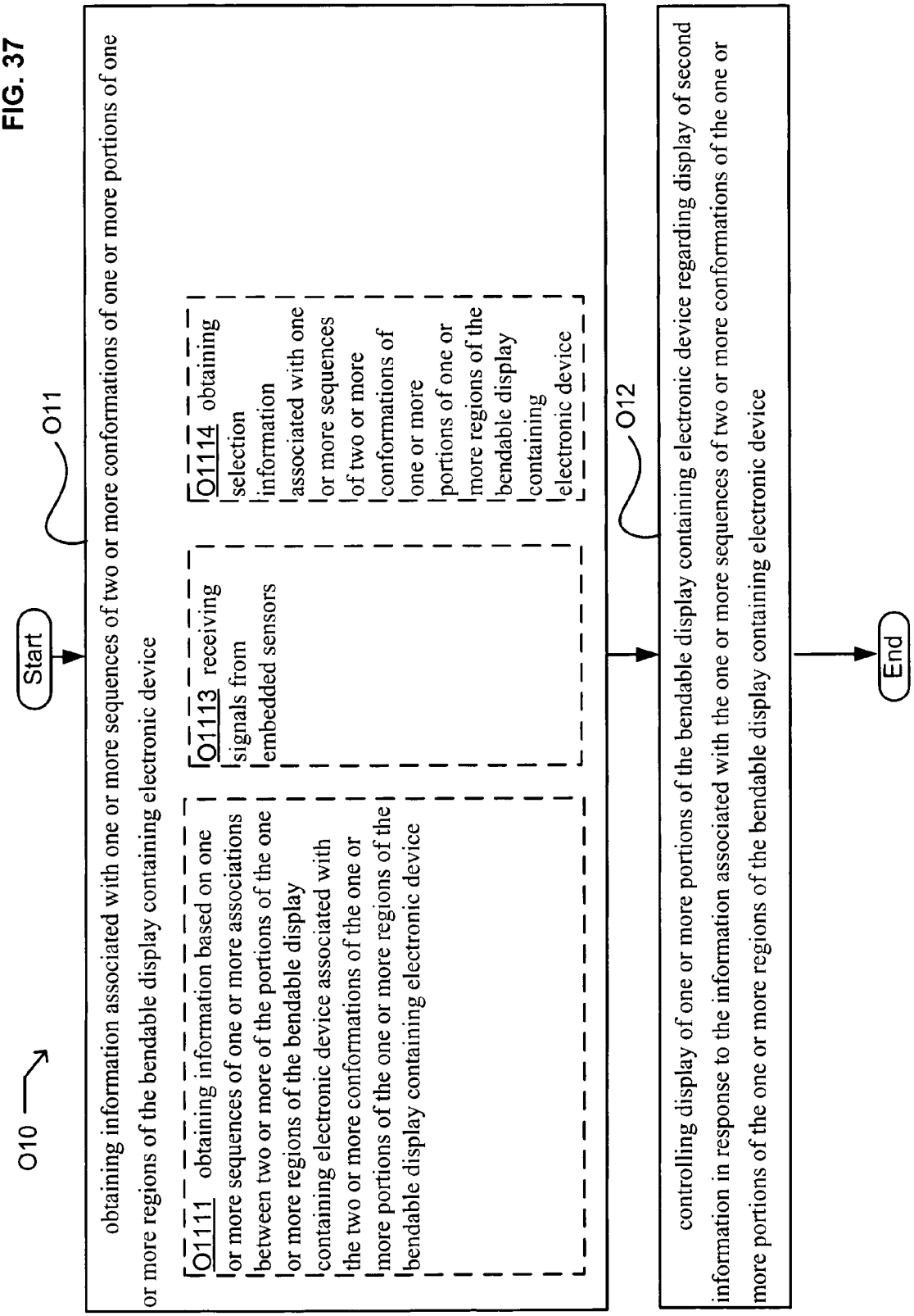
FIG. 37 is a high-level flowchart including exemplary implementations of operation O11 of FIG. 34.

FIG. 37 illustrates various implementations of the exemplary operation O11 of FIG. 34. In particular, FIG. 37 illustrates example implementations where the operation O11 includes one or more additional operations including, for example, operations O1111, O1113, O1114, and/or O1115, which may be executed generally by, in some instances, the sensor unit 114 of FIG. 4.

For instance, in some implementations, the exemplary operation O11 may include the operation of O1111 for one or more conformation association modules configured to direct obtaining information based on one or more sequences of one or more associations between two or more of the portions of the one or more regions of the bendable display containing electronic device associated with the two or more conformations of the one or more portions of the one or more regions of the bendable display containing electronic device. An exemplary implementation may include one or more conformation association modules 328 of FIG. 11 directing the acquisition of information based on one or more sequences of two or more associations such as obtaining information based on one or more sequences of two or more associations between two or more of the portions of the one or more regions of the electronic paper assembly or other bendable display containing electronic device (e.g. two or more of the sensors 614 (see FIG. 23) as exemplary implementations of the sensor 144 (see FIG. 4) may obtain information based on one or more sequences of two or more of the associations between the sensors positioned at various portions of various regions wherein the associations may be related to factors such as distance, relative strain, or relative stress between the sensors) associated with two or more conformations of one or more portions of one or more regions of the electronic paper assembly or other bendable display containing electronic device (e.g. the conformation unit 122 (see FIG. 8) may maintain in the conformation memory 200 one or more of correlations between the sensor information regarding change between the one or more of the associations 628 (see FIG. 25) and one or more of the associations 628a (see FIG. 25a) involving the region 604a and the region 604b of the exemplary implementation 602 of the e-paper 102).

For instance, in some implementations, the exemplary operation O11 may include the operation of O1113 for one or more conformation signal modules configured to direct receiving signals from embedded sensors. An exemplary implementation may include one or more conformation signal modules 330 of FIG. 11 directing the acquisition of signals such as receiving signals from embedded sensors (e.g. one or more of the sensors 614 (see FIG. 30) as exemplary implementations of the sensor 144 (see FIG. 4) may send obtained sensor information to the sensor control 142 to be further sent through the sensor interface 146 to units such as the recognition unit 116 (see FIG. 5) by receipt of signals from the sensor interface through the recognition interface 158.

For instance, in some implementations, the exemplary operation O11 may include the operation of O1114 for one or more conformation selection modules configured to direct obtaining selection information associated with one or more sequences of two or more conformations of one or more portions of one or more regions of the bendable display containing electronic device. An exemplary implementation may include one or more conformation selection modules 332 of FIG. 11 directing the acquisition of selection information such as obtaining selection information (e.g. the selection 626 between TV, PDA, cell phone, notebook PC, and eBook functionality (see FIG. 24) may be obtained by having the recognition engine 156 (see FIG. 5) use sensor information from one or more of the sensors 614 (see FIG. 24) in conjunction with predetermined configuration data stored in the conformation memory 200 (see FIG. 8) to recognize one or more sequences of predetermined conformations, which may then be used by the application control 166 (see FIG. 6) of the application unit 118 to select a functionality per data stored in the application memory 176) associated with one or more sequences of two or more conformations of one or more portions of one or more regions of the electronic paper assembly or other bendable display containing electronic device (e.g. a sequence involving the conformations of the geometry 625 and the geometry 625a of the exemplary implementation 602 of the e-paper 102 including the region 604a and the region 604b as illustrated in FIG. 24).

For instance, in some implementations, the exemplary operation O11 may include the operation of O1115 for one or more origami-like folding modules configured to direct obtaining origami-like folding information associated with one or more sequences of two or more conformations of one or more portions of one or more regions of the bendable display containing electronic device. An exemplary implementation may include one or more origami-like folding modules 334 of FIG. 11 directing the acquisition of origami-like folding information such as obtaining origami-like folding information (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously with respect to one or more predetermined origami-like folding results formed by conformations that the e-paper 102 may assume) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to one or more sequences of two or more predetermined origami-like folding results formed by conformations that the e-paper 102 may assume such as for example a sequence involving the partially folded conformation of the region 604a and the region 604b of the exemplary implementation 602 of the e-paper 102 having the angle of bend 624 and the partially folded conformation having the angle of bend 624a).

FIG. 38

Figure 38:
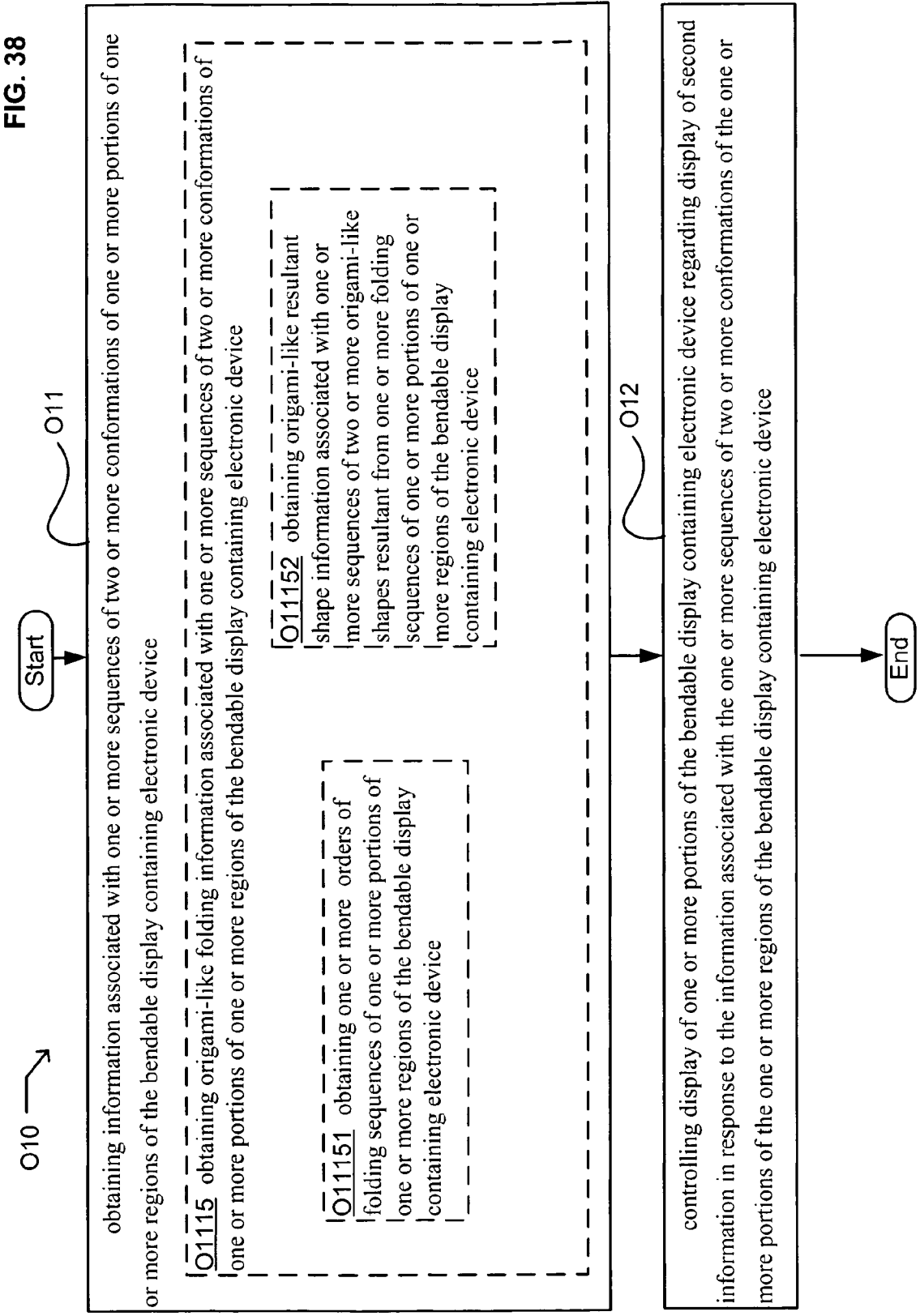
FIG. 38 is a high-level flowchart including exemplary implementations of operation O11 of FIG. 34.

FIG. 38 illustrates various implementations of the exemplary operation O11 of FIG. 34. In particular, FIG. 38 illustrates example implementations where the operation O11 includes the operation O1115, which includes one or more additional operations including, for example, operations O11151, and/or O11152, which may be executed generally by, in some instances, the sensor unit 114 of FIG. 4.

For instance, in some implementations, the exemplary operation O1115 may include the operation of O11151 for one or more folding sequence modules configured to direct obtaining one or more orders of folding sequences of one or more portions of one or more regions of the bendable display containing electronic device. An exemplary implementation may include one or more of the folding sequence modules 336 of FIG. 11 directing the acquisition of one or more orders of folding sequences (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more orders of folding sequences that the e-paper 102 may assume such as a folding sequence order involving the first change 630a and the second change 630b of the exemplary sequence 630 of conformations representing a folding sequence order of the region 604a and the region 604b of the exemplary implementation 602 of the e-paper 102 occurring in a time ordered sequence as illustrated in FIG. 26).

For instance, in some implementations, the exemplary operation O1115 may include the operation of O11152 for one or more origami-like shape modules configured to direct obtaining origami-like resultant shape information associated with one or more sequences of two or more origami-like shapes resultant from one or more folding sequences of one or more portions of one or more regions of the bendable display containing electronic device. An exemplary implementation may include one or more origami-like shape modules 338 of FIG. 11 directing the acquisition of origami-like resultant shape information associated with one or more sequences of two or more resultant origami-like shapes such as obtaining one or more sequences of two or more origami-like shapes resultant from one or more folding sequences of one or more portions of one or more regions of the electronic paper assembly or other bendable display containing electronic device (e.g. one or more of the sensors 614 (see FIG. 23) as exemplary implementations of the sensor 144 (see FIG. 4) may obtain sensor information to be compared by the recognition engine 156 (see FIG. 5) with sensor information obtained previously with respect to one or more sequences of two or more resultant origami-like shapes formed by conformations that the e-paper 102 may assume. The conformation unit 122 (see FIG. 8) may maintain in the conformation memory 200 one or more sequences or two or more associations between the sensor information previously obtained with respect to one or more resultant origami-like shapes formed by conformations that the e-paper 102 may assume such as for example a sequence involving the partially folded conformation of the region 604a and the region 604b of the exemplary implementation 602 of the e-paper 102 having the angle of bend 624 and the partially folded conformation having the angle of bend 624a).

FIG. 39

Figure 39:
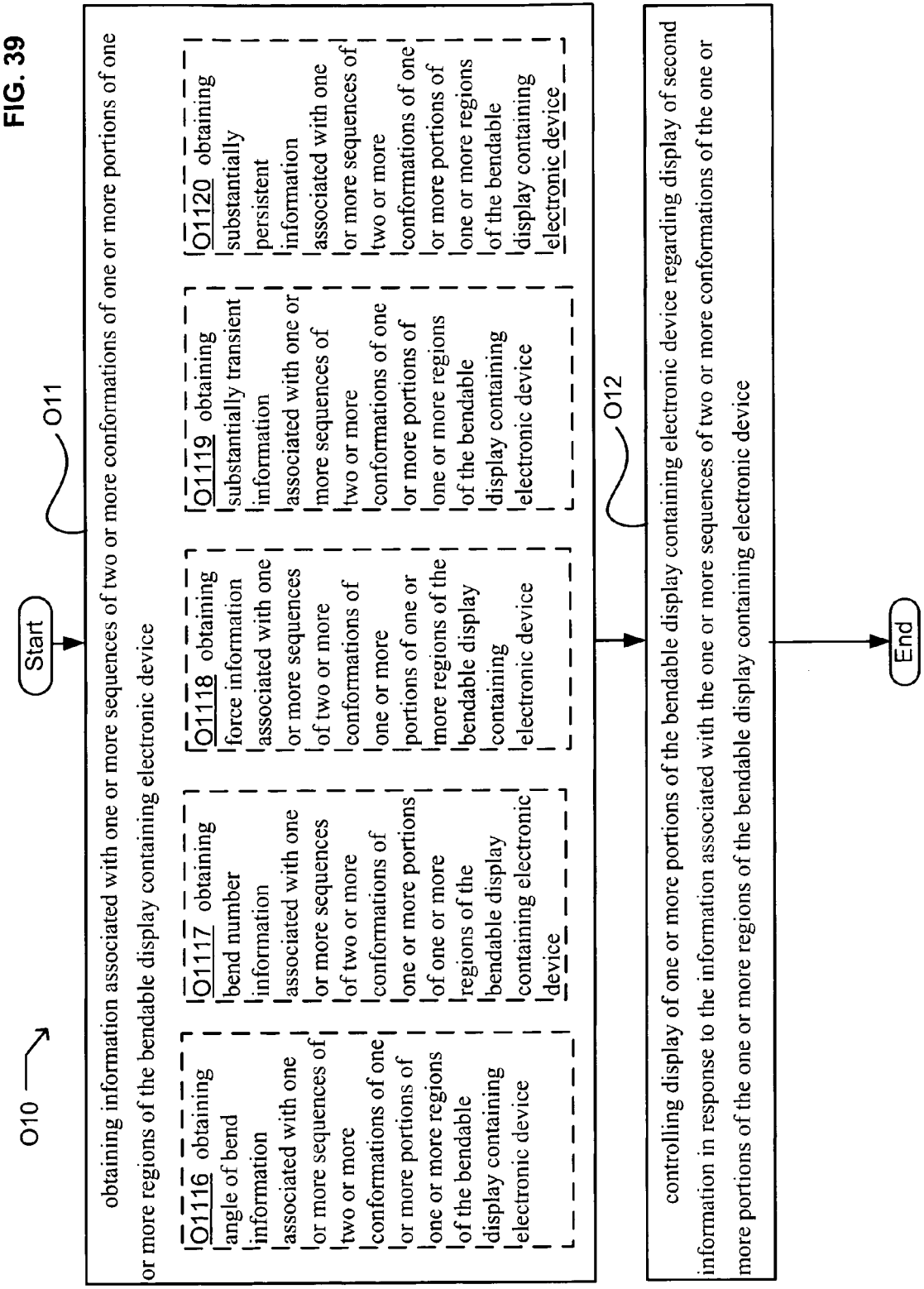
FIG. 39 is a high-level flowchart including exemplary implementations of operation O11 of FIG. 34.

FIG. 39 illustrates various implementations of the exemplary operation O11 of FIG. 34. In particular, FIG. 39 illustrates example implementations where the operation O11 includes one or more additional operations including, for example, operations O1116, O1117, O1118, O1119, and/or O1120, which may be executed generally by, in some instances, the sensor unit 114 of FIG. 4.

For instance, in some implementations, the exemplary operation O11 may include the operation of O1116 for one or more bend angle modules configured to direct obtaining angle of bend information associated with one or more sequences of two or more conformations of one or more portions of one or more regions of the bendable display containing electronic device. An exemplary implementation may include one or more bend angle modules 342 of FIG. 11 directing the acquisition of angle of bend information such as obtaining angle of bend information (e.g. one or more of the sensors 614 (see FIG. 23) as exemplary implementations of the sensor 144 (see FIG. 4) of the sensor unit 114 obtaining sensing data in combination with the recognition engine 156 (see FIG. 5) through the recognition logic 162 matching angle of bend information contained in the recognition memory 164 with the sensing data) associated with one or more sequences of two or more conformations (e.g. the partially folded conformation of the exemplary implementation 602 of the e-paper 102 having an angle of bend 624 and the partially folded conformation having the angle of bend 624a shown in FIG. 23) of one or more portions of one or more regions (e.g. the region 604a and the region 604b) of the electronic paper assembly or other bendable display containing electronic device (e.g. the exemplary implementation 602 of the e-paper 102 of FIG. 23).

For instance, in some implementations, the exemplary operation O11 may include the operation of O1117 for one or more bend number modules configured to direct obtaining bend number information associated with one or more sequences of two or more conformations of one or more portions of one or more regions of the bendable display containing electronic device. An exemplary implementation may include one or more bend number modules 344 of FIG. 11 directing the acquisition of bend number information such as obtaining bend number information (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined bend conformations that the e-paper 102 may assume) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to the one or more predetermined bend conformations that the e-paper 102 may assume such as the exemplary sequence 630 of conformations having a bend number of the region 604a and the region 604b of the partially folded conformation of the exemplary implementation 602 of the e-paper 102 having the angle of bend 624 and the partially folded conformation having the angle of bend 624a as illustrated in FIG. 26).

For instance, in some implementations, the exemplary operation O11 may include the operation of O1118 for one or more conformation force modules configured to direct obtaining force information associated with one or more sequences of two or more conformations of one or more portions of one or more regions of the bendable display containing electronic device. An exemplary implementation may include one or more conformation force modules 346 of FIG. 11 directing the acquisition of force information such as obtaining force information (e.g. one or more of the sensors 614 (see FIG. 23) as exemplary implementations of the force sensor 144e (see FIG. 4) of the sensor 144 may obtain force information) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between force information to be obtained by the sensors 614 and one or more conformations such as a sequence involving the partially folded conformation of the region 604a and the region 604b of the exemplary implementation 602 of the e-paper 102 having the angle of bend 624 and the partially folded conformation having the angle of bend 624*a*).

For instance, in some implementations, the exemplary operation O11 may include the operation of O1119 for one or more conformation transient modules configured to direct obtaining substantially transient information associated with one or more sequences of two or more conformations of one or more portions of one or more regions of the bendable display containing electronic device. An exemplary implementation may include one or more conformation transient modules 348 of FIG. 11 directing the acquisition of substantially transient information such as obtaining substantially transient information (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined periods of time that are deemed "transient" such as with respect to an absolute measure of time such as a certain number of seconds or minutes or such as respect to a relative measure of time such as how long it would typically take to read a portion of a display, etc.) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to the one or more predetermined periods of time that are deemed "transient" for one or more conformations that the e-paper 102 may assume such as a sequence involving the partially folded conformation of the region 604*a* and the region 604*b* of the exemplary implementation 602 of the e-paper 102 having the angle of bend 624 and the partially folded conformation having the angle of bend 624*a* as illustrated in FIG. 26).

For instance, in some implementations, the exemplary operation O11 may include the operation of O1120 for one or more conformation persistent modules configured to direct obtaining substantially persistent information associated with one or more sequences of two or more conformations of one or more portions of one or more regions of the bendable display containing electronic device. An exemplary implementation may include one or more conformation persistent modules 350 of FIG. 11 directing the acquisition of substantially persistent information such as obtaining substantially persistent information (e.g. one or more of the sensors 614 (see FIG. 26) as exemplary implementations of the sensor 144 (see FIG. 4) may obtain sensor information over one or more periods of time to be compared by the recognition engine 156 (see FIG. 5) with sensor information obtained previously over one or more periods of time with respect to one or more predetermined periods of time that are deemed "persistent" such as with respect to an absolute measure of time such as a certain number of minutes, hours, or days, etc or such as respect to a relative measure of time such as how long it would typically take to read a portion of a book, etc.) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to the one or more predetermined periods of time that are deemed "persistent" for one or more conformations that the e-paper 102 may assume such as a sequence involving the partially folded conformation of the region 604*a* and the region 604*b* of the exemplary implementation 602 of the e-paper 102 having the angle of bend 624 and the partially folded conformation having the angle of bend 624*a* as illustrated in FIG. 26).

FIG. 40

Figure 40:
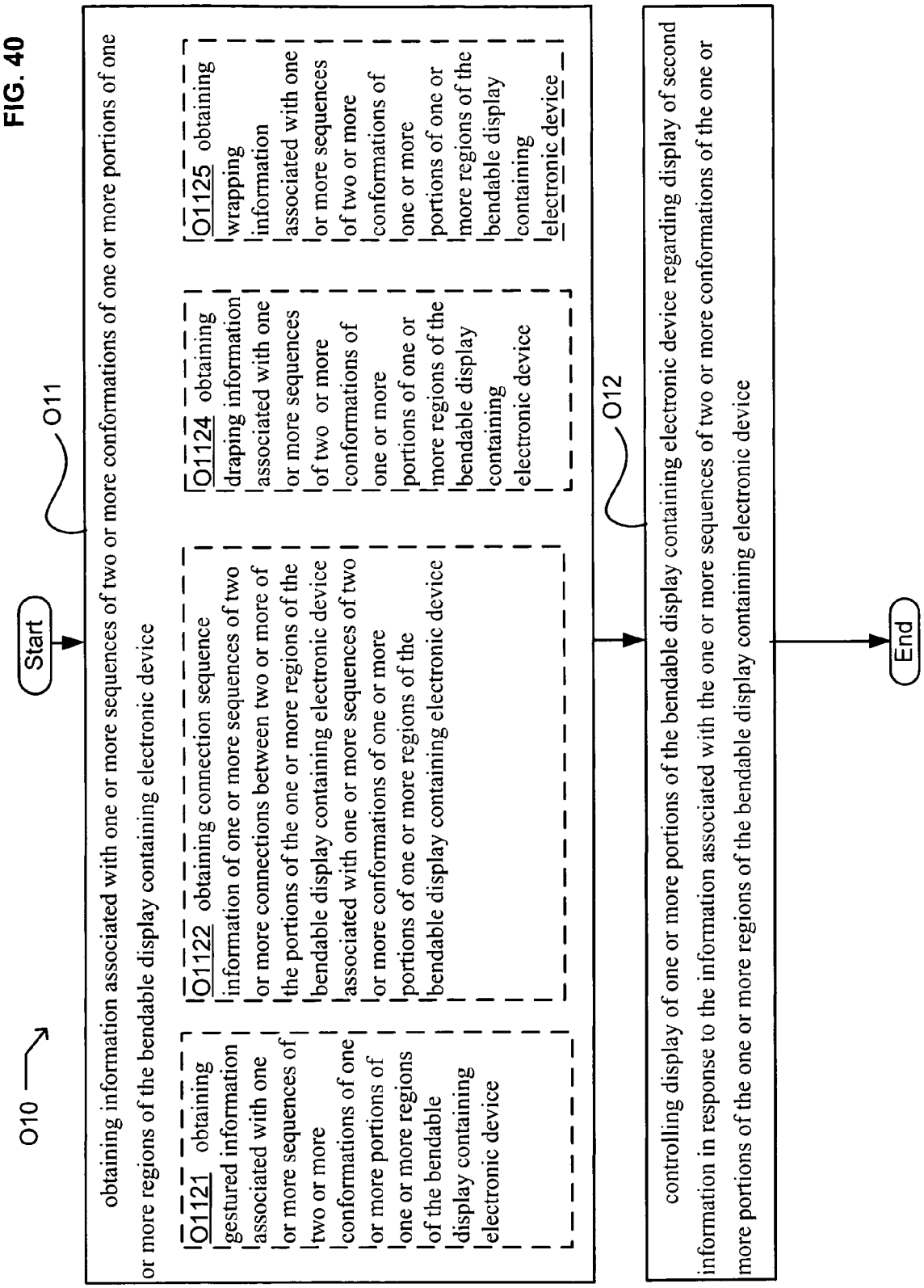
FIG. 40 is a high-level flowchart including exemplary implementations of operation O11 of FIG. 34.

FIG. 40 illustrates various implementations of the exemplary operation O11 of FIG. 34. In particular, FIG. 40 illustrates example implementations where the operation O11 includes one or more additional operations including, for example, operations O1121, O1122, O1124, and/or O1125, which may be executed generally by, in some instances, the sensor unit 114 of FIG. 4.

For instance, in some implementations, the exemplary operation O11 may include the operation of O1121 for one or more conformation gesture modules configured to direct obtaining gestured information associated with one or more sequences of two or more conformations of one or more portions of one or more regions of the bendable display containing electronic device. An exemplary implementation may include one or more gesture modules 356 of FIG. 11 directing the acquisition of gestured information such as obtaining gestured information (e.g. one or more of the sensors 614 (see FIG. 26) as exemplary implementations of the sensor 144 (see FIG. 4) may obtain sensor information at one point in time or in combination with over one or more periods of time to be compared by the recognition engine 156 (see FIG. 5) with sensor information obtained previously at one point in time or in combination with over one or more periods of time with respect to one or more various types of sensor data such as obtained by the strain sensor 144*a*, the stress sensor 144*b*, the optical fiber sensor 144*c*, the surface sensor 144*d*, the force sensor 144*e*, and/or the gyroscopic sensor 144*f* of the sensor 144 (see FIG. 4)) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the combinations of sensor information previously obtained for one or more conformations that the e-paper 102 may assume such as a sequence involving the exemplary partially folded conformation of the exemplary implementation 602 of the e-paper 102 of the region 604*a* and the region 604*b* having the angle of bend 624 and the exemplary folded conformation having the angle of bend 624*a* as illustrated in FIG. 26).

For instance, in some implementations, the exemplary operation O11 may include the operation of O1122 for one or more conformation connection modules configured to direct obtaining connection sequence information of one or more sequences of two or more connections between two or more of the portions of the one or more regions of the bendable display containing electronic device associated with one or more sequences of two or more conformations of one or more portions of one or more regions of the bendable display containing electronic device. An exemplary implementation may include one or more conformation connection modules 357 of FIG. 11 directing the acquisition of connection information such as obtaining connection information of one or more sequences of two or more connections between two or more of the portions (e.g. one or more of the sensors 614 (see FIG. 27) may be activated with one or more of a plurality of the exemplary implementations 602 of the e-paper 102 are assembled together in particular sorts of coupling conformations such as the coupling conformation 632 of FIG. 27) of the one or more regions of the electronic paper associated with one or more sequences of two or more conformations of one or more portions of one or more regions of the electronic paper assembly or other bendable display containing electronic device (such as a sequence involving connection information between the exemplary coupling conformation 632 of the plurality of the regions 604a and the plurality of the regions 604b of the exemplary implementation 602 of the e-paper 102 and the exemplary coupling conformation 632a shown in FIG. 27).

For instance, in some implementations, the exemplary operation O11 may include the operation of O1124 for one or more conformation draping modules configured to direct obtaining draping information associated with one or more sequences of two or more conformations of one or more portions of one or more regions of the bendable display containing electronic device. An exemplary implementation may include one or more conformation draping modules 358 of FIG. 11 directing the acquisition of draping information such as obtaining draping information (e.g. one or more of the sensors 614 (see FIG. 28) as exemplary implementations of the sensor 144 (see FIG. 4) may obtain sensor information to be compared by the recognition engine 156 (see FIG. 5) with sensor information obtained previously with respect to one or more predetermined draping conformations that the e-paper 102 may assume, for example, by being draped over the object 634 of FIG. 28 or over the object 634a of the FIG. 28a) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to the one or more sequences of two or more draping conformations that the e-paper 102 may assume such as for example a sequence involving the exemplary draping conformation 633 over the object 634 (see FIG. 28) and the exemplary draping conformation 633a over the object 634a (see FIG. 28a) of the region 604a and the region 604b of the exemplary implementation 602 of the e-paper 102).

For instance, in some implementations, the exemplary operation O11 may include the operation of O1125 for one or more conformation wrapping modules configured to direct obtaining wrapping information associated with one or more sequences of two or more conformations of one or more portions of one or more regions of the bendable display containing electronic device. An exemplary implementation may include one or more wrapping modules 359 of FIG. 11 directing the acquisition of wrapping information such as obtaining wrapping information (e.g. one or more of the sensors 614 (see FIG. 29) as exemplary implementations of the sensor 144 (see FIG. 4) may obtain sensor information to be compared by the recognition engine 156 (see FIG. 5) with sensor information obtained previously with respect to one or more predetermined wrapping conformations that the e-paper 102 may assume, for example, by being wrapped around the object 636) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to one or more wrapped conformations that the e-paper 102 may assume such as for example a sequence involving the exemplary wrapped conformation 635 around the exemplary object 636 (see FIG. 29) and the exemplary wrapped conformation 635a around the exemplary object 636a (see FIG. 29a) of the region 604a and the region 604b of the exemplary implementation 602 of the e-paper 102).

FIG. 41

Figure 41:
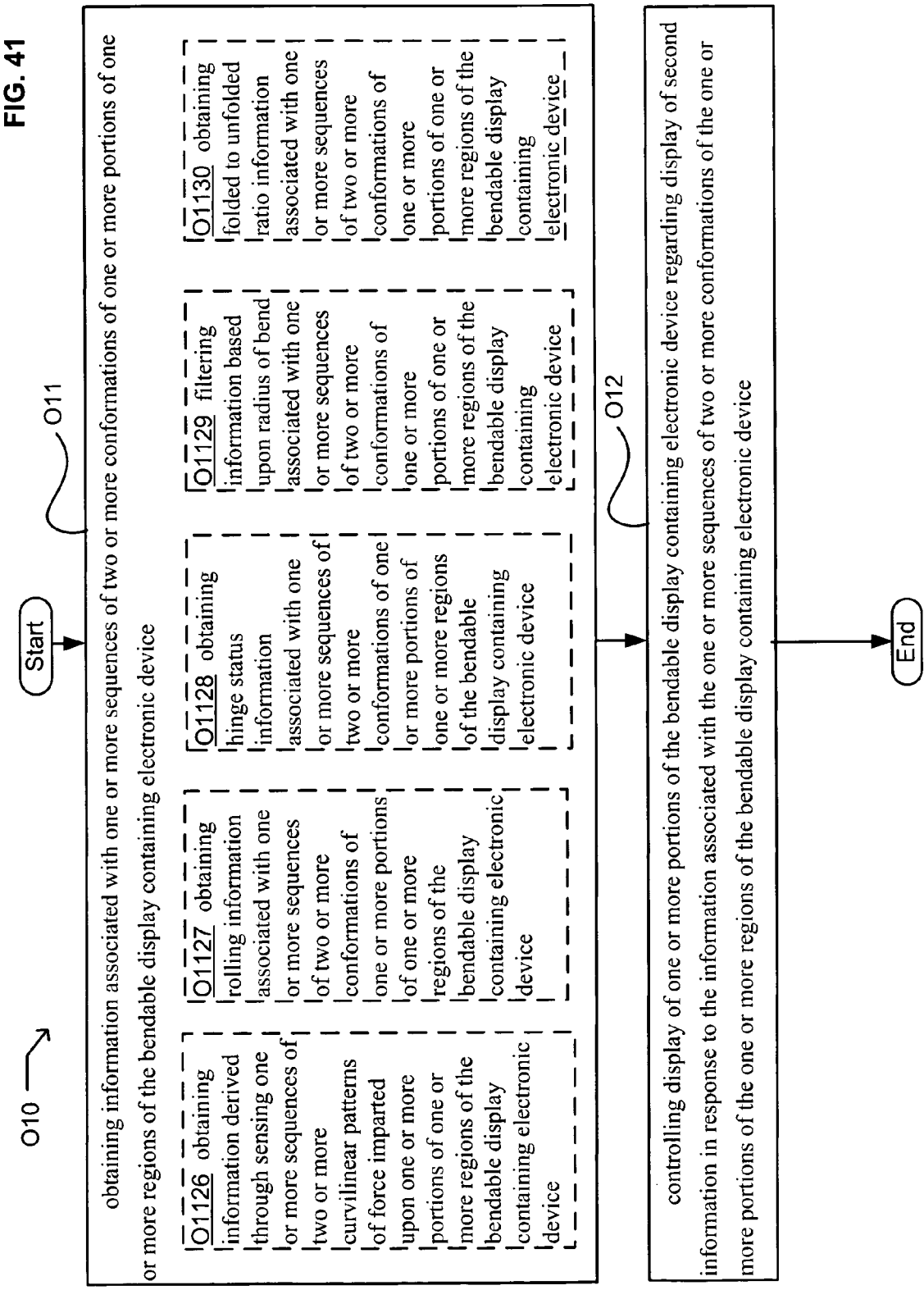
FIG. 41 is a high-level flowchart including an exemplary implementation of operation O11 of FIG. 34.

FIG. 41 illustrates various implementations of the exemplary operation O11 of FIG. 34. In particular, FIG. 41 illustrates example implementations where the operation O11 includes one or more additional operations including, for example, operations O1126, O1127, O1128, O1129, and/or O1130, which may be executed generally by, in some instances, the sensor unit 114 of FIG. 4.

For instance, in some implementations, the exemplary operation O11 may include the operation of O1126 for one or more conformation curvilinear modules configured to direct obtaining information derived through sensing one or more sequences of two or more curvilinear patterns of force imparted upon one or more portions of one or more regions of the bendable display containing electronic device. An exemplary implementation may include one or more conformation curvilinear modules 360 of FIG. 11 directing the acquisition of curvilinear information such as obtaining information derived through sensing one or more sequences of two or more curvilinear patterns of force imparted (e.g. one or more of the sensors 614 (see FIG. 30) as exemplary implementations of the force sensor 144e (see FIG. 4) of the sensor 144 may obtain force information such as that imparted by the exemplary instrument 638 following a path 640) upon one or more portions of one or more regions of the electronic paper assembly or other bendable display containing electronic device (e.g. the conformation unit 122 (see FIG. 8) may maintain in the conformation memory 200 portions of curvilinear patterns of force to be obtained by the sensors 614 and may also maintain in the content storage 132 (see FIG. 3) information associated with one or more sequences of two or more curvilinear patterns of force along the region 604a and the region 604b of the exemplary implementation 602 of the e-paper 102 for instance, a sequence involving the exemplary path 640a and the exemplary path 640b).

For instance, in some implementations, the exemplary operation O11 may include the operation of O1127 for one or more conformation rolling modules configured to direct obtaining rolling information associated with one or more sequences of two or more conformations of one or more portions of one or more regions of the bendable display containing electronic device. An exemplary implementation may include one or more conformation rolling modules 361 of FIG. 11 directing the acquisition of rolling information such as obtaining rolling information (e.g. one or more of the sensors 614 (see FIG. 31) as exemplary implementations of the sensor 144 (see FIG. 4) may obtain sensor information to be compared by the recognition engine 156 (see FIG. 5) with sensor information obtained previously with respect to one or more predetermined rolling conformations that the e-paper 102 may assume, for example, the exemplary rolled conformation 643 (see FIG. 31) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between the sensor information previously obtained with respect to the one or more rolled conformations that the e-paper 102 may assume such as for example a sequence involving the rolled conformation 643 and the rolled conformation 643a of the region 604a and the region 604b of the exemplary implementation 602 of the e-paper 102 shown in FIG. 31).

For instance, in some implementations, the exemplary operation O11 may include the operation of O1128 for one or more conformation hinge modules configured to direct obtaining hinge status information associated with one or more sequences of two or more conformations of one or more portions of one or more regions of the bendable display containing electronic device. An exemplary implementation may include one or more conformation hinge modules 362 of FIG. 11 directing the acquisition of hinge status information such as obtaining hinge status information (e.g. one or more of the sensors 614 (see FIG. 32) as exemplary implementations of the sensor 144 (see FIG. 4) of the sensor unit 114 obtaining sensing data in combination with the recognition engine 156 (see FIG. 5) through the recognition logic 162 matching hinge status information contained in the recognition memory 164 with the sensing data) associated with one or more sequences of two or more conformations of one or more portions of one or more regions of the electronic paper assembly or other bendable display containing electronic device (e.g. a sequence involving the partially folded conformation 644 of the exemplary implementation 602 of the e-paper 102 of the region 604a and the region 604b having a hinge status 645 and the partially folded conformation 644a having hinge status 645a shown in FIG. 32).

For instance, in some implementations, the exemplary operation O11 may include the operation of O1129 for one or more bend radius modules configured to direct filtering information based upon radius of bend associated with one or more sequences of two or more conformations of one or more portions of one or more regions of the bendable display containing electronic device. An exemplary implementation may include one or more bend radius modules 363 of FIG. 11 directing the filtering of information such as filtering information based on radius of bend (e.g. the recognition engine 156 (see FIG. 5) may use sensor information from one or more of the sensors 614 (see FIG. 33) in conjunction with predetermined configuration data stored in the conformation memory 200 (see FIG. 8) to recognize a predetermined radius of bend conformation, which may then be used by the content control 130 (see FIG. 3) of the content unit 112 to filter information contained in the content memory 140) associated with one or more sequences of two or more conformations of one or more portions of one or more regions of the electronic paper assembly or other bendable display containing electronic device (e.g. a sequence involving the radius of bend 646 and the radius of bend 646a of the exemplary implementation 602 of the e-paper 102 including the region 604a and the region 604b as illustrated in FIG. 33).

For instance, in some implementations, the exemplary operation O11 may include the operation of O1130 for one or more conformation fold ratio modules configured to direct obtaining folded to unfolded ratio information associated with one or more sequences of two or more conformations of one or more portions of one or more regions of the bendable display containing electronic device. An exemplary implementation may include one or more fold ratio modules 364 of FIG. 11 directing the acquisition of folded to unfolded ratio information such as obtaining folded to unfolded ratio information (e.g. one or more of the sensors 614 (see FIG. 20) as exemplary implementations of the sensor 144 (see FIG. 4) may obtain sensor information to be compared by the recognition engine 156 (see FIG. 5) with sensor information obtained previously with respect to one or more predetermined folded and unfolded conformations that the e-paper 102 may assume along the borders 606 and/or elsewhere, such as the various bends and folds shown with the conformations of FIGS. 23, 24, 25, 26, 28, 29, 31, 32, and 33. The conformation processor 196 (see FIG. 8) of the conformation unit 122 may determine which of the borders 606 and/or elsewhere in the regions 604 are folded and/or bent versus which are unfolded and/or unbent thereby producing a folded to unfolded ratio) associated with one or more one or more sequences in one or more conformations of one or more portions of one or more regions of the electronic paper assembly or other bendable display containing electronic device (e.g. the conformation unit 122 (see FIG. 8) may maintain in the conformation memory 200 one or more associations between folded to unfolded ratios and various conformations that the e-paper 102 may assume thereby being capable of indicating existence of one or more sequences involving such conformations, such as for example a sequence involving the partially folded conformation of the region 604a and the region 604b of the exemplary implementation 602 of the e-paper 102 having the angle of bend 624 and the partially folded conformation having the angle of bend 624a shown in FIG. 23).

FIG. 42

Figure 42:
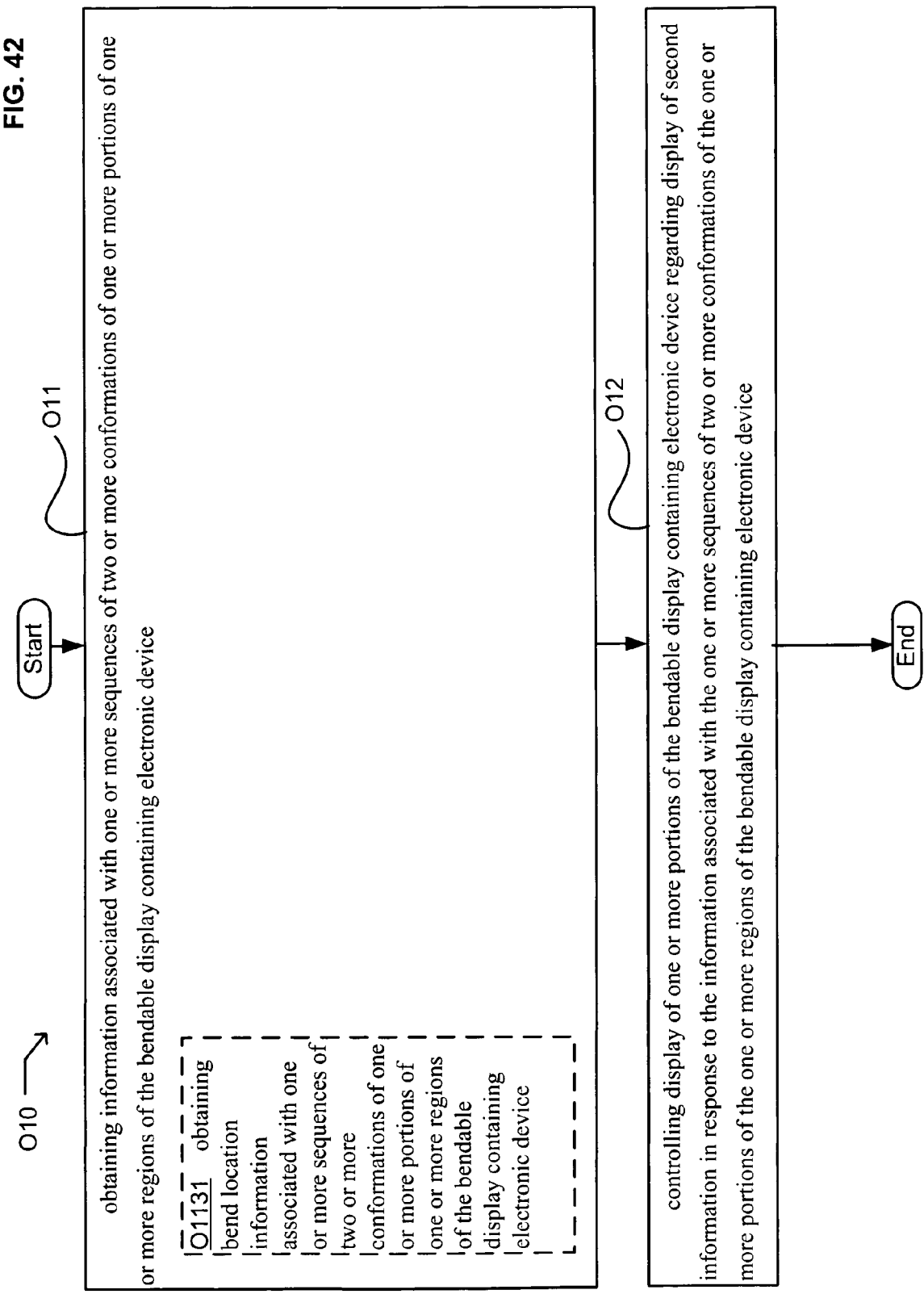
FIG. 42 is a high-level flowchart including exemplary implementations of operation O11 of FIG. 34.

FIG. 42 illustrates various implementations of the exemplary operation O11 of FIG. 34. In particular, FIG. 42 illustrates example implementations where the operation O11 includes one or more additional operations including, for example, operation O1131, which may be executed generally by, in some instances, the sensor unit 114 of FIG. 4.

For instance, in some implementations, the exemplary operation O11 may include the operation of O1131 for one or more bend location modules configured to direct obtaining bend location information associated with one or more sequences of two or more conformations of one or more portions of one or more regions of the bendable display containing electronic device. An exemplary implementation may include one or more bend location modules 366 of FIG. 12 directing the acquisition of bend location information such as obtaining bend location information (e.g. one or more of the sensors 614 (see FIG. 20) as exemplary implementations of the sensor 144 (see FIG. 4) may obtain sensor information to be compared by the recognition engine 156 (see FIG. 5) with sensor information obtained previously with respect to locations on the e-paper 102 that bends may assume along the borders 606 and/or elsewhere, such as the various bends and folds shown with the conformations of FIGS. 23, 24, 25, 26, 28, 29, 31, 32, and 33. The conformation processor 196 (see FIG. 8) of the conformation unit 122 may determine which of the borders 606 and/or elsewhere in the regions 604 are folded and/or bent thereby producing bend location information) associated with one or more sequences of two or more conformations of one or more portions of one or more regions of the electronic paper assembly or other bendable display containing electronic device (e.g. the conformation unit 122 (see FIG. 8) may maintain in the conformation memory 200 one or more associations between bend locations and various conformations that the e-paper 102 may assume thereby being capable of indicating existence of one or more sequences involving between such conformations, such as for example a sequence involving the partially folded conformation of the region 604a and the region 604b of the exemplary implementation 602 of the e-paper 102 having the angle of bend 624 and the partially folded conformation having the angle of bend 624a shown in FIG. 23).

FIG. 43

Figure 43:
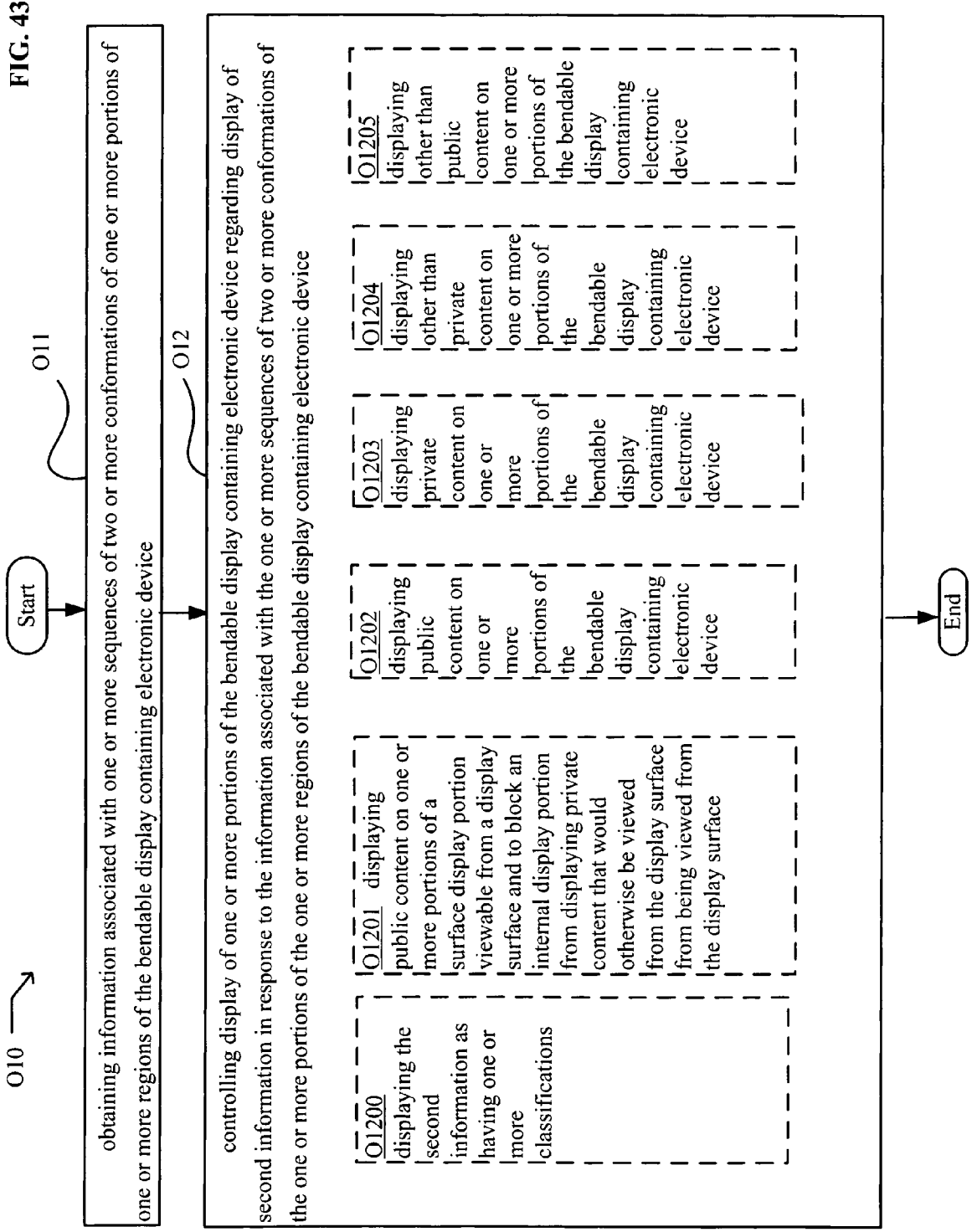
FIG. 43 is a high-level flowchart including an exemplary implementation of operation O12 of FIG. 34.

FIG. 43 illustrates various implementations of the exemplary operation O12 of FIG. 35. In particular, FIG. 42 illustrates example implementations where the operation O12 may include one or more additional operations including, for example, operation O12, which may further operations O1200, O1201, O1202, O1203, O1204, and/or O1205, which may be executed generally by, in some instances, the display unit 114 of FIG. 9.

For instance, in some implementations, the exemplary operation O12 may include the operation of O1200 for one or more second information display modules configured to direct displaying the second information as having one or more classifications. An exemplary implementation may include one or more classification display modules 367a of FIG. 12 directing the display of the second information as having one or more classifications (e.g. displaying information 622 having a "public" classification from the display surface 612 (see FIG. 21) on the surface portion 608a that has the display surface 612 (see FIG. 23) and information 620 having a "private" classification (see FIG. 23) on the internal portion 608b (see FIG. 21).

For instance, in some implementations, the exemplary operation O12 may include the operation of O1201 for one or more private content blocking modules configured to direct displaying public content on one or more portions of a surface display portion viewable from a display surface and to block an internal display portion from displaying private content that would otherwise be viewed from the display surface from being viewed from the display surface. An exemplary implementation may include one or more private content blocking modules 367 of FIG. 12 directing the acquisition of displaying public content to block private content such as displaying public content (e.g. displaying information 622 having a "public" classification from the display surface 612 (see FIG. 21)) on one or more portions of a surface display portion viewable from a display surface (e.g. the surface portion 608a that has the display surface 612 (see FIG. 23)) to block an internal display portion from displaying private content that would otherwise be viewed from the display surface from being viewed from the display surface (e.g. information 620 having a "private" classification (see FIG. 23) e.g. the internal portion 608b (see FIG. 21) in some implementations may be under independent control such that the internal portion may display information 620 having a "private" classification for the display surface 612 but for the display of information 622 having a "public" classification from the display surface 612 consequently blocking the display by the internal portion 608b of the information 620 having a "private" classification from being viewed from the display surface 612).

For instance, in some implementations, the exemplary operation O12 may include the operation of O1202 for one or more public content modules configured to direct displaying public content on one or more portions of the bendable display containing electronic device. An exemplary implementation may include one or more public content modules 368 of FIG. 12 directing display of public content such as displaying public content (e.g. information 622 having a classification of "public" (see FIG. 23) on one or more portions (e.g. portions of the information 622 having a classification of "public" may be displayed from the internal portion 608b in combination with other portions of the information 622 being displayed from the surface portion 608c so that the information 622 having a classification of "public" may be displayed from the display surface 612 (see FIG. 23)).

For instance, in some implementations, the exemplary operation O12 may include the operation of O1203 for one or more private content modules configured to direct displaying private content on one or more portions of the bendable display containing electronic device. An exemplary implementation may include one or more private content modules 369 of FIG. 12 directing display of private content such as displaying private content (e.g. information 620 having a classification of "private" (see FIG. 23) on one or more portions (e.g. portions of the information 620 having a classification of "private" may be displayed from the internal portion 608b in combination with other portions of the information 620 being displayed from the surface portion 608a so that the information 620 having a classification of "private" may be displayed from the display surface 610 (see FIG. 23)).

For instance, in some implementations, the exemplary operation O12 may include the operation of O1204 for one or more non-private content modules configured to direct displaying other than private content on one or more portions of the bendable display containing electronic device. An exemplary implementation may include one or more conformation non-private content modules 370 of FIG. 12 directing display of other than private content such as displaying other than private content (e.g. information 622 having a classification of "public" ("public" is a form of information classification that is other than "private") (see FIG. 23)) on one or more portions (e.g. portions of the information 622 having a classification of "public" ("public" is a form of information classification that is other than "private") may be displayed from the internal portion 608b in combination with other portions of the information 622 being displayed from the surface portion 608c so that the information 622 having a classification of "public" ("public is a form of information classification that is other than "private") may be displayed from the display surface 612 (see FIG. 23).

For instance, in some implementations, the exemplary operation O12 may include the operation of O1205 for one or more non-public content modules configured to direct displaying other than public content on one or more portions of the bendable display containing electronic device. An exemplary implementation may include one or more non-public content modules 371 of FIG. 12 directing display of other than public content such as displaying other than public content on one or more portions (e.g. information 620 having a classification of "private" ("private" is a form of information classification that is other than "public") (see FIG. 23)) on one or more portions (e.g. portions of the information 622 having a classification of "private" ("private" is a form of information classification that is other than "public") may be displayed from the internal portion 608b in combination with other portions of the information 622 being displayed from the surface portion 608a so that the information 622 having a classification of "private" ("private is a form of information classification that is other than "public") may be displayed from the display surface 610 (see FIG. 23).

FIG. 44

Figure 44:
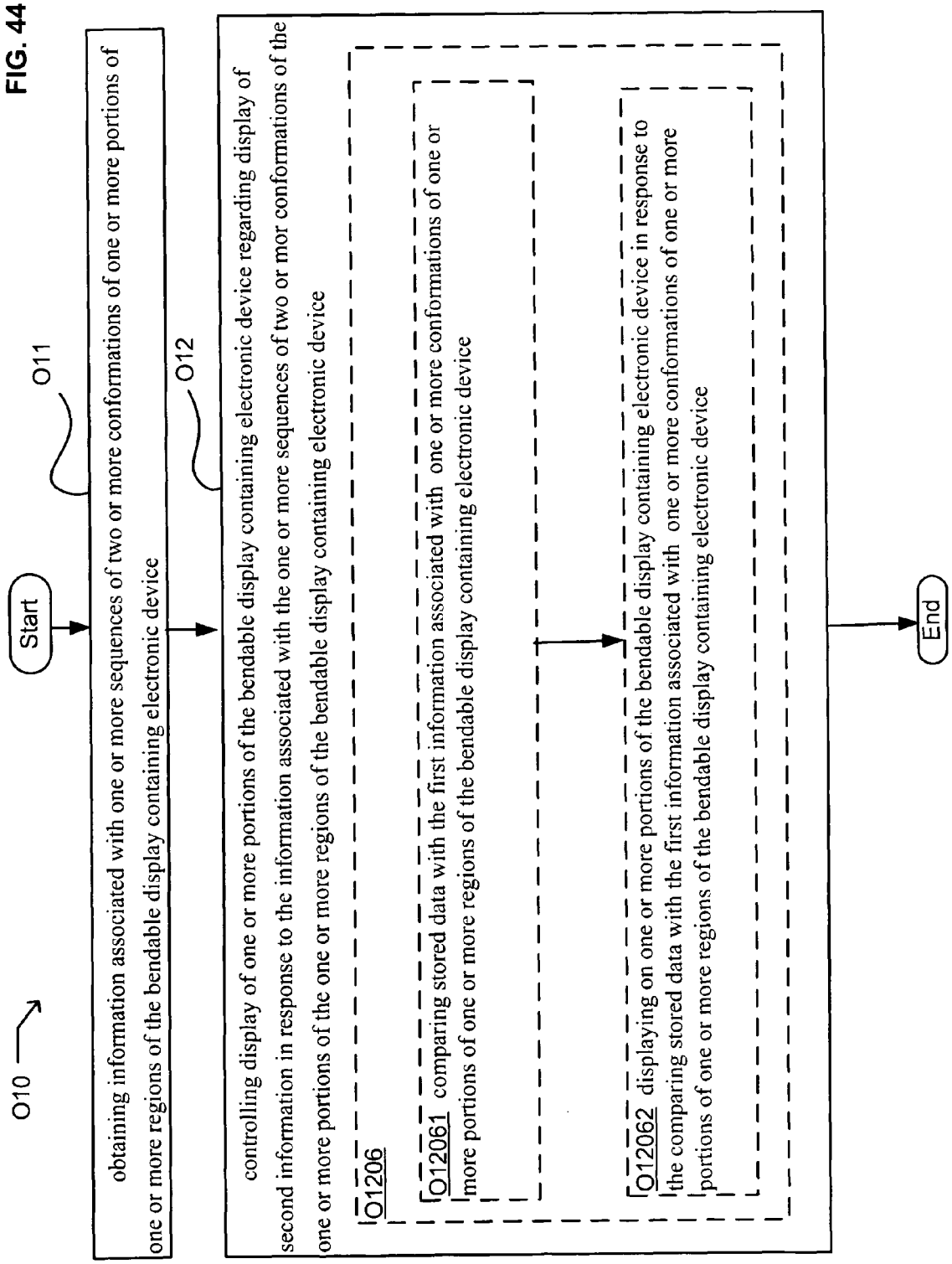
FIG. 44 is a high-level flowchart including an exemplary implementation of operation O12 of FIG. 34.

FIG. 44 illustrates an example implementation of the exemplary operation O12 of FIG. 34 where the operation O12 includes, for example, operation O12106, which may be executed generally by, in some instances, the display unit 114 of FIG. 9. For instance, in some implementations, the exemplary operation O12 may include the operation of O1206 that may include the operation O12061 for one or more conformation comparison modules configured to direct comparing stored data with the first information associated with one or more conformations of one or more portions of one or more regions of the bendable display containing electronic device and the operation 12062 for one or more comparison display modules configured to direct displaying on one or more portions of the bendable display containing electronic device in response to the one or more conformation comparison modules configured to direct comparing stored data with the first information associated with one or more conformations of one or more portions of one or more regions of the bendable display containing electronic device.

An exemplary implementation of the operation O12061 may include one or more conformation comparison modules 372 of FIG. 12 directing comparing of stored data such as one or more conformation comparison modules configured to direct comparing stored data with the first information associated with one or more conformations of one or more portions of one or more regions of the bendable display containing electronic device (e.g. one or more of the sensors 614 (see FIG. 23) as exemplary implementations of the sensor 144 (see FIG. 4) may send sensing information (such as stress information, strain information, force information, optical fiber information, surface contact information, gyroscopic information, etc) regarding the partially folded conformation (see FIG. 23) of the exemplary implementation 602 of the e-paper 102 through the sensor interface 146 to the recognition unit 116 (see FIG. 5) through the recognition interface 158 whereby the recognition engine 156 (see FIG. 5) compares the sensing information with conformation information stored in the conformation memory 200 (see FIG. 8) as accessed by the recognition engine (see FIG. 5) through the recognition interface and the conformation interface 194 (see FIG. 8)).

An exemplary implementation of the operation O12062 may include one or more comparison display modules 373 of FIG. 12 directing display on one or more portions such as displaying on one or more portions (e.g. the display unit 124 (see FIG. 9) may direct display hardware 204 through the display control 202 to display on the surface portion 608a and the surface portion 608c (see FIG. 21)) in response to the comparing stored data with the first information associated with one or more conformations of one or more portions of one or more regions of the electronic paper assembly or other bendable display containing electronic device (e.g. after the recognition engine 156 (see FIG. 5) compares sensing information from one or more of the sensors 614 with conformation information stored in the conformation memory 200 (see FIG. 8), the recognition engine may direct to the display control 202 through the conformation interface 194 and the display interface 206 the above display on the surface portion 608a and the surface portion 608c).

FIG. 45

Figure 45:
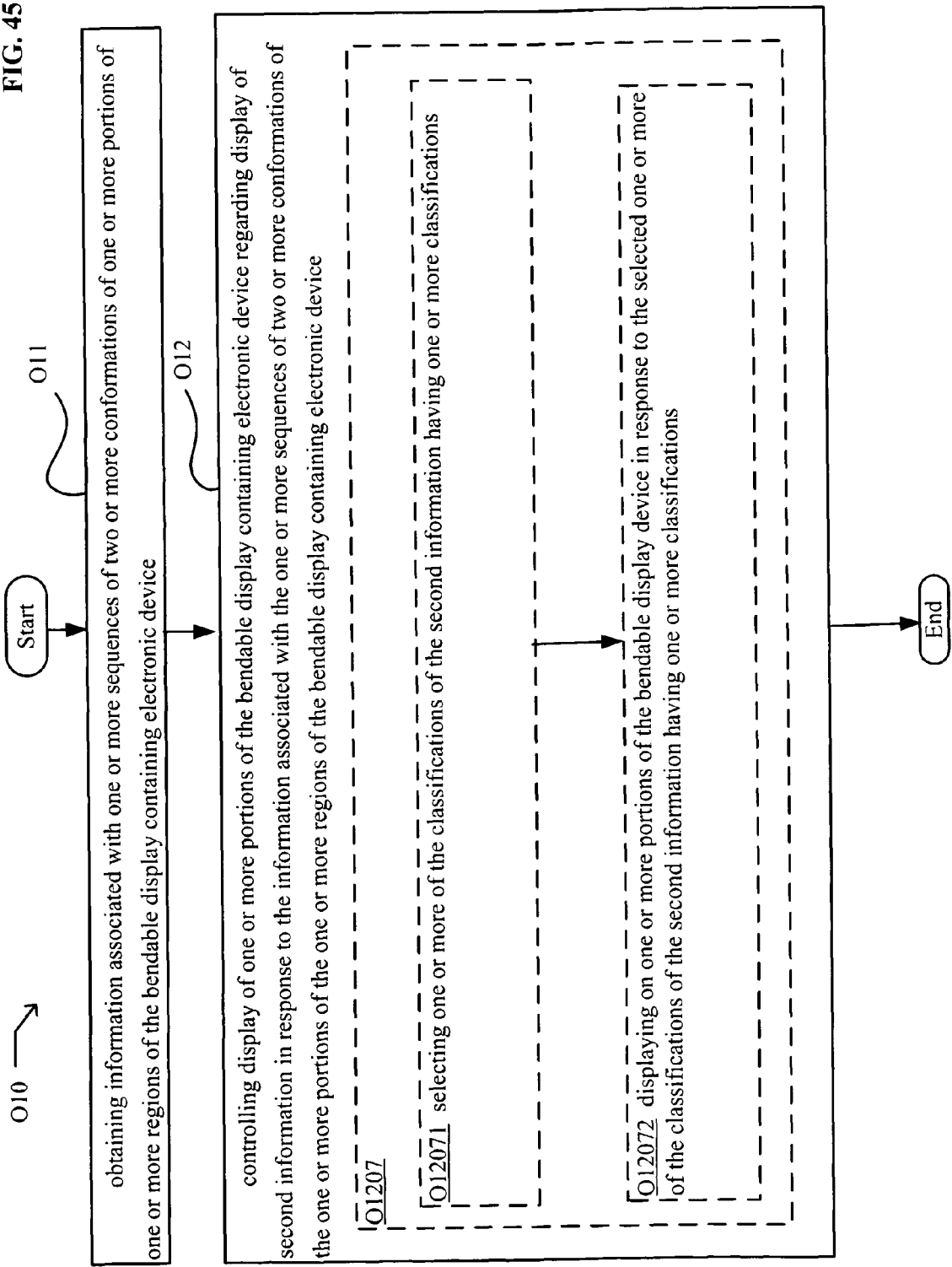
FIG. 45 is a high-level flowchart including an exemplary implementation of operation O12 of FIG. 34.

FIG. 45 illustrates an example implementation of the exemplary operation O12 of FIG. 34 where the operation O12 includes, for example, operation O1207, which may be executed generally by, in some instances, the display unit 114 of FIG. 9. For instance, in some implementations, the exemplary operation O12 may include the operation of O1207 that may include the operation O12071 for one or more classification selection modules configured to direct selecting one or more of the classifications of the second information having one or more classifications and the operation 12072 for one or more selection display modules configured to direct displaying on one or more portions of the bendable electronic display device in response to the selected one or more of the classifications of the second information having one or more classifications.

An exemplary implementation of the operation 12071 may include one or more classification selection modules 374 of FIG. 12 directing selection such as one or more classification selection modules configured to direct selecting one or more of the classifications of the second information having one or more classifications (e.g. one or more of the sensors 614 (see FIG. 23) as exemplary implementations of the sensor 144 (see FIG. 4) may send sensing information (such as stress information, strain information, force information, optical fiber information, surface contact information, gyroscopic information, etc) regarding a conformation (see FIG. 24) of the exemplary implementation 602 of the e-paper 102 through the sensor interface 146 to the recognition unit 116 (see FIG. 5) through the recognition interface 158 whereby the recognition engine 156 (see FIG. 5) compares the sensing information with conformation information stored in the conformation memory 200 (see FIG. 8) as accessed by the recognition engine (see FIG. 5) through the recognition interface and the conformation interface 194 (see FIG. 8). Based upon the comparison, the recognition engine can send to the content unit 112 through the recognition interface 158 and the content interface 134 one or more indications of what one or more classifications of information should be provided to the display unit 124 (see FIG. 9) for display).

An exemplary implementation of the operation 12072 may include one or more selection display modules 375 directing display such as displaying on one or more portions in response to the selected one or more of the classifications of the second information having one or more classifications (e.g. the display control 202 (see FIG. 9) of the display unit 124 may direct display hardware 204 to display on the display surface 610 through the surface portion 608a (see FIG. 21) information 620 having a "private" classification (see FIG. 23) and to display on the display surface 612 through the surface portion 608c (see FIG. 21) information 622 having a "public" classification (see FIG. 23) in response to selecting based upon the comparisons of the recognition engine 156 (see FIG. 5).

FIG. 46

FIG. 46 illustrates an example implementation of the exemplary operation O12 of FIG. 34 where the operation O12 includes, for example, operation O1208, which may be executed generally by, in some instances, the display unit 114 of FIG. 9. For instance, in some implementations, the exemplary operation O12 may include the operation of O1208 that may include the operation O121081 for one or more non-classification selection modules configured to direct selecting other than one or more of the classifications of the second information having one or more classifications and the operation O12082 for one or more other selection display modules configured to direct displaying on one or more portions of one or more display layers in response to the selected other than one or more of the classifications of the second information having one or more classifications.

An exemplary implementation of the operation 12081 may include one or more non-classification selection modules 376 of FIG. 12 directing selection such as one or more non-classification selection modules configured to direct selecting other than one or more of the classifications of the second information having one or more classifications (e.g. the selection 626 between TV, PDA, cell phone, notebook PC, and eBook functionality (see FIG. 24) may be obtained so that other than one or more of the classifications of the second information is selected as a consequence by having the recognition engine 156 (see FIG. 5) use sensor information from one or more of the sensors 614 (see FIG. 24) in conjunction with predetermined configuration data stored in the conformation memory 200 (see FIG. 8) to recognize a predetermined conformation, which can then be used by the application control 166 (see FIG. 6) of the application unit 118 to select a functionality per data stored in the application memory 176) associated with one or more conformations of one or more portions of one or more regions of the electronic paper assembly or other bendable display containing electronic device (e.g. the conformation of the exemplary implementation 602 of the e-paper 102 including the region 604a and the region 604b as illustrated in FIG. 24).

An exemplary implementation of the operation 12082 may include one or more other display modules 377 of FIG. 12 directing display such as displaying on one or more portions in response to the selected other than one or more of the classifications of the second information having one or more classifications (e.g. the display control 202 (see FIG. 9) of the display unit 124 may direct display hardware 204 to display on the display surface 610 through the surface portion 608a (see FIG. 21) some information regarding the selection 626 in response to selecting based upon the comparisons of the recognition engine 156 (see FIG. 5) in which in some implementations the displayed information is unrelated to the "public" or "private" classification illustrated by FIG. 23).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

A partial view of a system S100 is shown in FIG. 47 that includes a computer program S104 for executing a computer process on a computing device. An implementation of the system S100 is provided using a signal-bearing medium S102 bearing one or more instructions for one or more conformation sensor modules configured to direct obtaining information associated with one or more sequences of two or more conformations of one or more portions of one or more regions of a bendable display containing electronic device. An exemplary implementation may include obtaining information (e.g. obtaining may be performed through one or more of the sensors 614 (see FIG. 23) as exemplary implementations of the sensor 144 (see FIG. 4) regarding the angle of bend 624 and the angle of bend 624a (see FIG. 23) of the exemplary implementation 602 of the e-paper 102) associated with one or more sequences of two or more conformations (e.g. the one or more of the sensors 614 as exemplary implementations of the sensor 144 may relay the information about a sequence in which the angle of bend 624 and the angle of bend 624a occurs through the sensor interface 146 (see FIG. 4) to the recognition unit 166 (see FIG. 5) through the recognition interface 158 where the recognition engine 156 may determine that the angle of bend 624 and the angle of bend 624a is associated with one or more conformations as retrieved from the conformation memory 200 (see FIG. 8) through the conformation interface 194) of one or more portions of one or more regions (e.g. the region 604a and the region 604b (see FIGS. 22 and 23) are angularly oriented with one another along the border 606a) of the electronic paper assembly or other bendable display containing electronic device (e.g. of the implementation 602 (see FIGS. 22 and 23) of the e-paper 102).

The implementation of the system S100 is also provided using a signal-bearing medium S102 bearing one or more instructions for one or more display control modules configured to direct controlling display of one or more portions of the bendable display containing electronic device regarding display of second information in response to the information associated with the one or more sequences of two or more conformations of the one or more portions of the one or more regions of the bendable display containing electronic device. An exemplary implementation may include coordinating the one or more sequences of two or more conformations of one or more portions of the one or more regions of the electronic paper assembly or other bendable display containing electronic device (e.g. one or more of the coordination modules 305 may receive from the recognition unit 166 (see FIG. 5) through the recognition interface 158 sequence information about a conformation sequence for one or more portions of one or more regions of the electronic paper assembly or other bendable display containing electronic device as determined by the recognition engine 156) with one or more commands (e.g. the one or more coordination modules 305 may relay the sequence information to the application unit 118 through the application interface 170 upon which the application control 166 instructs the application processor to execute certain application commands through the application logic 174 contained in the application memory 176 in accordance with correlation information contained in the application storage 168 associating conformation sequences with application commands.

The one or more instructions may be, for example, computer executable and/or logic-implemented instructions. In some implementations, the signal-bearing medium S102 may include a computer-readable medium S106. In some implementations, the signal-bearing medium S102 may include a recordable medium S108. In some implementations, the signal-bearing medium S102 may include a communication medium S110.

Those having ordinary skill in the art will recognize that the state of the art has progressed to the point where there is little distinction left between hardware and software implementations of aspects of systems; the use of hardware or software is generally (but not always, in that in certain contexts the choice between hardware and software may become significant) a design choice representing cost vs. efficiency tradeoffs. Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which may be implemented, individually and/or collectively, by a wide range of hardware, software, firmware, or any combination thereof may be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those of ordinary skill in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

What is claimed is:

1. A system comprising:
    circuitry configured to obtain information associated with at least one conformation about at least one hinge of at least one display containing electronic device; and
    circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge.

2. The system of claim 1, further comprising:
    circuitry configured to detect at least one conformation about at least one hinge of at least one display containing electronic device.

3. The system of claim 1, wherein the circuitry configured to obtain information associated with at least one conformation about at least one hinge of at least one display containing electronic device comprises:
    circuitry configured to obtain force information associated with at least one conformation about at least one hinge of at least one display containing electronic device.

4. The system of claim 1, wherein the circuitry configured to obtain information associated with at least one conformation about at least one hinge of at least one display containing electronic device comprises:
    circuitry configured to obtain geometry information associated with at least one conformation about at least one hinge of at least one display containing electronic device.

5. The system of claim 1, wherein the circuitry configured to obtain information associated with at least one conformation about at least one hinge of at least one display containing electronic device comprises:
    circuitry configured to obtain gyroscopic information associated with at least one conformation about at least one hinge of at least one display containing electronic device.

6. The system of claim 1, wherein the circuitry configured to obtain information associated with at least one conformation about at least one hinge of at least one display containing electronic device comprises:
    circuitry configured to obtain hinge status information associated with at least one conformation about at least one hinge of at least one display containing electronic device.

7. The system of claim 1, wherein the circuitry configured to obtain information associated with at least one conformation about at least one hinge of at least one display containing electronic device comprises:
    circuitry configured to obtain angle information associated with at least one conformation about at least one hinge of at least one display containing electronic device.

8. The system of claim 1, wherein the circuitry configured to obtain information associated with at least one conformation about at least one hinge of at least one display containing electronic device comprises:
    circuitry configured to obtain, from one or more sensors, information associated with at least one conformation about at least one hinge of at least one display containing electronic device.

9. The system of claim 1, wherein the circuitry configured to obtain information associated with at least one conformation about at least one hinge of at least one display containing electronic device comprises:
    circuitry configured to obtain information associated with at least one persistent conformation about at least one hinge of at least one display containing electronic device.

10. The system of claim 1, wherein the circuitry configured to obtain information associated with at least one conformation about at least one hinge of at least one display containing electronic device comprises:
    circuitry configured to obtain information associated with at least one transient conformation about at least one hinge of at least one display containing electronic device.

11. The system of claim 1, wherein the circuitry configured to obtain information associated with at least one conformation about at least one hinge of at least one display containing electronic device comprises:
    circuitry configured to obtain information associated with at least one conformation about at least one hinge of at least some electronic paper, the at least some electronic paper being at least one of the following types: electrophoretic, electrowetting, twist ball, liquid crystal, organic light emitting diode, liquid powder, flexible transistor array, light emitting diode, and electrofluidic.

12. The system of claim 1, wherein the circuitry configured to obtain information associated with at least one conformation about at least one hinge of at least one display containing electronic device comprises:
    circuitry configured to obtain information associated with at least one conformation about at least one microhinge of at least one display containing electronic device.

13. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a)

selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region of two or more regions of the at least one display containing electronic device, the at least one region being at least partly bordered by the at least one hinge.

14. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display using two or more layers of at least one region that is at least partly bordered by the at least one hinge.

15. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one of two or more layers of at least one region that is at least partly bordered by the at least one hinge.

16. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region of at least one of two or more surfaces of the display containing electronic device, the at least one region being at least partly bordered by the at least one hinge.

17. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one outside region that is at least partly bordered by the at least one hinge.

18. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one inside region that is at least partly bordered by the at least one hinge.

19. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application, (b) outputting information associated with the at least one application for display from at least one region that is at least partly bordered by the at least one hinge, and (c) outputting information having one or more specified classifications for display.

20. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting one or more control features associated with the at least one application for display from at least one region that is at least partly bordered by the at least one hinge.

21. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting user interface content associated with the at least one application for display from at least one region that is at least partly bordered by the at least one hinge.

22. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one web browser application and (b) outputting information associated with the at least one web browser application for display from at least one region that is at least partly bordered by the at least one hinge.

23. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one e-book application and (b) outputting information associated with the at least one e-book application for display from at least one region that is at least partly bordered by the at least one hinge.

24. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one notebook PC application and (b) outputting information associated with the at least one notebook PC application for display from at least one region that is at least partly bordered by the at least one hinge.

25. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one phone application and (b) outputting information associated with the at least one phone application for display from at least one region that is at least partly bordered by the at least one hinge.

26. The system of claim 1, wherein the circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge comprises:

circuitry configured to process the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region positioned to one side of the at least one hinge.

27. A system comprising:

means for obtaining information associated with at least one conformation about at least one hinge of at least one display containing electronic device; and means for processing the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge.

28. A system comprising:

one or more computer readable media bearing one or more instructions for facilitating operations including at least:

obtaining information associated with at least one conformation about at least one hinge of at least one display containing electronic device; and processing the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge.

29. A method comprising obtaining information associated with at least one conformation about at least one hinge of at least one display containing electronic device; and processing, using one or more processing components, the information associated with at least one conformation about the at least one hinge of the at least one display containing electronic device including (i) determining whether at least one predetermined angle is recognized and (ii) if at least one predetermined angle is recognized, (a) selecting at least one application and (b) outputting information associated with the at least one application for display from at least one region that is at least partly bordered by the at least one hinge.

* * * * *